US006333773B1

United States Patent
Faris

(10) Patent No.: US 6,333,773 B1
(45) Date of Patent: Dec. 25, 2001

(54) IMAGE DISPLAY PANEL EMPLOYING A BROAD-BAND POLARIZING/REFLECTIVE BACKLIGHTING STRUCTURE AND A PIXELATED ARRAY OF REFLECTIVE-TYPE OF FILTERING ELEMENTS

(75) Inventor: Sadeg Mustafa Faris, Pleasantville, NY (US)

(73) Assignee: Reveo, Inc., Elmsford, NY (US)

(*) Notice: Subject to any disclaimer, the term of this patent is extended or adjusted under 35 U.S.C. 154(b) by 0 days.

(21) Appl. No.: 09/254,908

(22) PCT Filed: Sep. 16, 1997

(86) PCT No.: PCT/US97/16907

§ 371 Date: Mar. 16, 1999

§ 102(e) Date: Mar. 16, 1999

(87) PCT Pub. No.: WO98/11275

PCT Pub. Date: Mar. 19, 1998

Related U.S. Application Data

(63) Continuation-in-part of application No. 08/715,314, filed on Sep. 16, 1996, now Pat. No. 6,188,460.

(51) Int. Cl.⁷ .................... G02F 1/1335; G02F 1/1347

(52) U.S. Cl. .................... 349/176; 349/61; 349/74; 349/78; 349/98; 349/104; 349/106

(58) Field of Search .................... 349/176, 61, 74, 349/78, 98, 104, 106

(56) References Cited

U.S. PATENT DOCUMENTS 4,073,571 * 2/1978 Grinberg et al. .................... 349/194
4,610,507   9/1986 Kamamori et al. .

(List continued on next page.)

OTHER PUBLICATIONS

Video-compatible subtractive color projection with cholesteric liquid-crystal ba by Jurg Funfschilling, et al., Journal of the SID, 1996, pp. 41–45.

(List continued on next page.)

Primary Examiner—Kenneth Parker
Assistant Examiner—Julie Ngo
(74) Attorney, Agent, or Firm—Thomas J. Perkowski, Esq., P.C.

(57) ABSTRACT

A liquid crystal display (LCD) panel construction for producing color images for viewing by a viewer. The LCD panel construction comprises: an illumination panel for producing light including spectral components with wavelengths in a visible band of the electromagenetic spectrum; a plurality of pixel regions within a predefined image display area, wherein each pixel region has a plurality of subpixel region and each said subpixel region within each pixel region has a light transmission portion and a light blocking portion, and each light transmission portion and light blocking portion has a frontside disposed in the direction in the viewer and a backside in the direction of the illumination panel. The illumination panel illuminates the plurality of pixel regions from the backside thereof so that a color image is formed the said plurality of pixel regions for viewing. A pattern of broad-band reflector material is disposed in spatial registration with the backside of the light blocking portions of the subpixel regions, for reflecting produced light at structures associated with the light blocking portions of the subpixels, thereby recycling produced light for use in illuminating said plurality of pixel regions. A pattern of broad-band absorption material is also disposed in spatial registration with the frontside of the light blocking portions of the subpixel regions, for absorbing ambient light incident upon structures associated with the light blocking portions of the subpixels, thereby reducing glare at the surface of the LCD panel due to ambient light incident thereon.

20 Claims, 25 Drawing Sheets

U.S. PATENT DOCUMENTS

| | | |
|---|---|---|
| 5,046,826 | 9/1991 | Iwamoto et al. . |
| 5,221,982 | 6/1993 | Faris . |
| 5,267,060 | 11/1993 | Colton . |
| 5,325,218 | 6/1994 | Willet et al. . |
| 5,327,285 * | 7/1994 | Faris .................................... 359/483 |
| 5,418,631 * | 5/1995 | Tedesco ................................ 359/15 |
| 5,471,327 | 11/1995 | Hall et al. . |
| 5,608,551 | 3/1997 | Biles et al. . |
| 5,650,865 | 7/1997 | Smith . |
| 5,663,816 | 9/1997 | Chen et al. . |
| 5,721,063 | 2/1998 | De Vaan et al. . |
| 5,822,029 | 10/1998 | Davis et al. . |

OTHER PUBLICATIONS

A System Approach to Color Filters for Flat–Panel Displays by J. Hunninghake, et al., SID 94 Digest, 1994, pp. 407–410.

Holographic Color Filters for LCDs by J. Biles, SID 94 Digest, 1994, pp. 403–406.

Cholesteric Reflectors with a Color Pattern by Jurg Funfschilling, et al., Journal of the SID, 4/1, 1996, 1994, pp. 399–402.

Design Issues in Using Thin–Film Optical Interference Filters as Color Filters F by S–F. Chen, et al., SID 94 Digest, 1994, pp. 411–416.

Polarizing Color Filters Made From Cholesteric Silicones by Robert Maurer, et. al., SID 90 Digest, vol. 0, No. 0, 1990, pp. 110–113.

PCT Search Report, 1998.

* cited by examiner

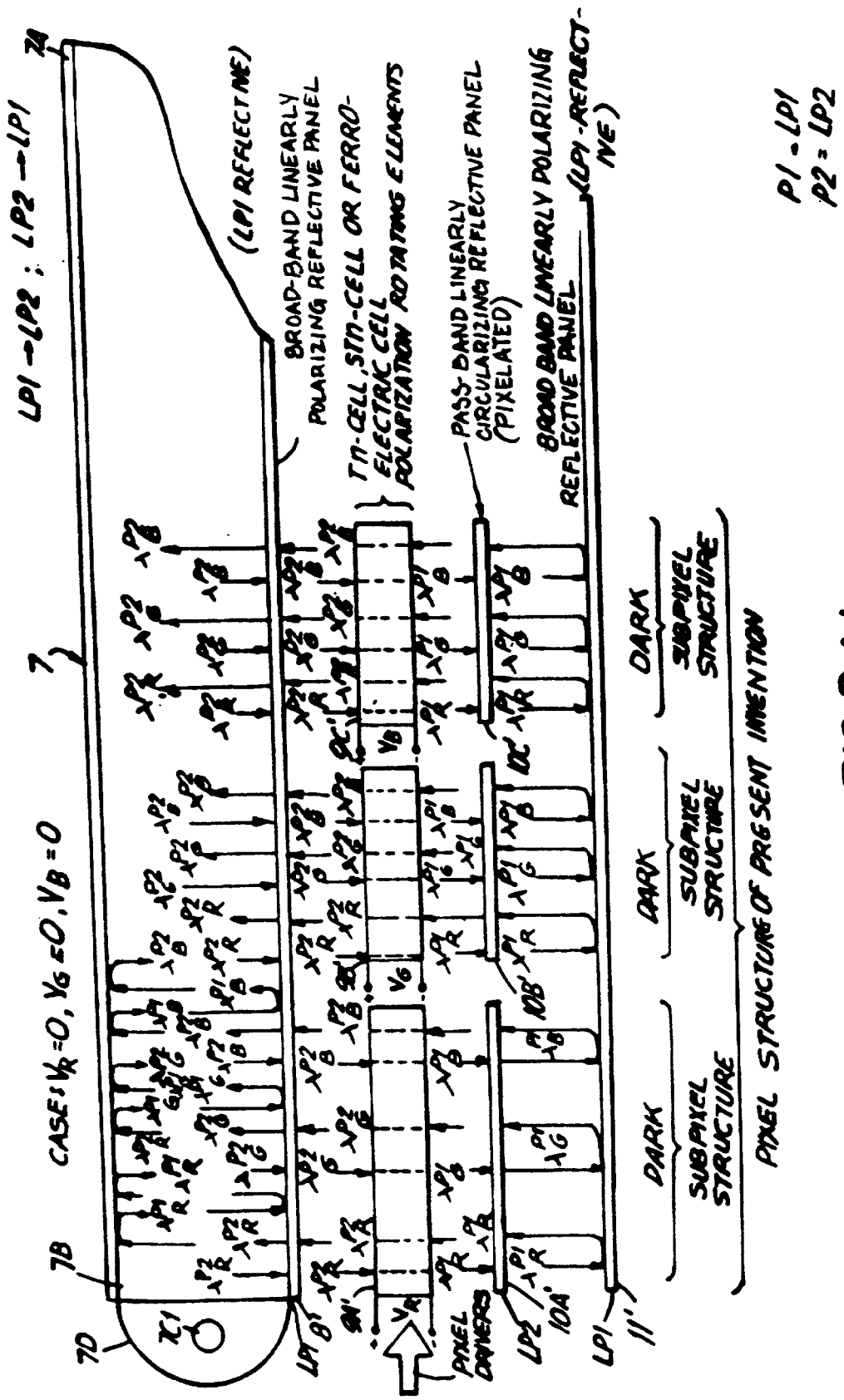
FIG. 3A1

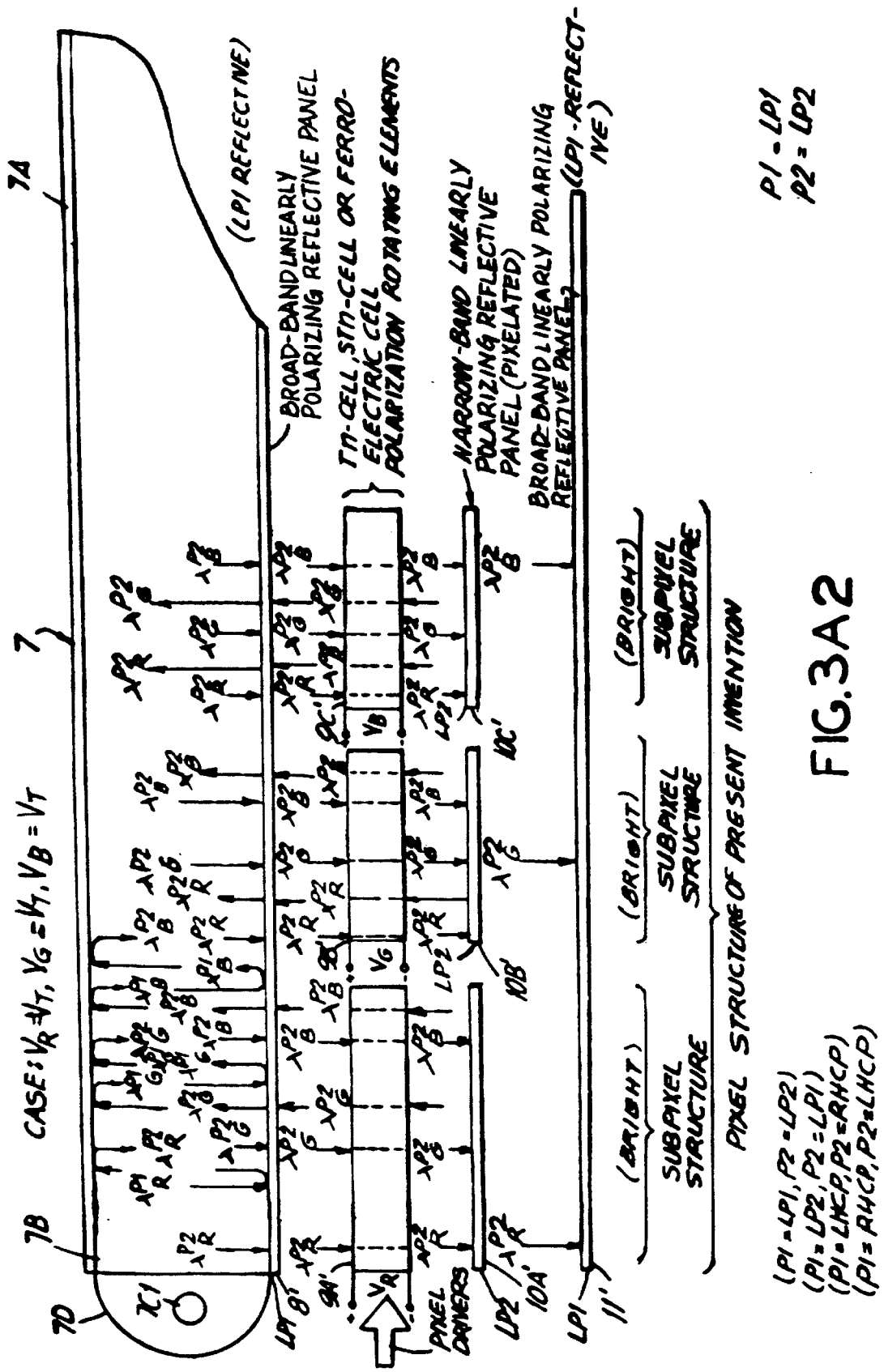

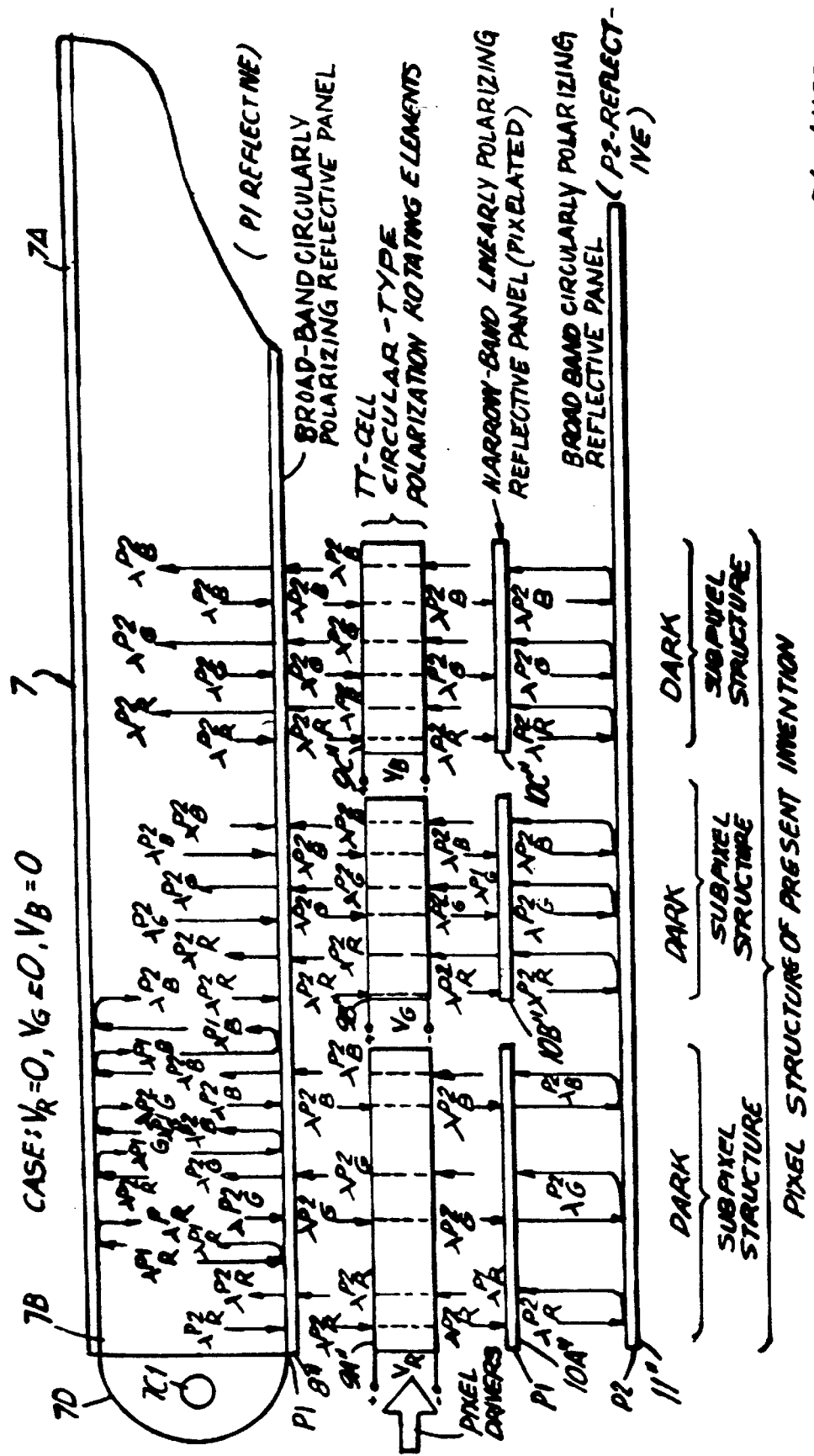
FIG. 4A1

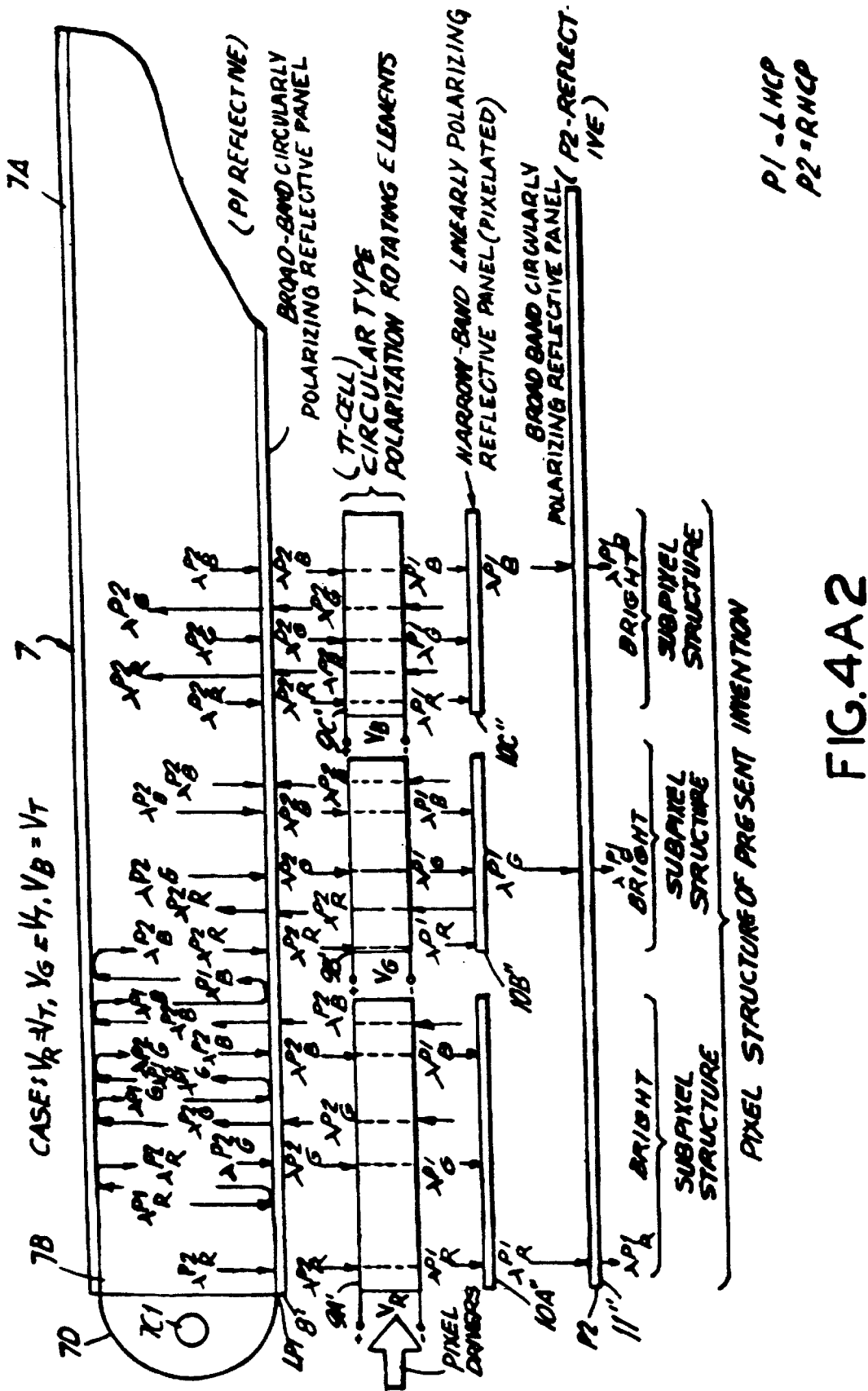
FIG.4A2

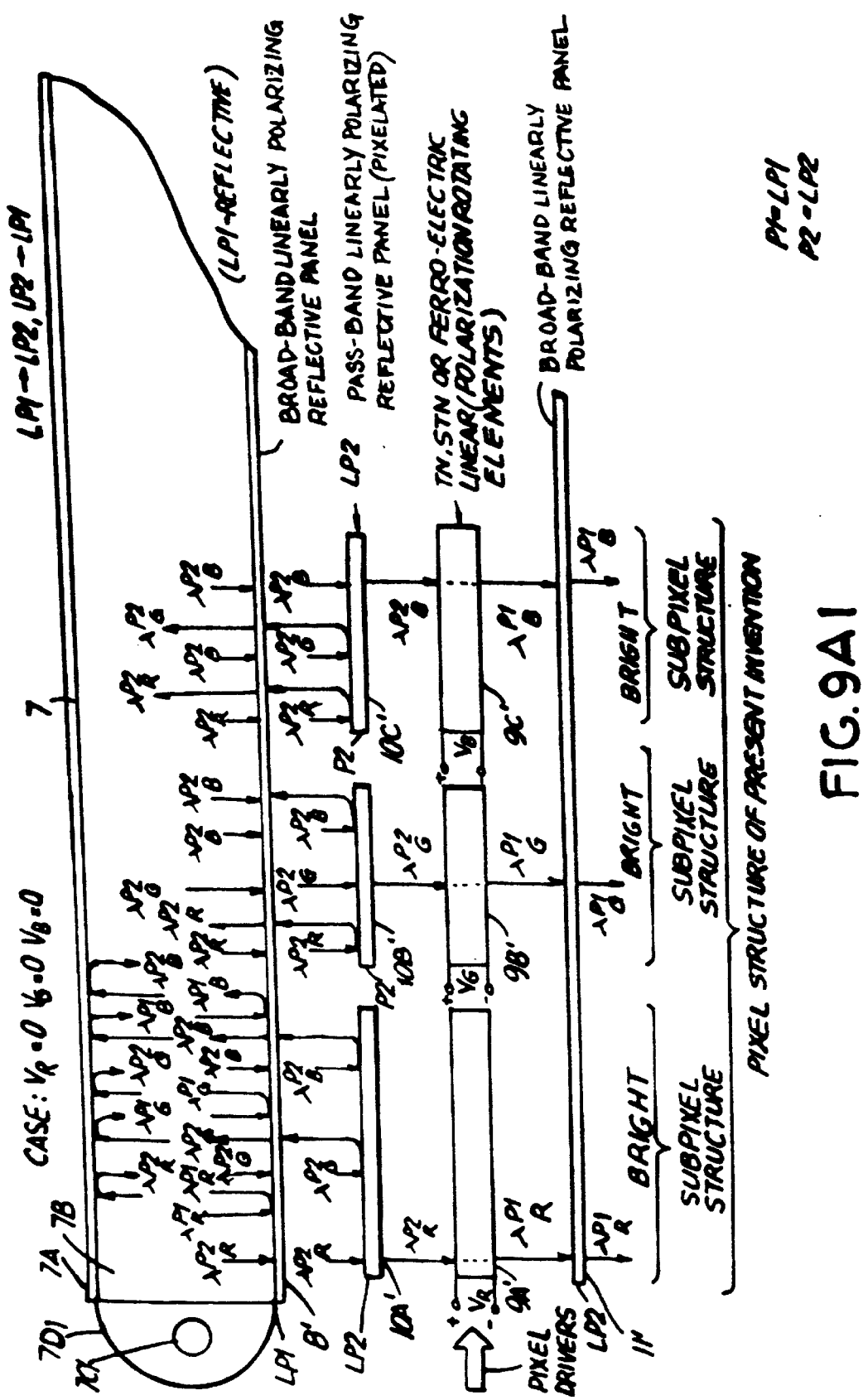
FIG. 9A1

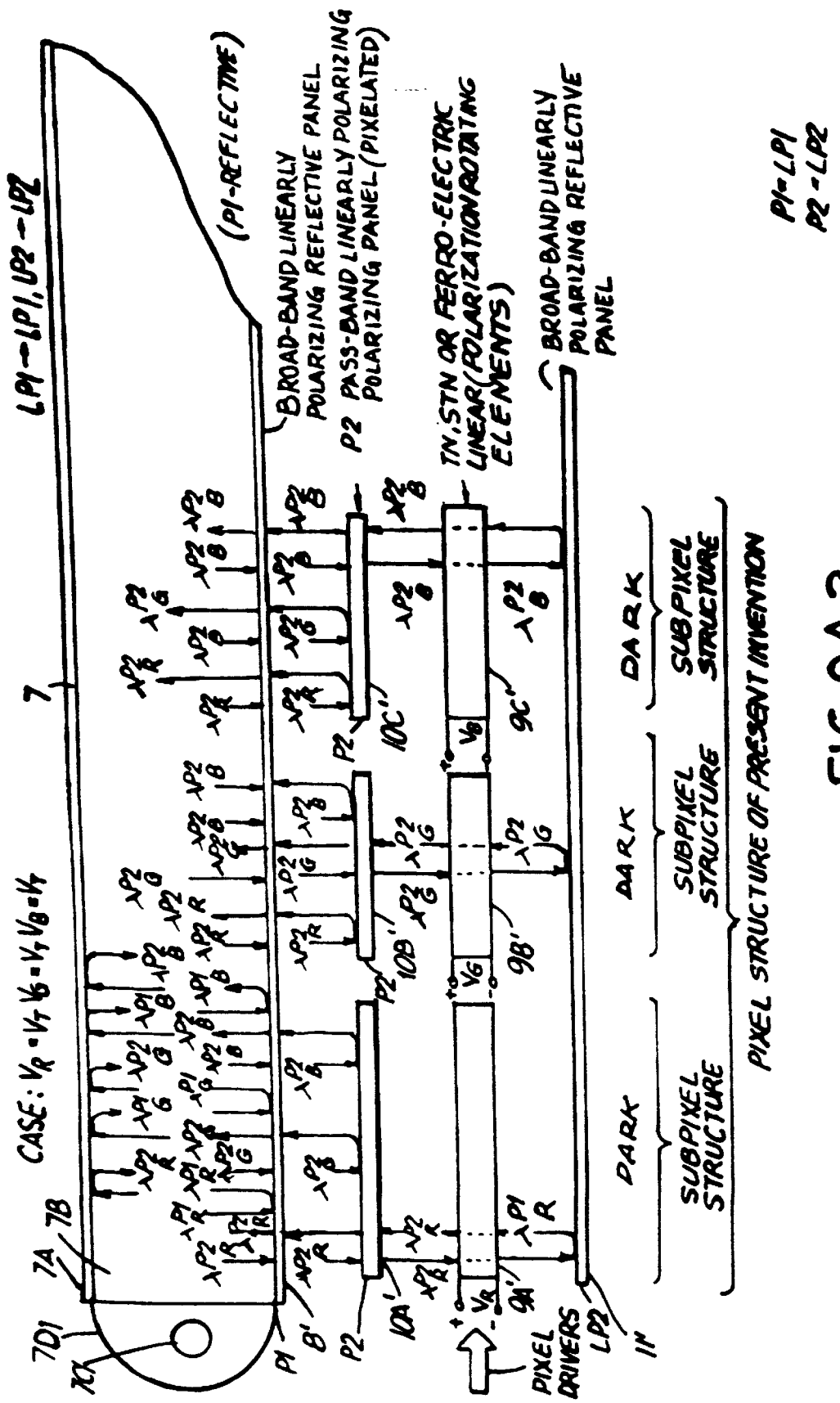
FIG. 9A2

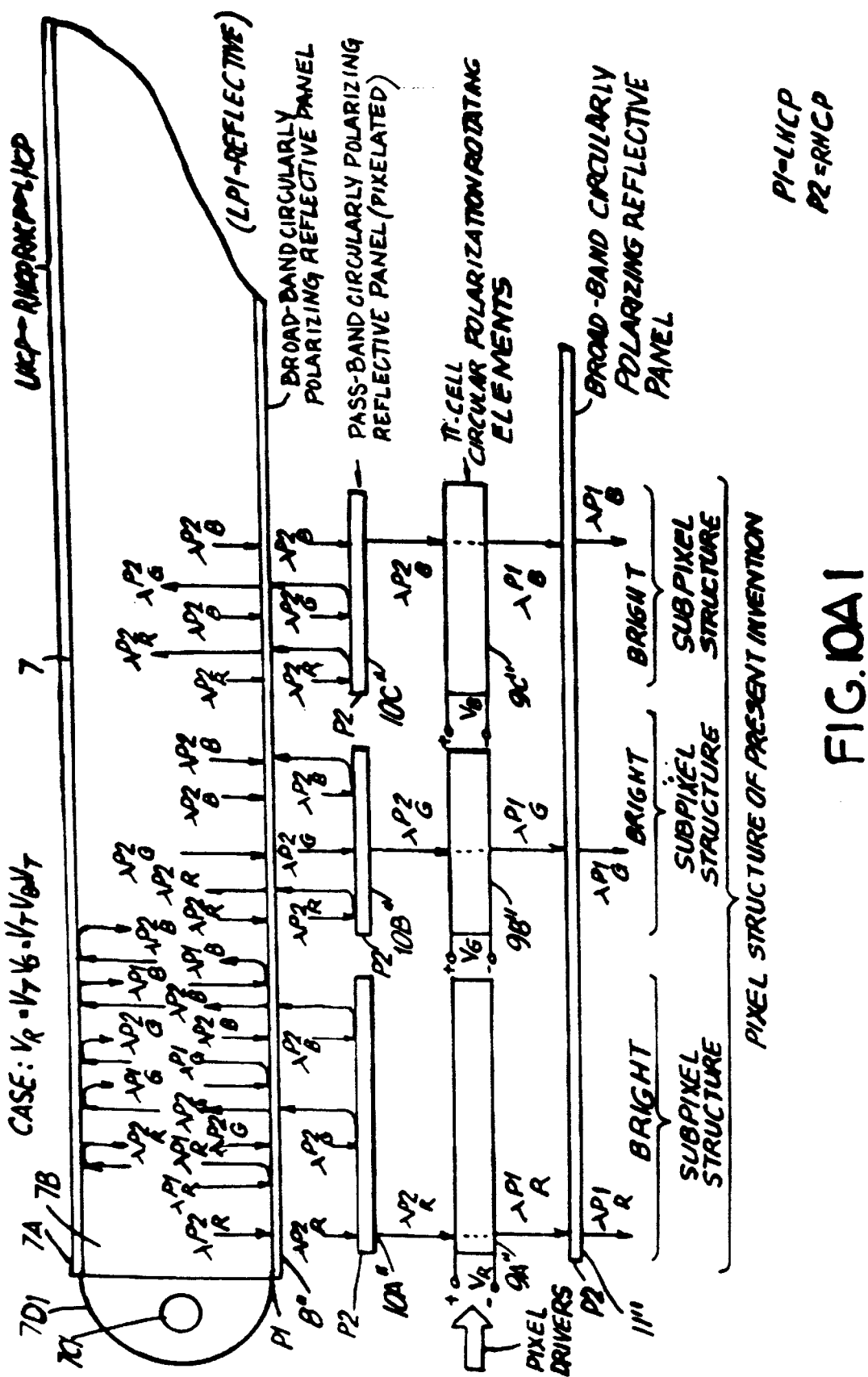
FIG. 10A1

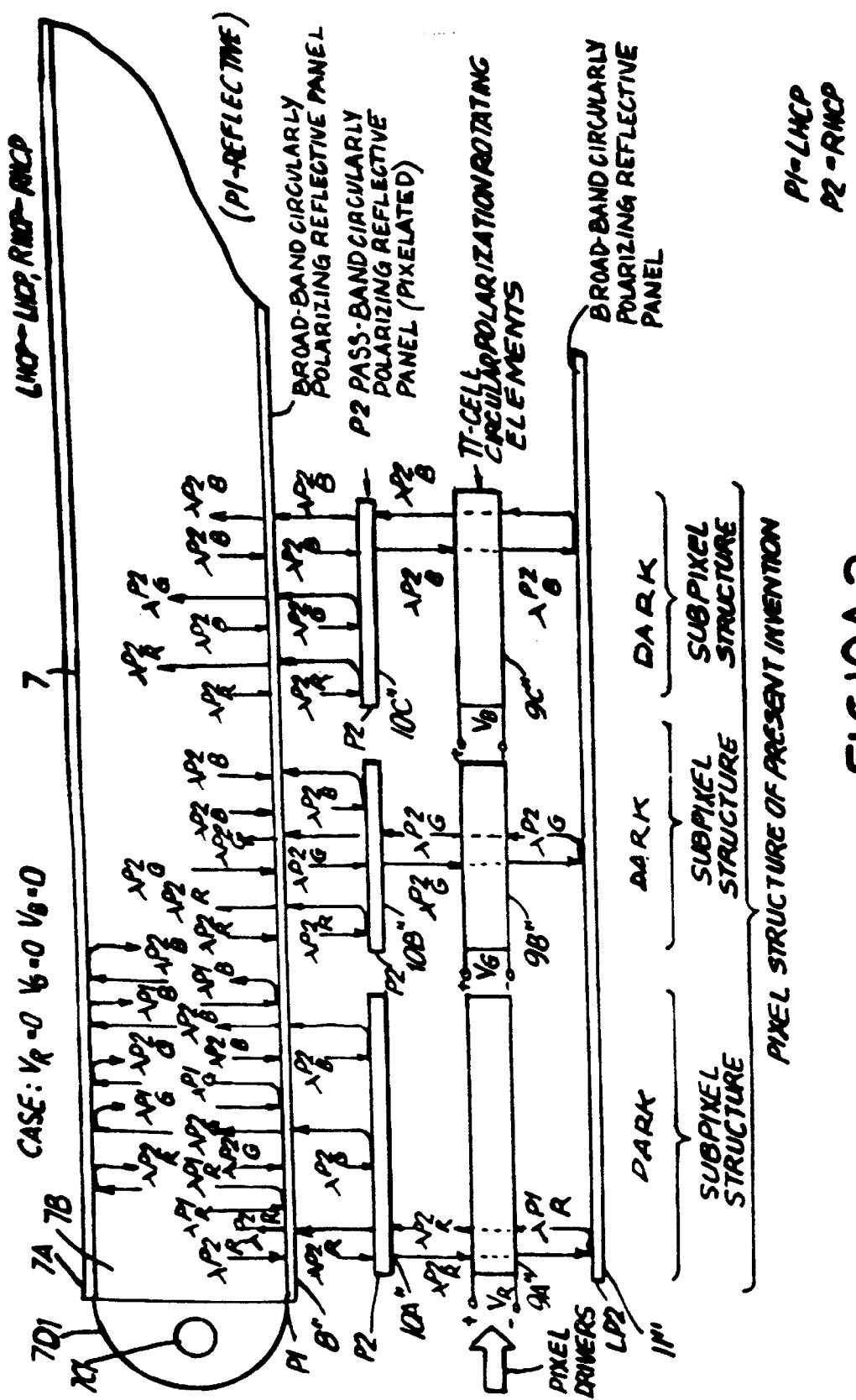

IMAGE DISPLAY PANEL EMPLOYING A BROAD-BAND POLARIZING/REFLECTIVE BACKLIGHTING STRUCTURE AND A PIXELATED ARRAY OF REFLECTIVE-TYPE OF FILTERING ELEMENTS

RELATED CASES

This Application is a National Phase Entry Application of International Application PCT/US97/16907 filed Sep. 16, 1997, which is a Continuation-in-Part of application Ser. No. 08/715,314, filed Sep. 16, 1996, now U.S. Pat. No. 6,188,460.

BACKGROUND OF INVENTION

1. Technical Field

The present invention relates to a high-brightness color liquid crystal display (LCD) panel with improved image contrast employing non-absorptive spectral filtering, light recycling among neighboring subpixels and ambient glare reduction, and also to methods and apparatus for manufacturing the same.

2. Brief Description of the Prior Art

Without question, there is a great need for flat display panels capable of displaying video imagery in both direct and projection modes of viewing. Examples of equipment requiring such display structures for direct viewing include notebook computers, laptop computers, and palmtop computers, and equipment requiring such display structures for projection viewing include LCD projection panels and LCD image projectors.

In general, prior art color LCD display panels have essentially the same basic construction in that each comprises the following basic components, namely: a backlighting structure for producing a plane of uniform intensity backlighting; and electrically-addressable array of spatial-intensity modulating elements for modulating the spatial intensity of the plane of backlight transmitted therethrough; and an array of color filtering elements in registration with the array of spatial-intensity modulating elements, for spectral filtering the intensity modulated light rays transmitted therethrough, to form a color image for either direct or projection viewing. Examples of such prior art LCD panel systems are described in "A Systems Approach to Color Filters for Flat-Panel Displays" by J. Hunninghake, et al, published in SID 94 DIGEST (pages 407–410), incorporated herein by reference.

In color LCD panel design, the goal is to maximize the percentage of light transmitted from the backlighting structure through the color filtering array. However, using prior art design techniques, it has been impossible to achieve this design goal due to significant losses in light transmission caused by the following factors, namely: absorption of light energy due to absorption-type polarizers used in the LCD panels; absorption of light reflected off thin-film transistors (TFTs) and wiring of the pixelated spatial intensity modulation arrays used in the LCD panels; absorption of light by pigments used in the spectral filters of the LCD panels; absorption of light energy by the black-matrix used to spatially separate the subpixel filters in the LCD panel in order to enhance image contrast; and Fresnel losses due to the mismatching of refractive indices between layers within the LCD panels. As a result of such design factors, the light transmission efficiency of prior art color LCD panels is typically no more than 5%. Consequently, up to 95% of the light produced by the backlighting structure is converted into heat across the LCD panel. Thus, it is impossible to produce high brightness images from prior art color LCD panels used in either direct or projection display systems without using ultra-high intensity backlighting sources which require high power supplies, and produce great amounts of heat necessitating cooling measures and the like.

In response to the shortcomings and drawbacks of prior art color LCD panel designs, several alternative approaches have been proposed in order to improve the light transmission efficiency of the panel and thus the brightness of images produced therefrom.

For example, U.S. Pat. No. 5,325,218 to Willett et al. discloses an LCD panel which uses tuned cholesteric liquid crystal (CLC) polarizers to replace absorptive dyed (neutral or dichroic) polarizers of prior art LCD panels to improve color purity, and a partial (i.e. local) light recycling scheme in order to improve the brightness of the LCD panel.

U.S. Pat. No. 5,418,631 to Tedesco also discloses an LCD panel which uses a holographic diffuser for directing light out from the light guiding panel of the backlighting panel structure, and CLC polarizers for locally recycling light diffused by the holographic diffuser in order to improve the brightness of the LCD panel.

U.S. Pat. No. 5,650,865 to Smith discloses a holographic backlight structure for an LCD panel, wherein a phase-retardation film layer is mounted on the first surface of a light pipe for the purpose of converting p-polarized light back into diffracted s-polarized light so that it is recycled (i.e. reused) by a hologram doublet (i.e. a reflection hologram and a transmission hologram) mounted on the opposite surface of the light pipe, thereby increasing the overall efficiency of the LCD panel assembly.

However, such prior art color LCD panel designs are not without shortcomings and drawbacks.

In particular, notwithstanding the use of non-absorptive CLC filters and localized light recycling principles, prior art LCD panels continue to require at least one light absorptive layer along the optical path extending from the backlighting structure to the viewer (i.e. along the light projection axis). Consequently, prior art LCD panels have very low light transmission efficiencies. Thus the production of high brightness color images from prior art color LCD panels has required high-intensity backlighting sources which consume great amounts of electrical power and produce high quantities of heat, and necessitate the use of fans and other cooling measures to maintain the temperature of both the LCD panel and the lamp(s) in the backlight structure within safe operating limits.

Thus, there is a great need in the art for an improved color LCD panel which is capable of producing high brightness color images without the shortcomings and drawbacks of the prior art LCD panel devices.

OBJECTS AND SUMMARY OF THE PRESENT INVENTION

Accordingly, a primary object of the present invention is to provide an improved color LCD panel capable of producing high brightness color images, while avoiding the shortcomings and drawbacks of prior art techniques.

Another object of the present invention is to provide such a color LCD panel, in which the spatial-intensity modulation and spectral (i.e. color) filtering functions associated with each and every subpixel structure of the LCD panel are carried out using systemic light recycling principles which virtually eliminate any and all absorption or dissipation of the spectral energy produced from the backlighting structure during color image production.

Another object of the present invention is to provide such a color LCD panel, in which image contrast enhancement is achieved through the strategic placement of broad-band absorptive-type polarization panels within the LCD panel.

Another object of the present invention is to provide such a color LCD panel, in which glare due to ambient light is reduced through the strategic placement of a broad-band absorptive-type polarization panel within the LCD panel.

Another object of the present invention is to provide such a color LCD panel, in which a single polarization state of light is transmitted from the backlighting structure to the section of the LCD panel along the projection axis thereof, to those structure or subpanels where both spatial intensity and spectral filtering of the transmitted polarized light simultaneously occurs on a subpixel basis in a functionally integrated manner. At each subpixel location, spectral bands of light which are not transmitted to the display surface during spectral filtering, are reflected without absorption back along the projection axis into the backlighting structure where the polarized light is recycled with light energy being generated therewith. The recycled spectral components are then retransmitted from the backlighting structure into section of the LCD panel where spatial intensity modulation and spectral filtering of the retransmitted polarized light simultaneously reoccurs on a subpixel basis in a functionally integrated manner.

Another object of the present invention is to provide such a color LCD panel, in which the spatial-intensity modulation and spectral filtering functions associated with each and every subpixel structure of the LCD panel are carried out using the polarization/wavelength dependent transmission and reflection properties of CLC-based filters.

Another object of the present invention is to provide such a color LCD panel having a multi-layer construction with multiple optical interfaces, at which non-absorbing broad-band and pass-band (i.e. tuned) polarizing reflective panels are used to carryout systemic light recycling within the LCD panel such that light produced from the backlighting structure is transmitted through the LCD panel with a light transmission efficiency of at least %90.

A further object of the present invention is to provide a novel LCD panel, in which both non-absorbing broad-band and pass-band (i.e. tuned) polarizer filters are used to avoid absorbing or dissipating any of the spectral energy produced from the backlighting structure during image production in order that high-brightness image can be produced using low-intensity backlighting structures.

Another object of the present invention is to provide such a color LCD panel, in which an array of pass-band CLC polarizing filter elements and an array of electrically-controlled liquid crystal elements are disposed between a pair of broad-band CLC polarizing filter panels used to realize the LCD panel.

Another object of the present invention is to provide such a color LCD panel, in which the spectral components of light produced from the backlighting structure are recycled (i) between the spectral filtering array and the backlighting structure, (ii) within the backlighting structure itself, and (iii) among adjacent subpixels within the LCD panel in order to improve the overall light transmission efficiency of the LCD panel.

Another object of the present invention is to provide such a color LCD panel, in which the array of liquid crystal elements can be realized using an array of electrically-controlled birefringent (ECB) elements which rotate the linear polarization state of the transmitted light, or invert the polarization state of circularly polarized light being transmitted through the LCD panel.

Another object of the present invention is to provide such a color LCD panel, in which the backlight structure thereof can be realized using a light guiding panel based on the principle of total internal reflection, a holographic diffuser based on the principle of refractive index matching and first order diffraction, or other suitable edge-lit backlighting structure which follows in general accordance with the physical principles of the present invention.

These and other objects of the present invention will become apparent hereinafter and in the Claims to Invention.

BRIEF DESCRIPTION OF THE DRAWINGS

For a more complete understanding of the Objects of the Present Invention, the following Detailed Description of the Illustrative Embodiments should be read in conjunction with the accompanying drawings, wherein:

FIG. 3A1 is a schematic representation of an exploded, cross-sectional view of an exemplary pixel structure within a first particular embodiment of the LCD panel shown in FIG. 2, wherein the spatial-intensity modulating elements of the LCD panel are realized using linear-type polarizing rotating elements, and the pixel driver signals provided thereto are selected to produce "dark" output levels at each of the RGB subpixels of the exemplary pixel structure;

FIG. 3A2 is a schematic representation of an exploded, cross-sectional view of an exemplary pixel structure within the first particular embodiment of the LCD panel shown in FIG. 2, wherein the spatial-intensity modulating elements of the LCD panel are realized using linear-polarization rotating elements, and the pixel driver signals provided thereto are selected to produce "bright" output levels at each of the RGB subpixels of the exemplary pixel structure;

FIG. 4A1 is a schematic representation of an exploded, cross-sectional view of an exemplary pixel structure within a second particular embodiment of the LCD panel shown in FIG. 2, wherein the spatial-intensity modulating elements of the LCD panel are realized using circular-type polarization rotating elements, and the pixel driver signals provided thereto are selected to produce "dark" output levels at each of the RGB subpixels of the exemplary pixel structure;

FIG. 4A2 is a schematic representation of an exploded, cross-sectional view of an exemplary pixel structure within the second particular embodiment of the LCD panel shown in FIG. 2, wherein the spatial-intensity modulating elements of the LCD panel are realized using circular-type polarization rotating elements, and the pixel driver signals provided thereto are selected to produce "bright" output levels at each of the RGB subpixels of the exemplary pixel structure;

FIG. 9A1 is a schematic representation of an exploded, cross-sectional view of an exemplary pixel structure within the LCD panel of FIG. 7, wherein the spatial-intensity modulating elements of the LCD panel are realized using linear-type polarization rotating elements, and the pixel driver signals provided thereto are selected to produce "bright" output levels at each of the RGB subpixels of the exemplary pixel structure;

FIG. 9A2 is a schematic representation of an exploded, cross-sectional view of an exemplary pixel structure within the particular embodiment of the LCD shown in FIG. 8, wherein the spatial-intensity modulating elements of the LCD panel are realized using linear-type polarization rotating elements, and the pixel driver signals provided thereto are selected to produce "dark" output levels at each of the RGB subpixels of the exemplary pixel structure;

FIG. 9E is a schematic representation graphically illustrating the reflection characteristics of the pass-band linearly polarizing (LP2) reflective filter element associated with each "red" subpixel of the LCD panel of FIGS. 9A1 and 9A2, indicating how such a non-absorbing spectral filter element responds to incident broad-band illumination having linear polarization state LP2;

FIG. 9A1 is a schematic representation of an exploded, cross-sectional view of an exemplary pixel structure within a second particular embodiment of the LCD panel of FIG. 8, wherein the spatial-intensity modulating elements of the LCD panel are realized using circular-type polarization rotating elements, and the pixel driver signals provided thereto are selected to produce "bright" output levels at each of the RGB subpixels of the exemplary pixel structure;

FIG. 10A1 is a schematic representation of an exploded, cross-sectional view of an exemplary pixel structure within the LCD panel of FIG. 7, wherein the spatial-intensity modulating elements of the LCD panel are realized using circular-type polarization rotating elements, and the pixel driver signals provided thereto are selected to produce "bright" output levels at each of the RGB subpixels of the exemplary pixel structure;

FIG. 10A2 is a schematic representation of an exploded, cross-sectional view of an exemplary pixel structure within the second particular embodiment of the LCD panel of FIG. 8, wherein the spatial-intensity modulating elements of the LCD panel are realized using circular-type polarization rotating elements, and the pixel driver signals provided thereto are selected to produce "dark" output levels at each of the RGB subpixels of the exemplary pixel structure;

BEST MODES OF CARRYING OUT THE PRESENT INVENTION

Figure 1A:
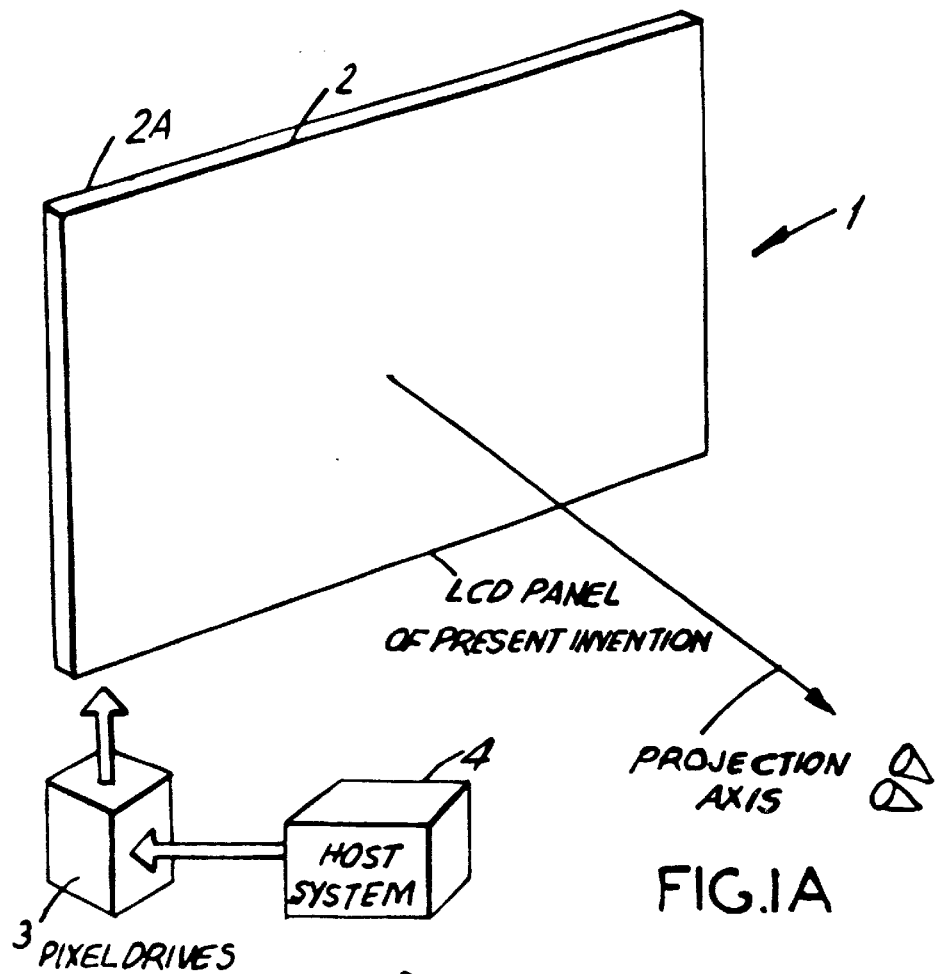
FIG. 1A is a schematic representation of a direct-view type image display system in which the LCD panel of the present invention is employed.

Referring now to the figures in the accompanying Drawings, the illustrative embodiments of the present invention will now be described in detail, wherein like structures and elements shown within the figures are indicated with like reference numerals.

Overview of the LCD Image Display System of Present Invention

As shown in FIG. 1A, the LCD panel of the present invention is shown as part of a direct-view type color image display system 1 which is capable of supporting displaying high-resolution color images. During operation, the LCD panel 2 is actively driven by pixel driver circuitry 3 in response to color image data sets produced from a host system 4 which can be a computer-graphics board (subsystem), a video source (e.g. VCR), camera, or like system. The function of the LCD panel 2 is to spatial intensity modulate and spectrally filter on a subpixel basis the light emitted from an edge-illuminated backlighting structure 2A which may be realized in a variety of ways. The optically processed pattern of light forms color images at the surface of the LCD panel for direct viewing.

Figure 1B:
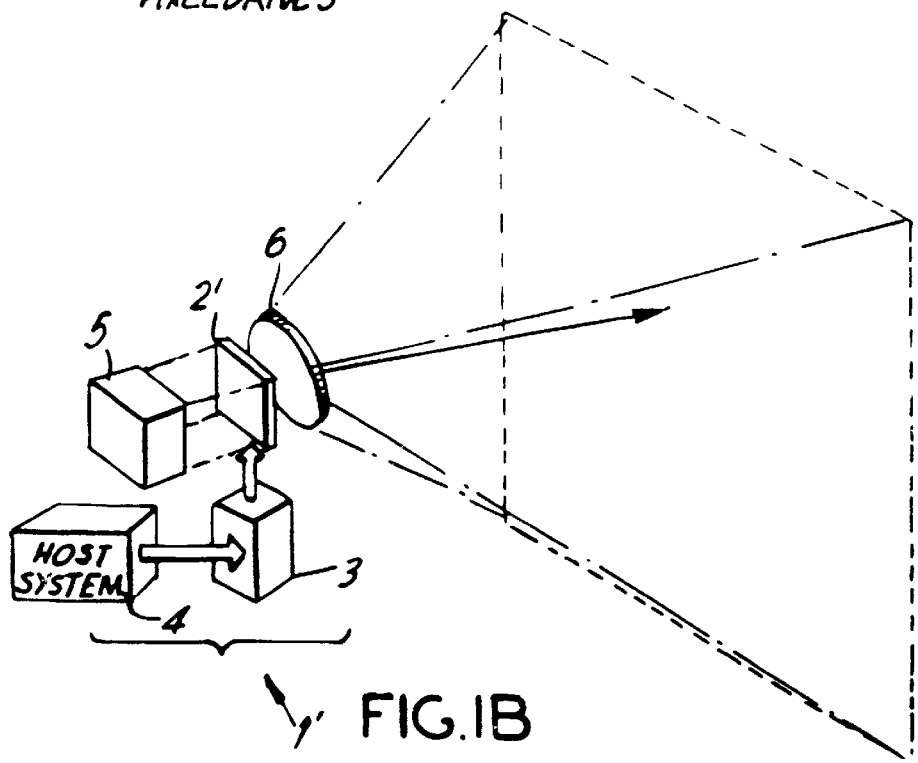
FIG. 1B is a schematic representation of a projection-view type image display system in which the LCD panel of the present invention is employed.

As shown in FIG. 1B, the LCD panel of the present invention 2' is shown as part of a projection-view type color image display system 1' which is capable of supporting displaying high-resolution color images. During operation, the LCD panel 2' is actively driven by pixel driver circuitry 3 in response to color image data sets produced from host system 4 which can be a computer-graphics board (subsystem), a video source (e.g. VCR), camera, or like system. The function of light source 5 is to produce and project a beam of light through the entire extent of the LCD panel. The function of the LCD panel is to spatial intensity modulate and spectrally filter the projected light on a sub-pixel basis. The optically processed pattern of light forms color images at the surface of the LCD panel which are then projected by projection optics 6 onto a remote display surface (e.g. screen or wall) for projection viewing.

The systems shown in FIGS. 1A and 1B are each designed to support monoscopic viewing of color images representative of 2-D and/or 3-D geometry. However, these image display systems can be readily adapted to support stereoscopic viewing of 3-D objects and scenery of either a real and/or synthetic nature. One way of providing such viewing capabilities is to mount (i.e. laminate) a micropolarization panel upon the display surface of the LCD panels 2 and 2' in order to display micropolarized spatially multiplexed images (SMIs) of 3-D objects and scenery, for viewing through electrically-passive polarizing eyeglasses, as disclosed in U.S. Pat. No. 5,37,144 and International Application Serial No. PCT/US97/03985, incorporated herein by reference.

Figure 2:
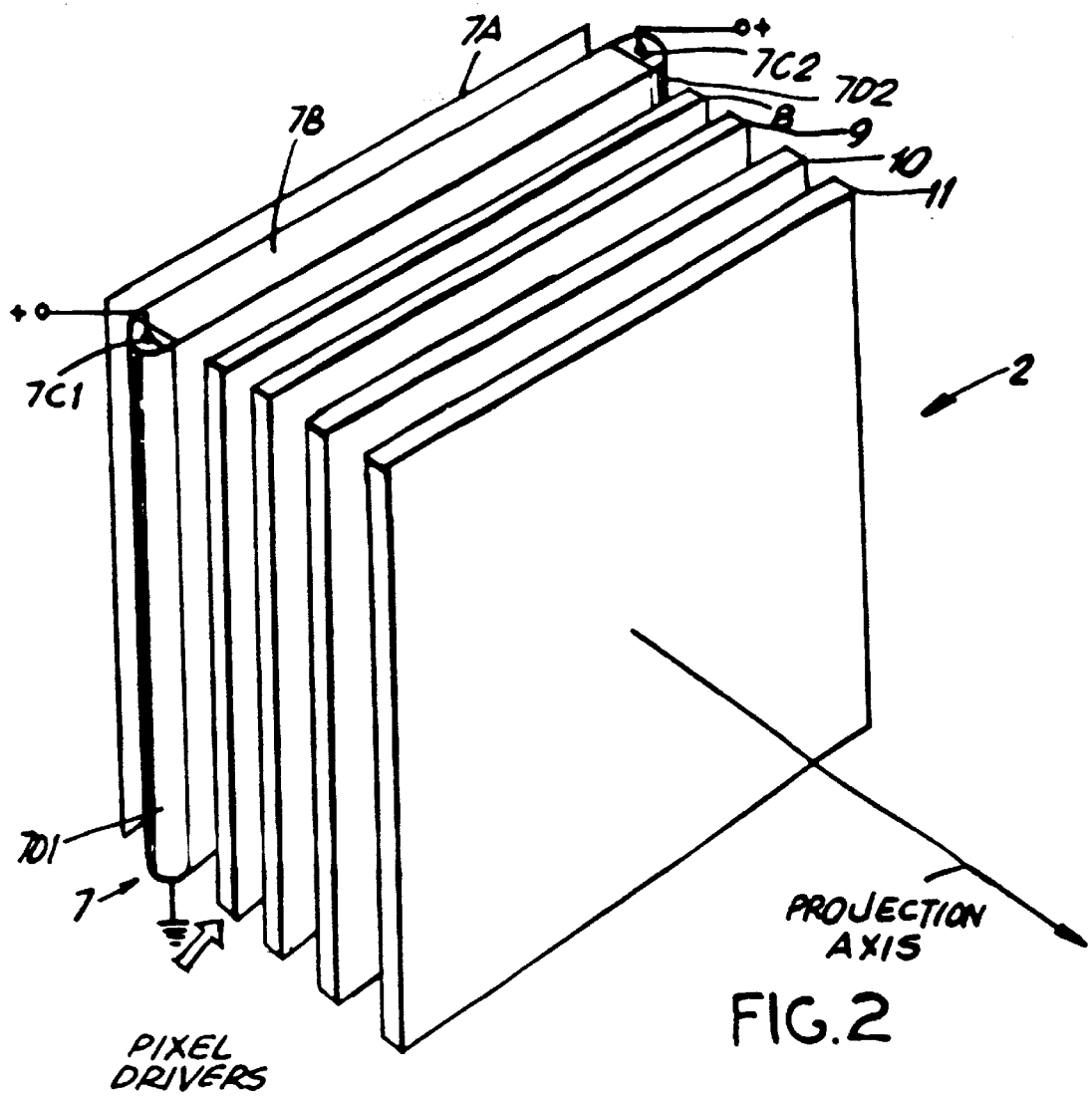
FIG. 2 is an exploded schematic diagram of the first generalized LCD panel construction of the present invention, comprising (i) its backlighting structure realized by a quasi-specular reflector, a light guiding panel, a pair of edge-illuminating light sources, and broad-band polarizing reflective panel, (ii) its spatial-intensity modulating array realized as an array of electronically-controlled polarization direction rotating elements, and (iii) its array of spectral filtering elements realized as an array of pass-band polarizing reflective elements and a broad-band linearly polarizing reflective panel.

In FIG. 2, the subcomponent structure of the first generalized embodiment of the LCD panel hereof is shown in great clarity. As shown, the first generalized embodiment of the LCD panel 2 comprises: a backlighting structure 7 including a quasi-diffusive reflector 7A, for producing a plane of broad-band light having a substantially uniform light intensity over the x and y coordinate axes thereof; a broad-band polarizing reflective panel 8; a pixelated array of polarization direction rotating elements 9 for spatial intensity modulation of light produced from the backlighting structure; a pixelated array of polarizing reflective spectral filter elements 10, for spectral filtering of light produced from the backlighting structure; and a broad-band polarizing reflective panel 11 for cooperative operation with the pixelated array of polarization direction rotating elements 9 and the pixelated array of polarizing reflective spectral filter elements 10. In an alternative embodiment, a broad-band absorptive-type panel can be substituted for broad-band polarizing reflective panel 11 in order to reduce glare due to ambient light incident upon the LCD panel during operation.

Figure 2A:
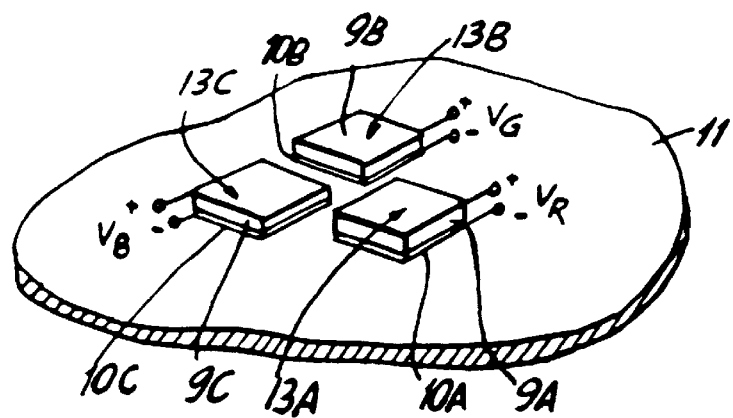
FIG. 2A is a perspective, partially broken away view of a portion of the LCD panel of FIG. 2, showing the electronically-controlled polarization rotating elements associated with a pixel structure thereof.

In order to produce high-resolution color images, the spatial period of the pixelated arrays 9 and 10 is selected to be relatively small in relation to the overall length and height dimensions of the LCD panel. In a conventional manner, each pixel structure in the LCD panel is comprised of a red subpixel 13A, a green subpixel 13B and blue subpixel 13C, as illustrated in FIG. 2A. As shown therein, each red subpixel structure 13A comprises a red-band polarizing reflective spectral filtering element 10A which is spatially registered with a first polarization direction rotating element 9A. Each green subpixel structure 13B comprises a green-band polarizing reflective spectral filtering element 10B spatially registered with a second polarization direction rotating element 9B. Each blue subpixel element 13C comprises a blue-band polarizing reflective spectral filtering element 10C spatially registered with a third polarization direction rotating element 9C. The output intensity (i.e. brightness or darkness level) of each red subpixel structure is controlled by applying pulse-width modulated voltage signal $V_R$ to the electrodes of its electrically-controlled spatially intensity modulating element. The output intensity of each green subpixel structure is controlled by applying pulse-width modulated voltage signal $V_G$ to the electrodes of its electrically-controlled spatially intensity modulating element. The output intensity of each blue subpixel structure is controlled by providing pulse-width modulated voltage signal $V_B$ applied to the electrodes of its electrically-controlled spatially intensity modulating element. By simply controlling the width of the above-described voltages $V_R$, $V_G$, $V_B$, the grey-scale intensity (i.e. brightness) level of each subpixel structure can be controlled in a manner well known in the LCD panel art.

Figure 3B:
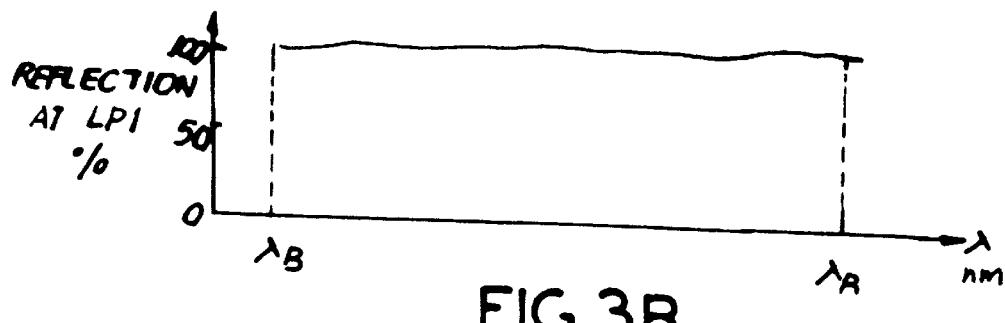
FIG. 3B is a schematic representation graphically illustrating the reflection characteristics of the first broad-band linearly polarizing (LP1) reflective panel of the LCD panel of FIGS. 3A1 and 3A2, indicating how such a broad-band linearly polarizing reflective panel responds to incident illuminating having linear polarization state LP1.

Overview of the First Generalized Embodiment of the LCD Panel Construction of the Present Invention In the first generalized LCD panel construction shown in FIG. 2, spectral filtering occurs after spatial intensity modulation. In the first illustrative embodiment of this LCD panel construction shown in FIGS. 3A1 and 3A2, linear polarization techniques are used to carry out the spatial intensity modulation and spectral filtering functions employed therein. In the second illustrative embodiment of this LCD panel construction shown in FIGS. 4A1 and 4A2, circular polarization techniques are used to carry out the spatial intensity modulation and spectral filtering functions employed therein. In each such illustrative embodiment, modifications will be made among the various components of the LCD panel shown in FIG. 2. Details regarding such modifications will be described hereinafter.

First Illustrative Embodiment of the LCD Panel Construction of FIG. 2

In the illustrative embodiments shown in FIGS. 3A1 and 3A2, the backlighting structure 7 is realized by quasi-diffusive reflector 7A, a light guiding panel 7B, a pair of edge-illuminating light sources 7C1 and 7C2, and a pair of focusing mirrors 7D1 and 7D2, respectively, for coupling light produced by light sources 7C1 and 7C2 into the edges of light guiding panel 7B. Preferably, the light guiding panel 7B is made from an optically transparent substrate such as Plexiglass® acrylic, and light sources 7C1 and 7C2 are realized by a pair of miniature fluorescent tubes which produce unpolarized light.

During backlight operation, light produced by sources 7C1 and 7C2 is coupled with the help of focusing mirrors 7D1 and 7D2 into the edges of the light guiding panel 7B where it is totally internally reflected in a conventional manner. In the illustrative embodiment the front surface of the light guiding panel 7B bears very fine pits in order to create optical conditions at the surface thereof which destroys conditions for total internal reflection and allows light to leak out in the direction of the array of spatial intensity modulating elements. Understandably, there are many alternative techniques for producing a plane of unpolarized light that can be used in the construction of any particular embodiment of the LCD panel of the present invention.

For purposes of illustration only, the spectral filtering function realized within each LCD panel of the illustrative embodiments is based on the RGB (red, green, blue) additive primary color system. Alternatively, however, the spectral filtering function within each LCD panel may be based on the CMY (cyan, magenta, yellow) subtractive primary color system.

In the illustrative embodiments of the LCD panel hereof, the emission spectrum of the light source within the backlighting panel is assumed to be "white", and the spectral filtering function of the LCD panel is based on the RGB color system. Thus, each polarizing reflective spectral filter element 10A, 10B, 10C is designed to have "pass-and" characteristics so that all of the spectral content of the red, green and blue bands of the light source are used to produce color images for display. In such illustrative embodiments, each polarizing reflective spectral filter element 10A, 10B and 10C is realized as a "pass-band" polarizing reflective spectral filter element.

Figure 3C:
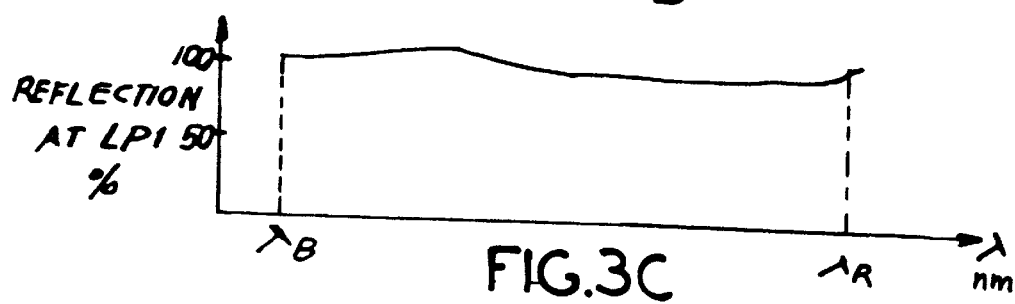
FIG. 3C is a schematic representation graphically illustrating the reflection characteristics of the second broad-band linearly polarizing (LP1) reflective panel of the LCD panel of FIGS. 3A1 and 3A2, indicating how such a broad-band linearly polarizing reflective panel responds to incident illuminating having linear polarization state LP1.

However, in other embodiments of the LCD panel hereof, the light source within its backlighting structure may emit a "narrow-band" spectra over the red, green and blue bands of the optical spectrum. In such alternative embodiments of the LCD panel, the pixelated array of polarizing reflective spectral filter elements can be tailored to overlap the RGB emission spectra. In such alternative embodiments, each polarizing reflective spectral filter element 10A, 10B and 10C can be realized as a "narrow-band" polarizing reflective spectral filter element In the illustrative embodiment of FIGS. 3A1 and 3A2, the broad-band linearly polarizing reflective panel 8' has a characteristic linear polarization state LP1 which serves as a polarization reference. Similarly, broad-band linear polarizing reflective panel 11' has a characteristic linear polarization state LP1. The reflection characteristics of the broad-band linearly polarizing reflective panel 8' are graphically illustrated in FIG. 3B for incident light having linear polarization state LP1, whereas the reflection characteristics of the broad-band linearly polarizing reflective panel 11' are graphically illustrated in FIG. 3C for incident light having linear polarization state LP1. For incident light having orthogonal linear polarization state LP2, the broad-band transmission characteristics for these panels are substantially uniform for all wavelengths over the optical band.

In the illustrative embodiments of the LCD panel hereof, each "pass-band" polarizing reflective spectral filter element in pixelated array 10' and broad-band linearly polarizing reflective panels 8' and 11' are realized using cholesteric liquid crystal (CLC) material of the type disclosed in International Application Number PCT/US96/17464 entitled "Super Broad-band Polarizing Reflective Material" published under International Publication Number WO 97/16762, incorporated herein by reference in its entirety. The polarizing reflective properties of such CLC material is described in detail in Applicant's U.S. Pat. No. 5,221,982, incorporated herein by reference.

A preferred method of making the broad-band linearly polarizing reflective panel 8' and 11' is disclosed in great detail in International Application Number PCT/US96/17464 entitled "Super Broad-band Polarizing Reflective Material", supra. An alternative method of making broad-band linearly polarizing reflective panels 8' and 11' is disclosed in EPO Application No. 94200026.6 entitled "Cholesteric Polarizer and Manufacture Thereof", incorporated herein by reference.

In the illustrative embodiment of FIGS. 3A1 and 3A2, the polarization rotating array 9 is realized as an array of electronically-controlled linear polarization rotating elements 9' for rotating the linearly polarized electric field along LP1 to the LP2 polarization direction as the light rays are transmitted through the spatially corresponding pixels in the LCD panel. In the illustrative embodiment of FIGS. 3A1 and 3A2, each electronically-controlled linear polarization rotating element can be realized as a twisted nematic (TN) liquid crystal cell, super-twisted nematic (STN) liquid crystal cell, or ferro-electric cell, whose operation is by controlled by a control voltage well known in the art. To construct the linear polarization rotating elements, thin film transistors (TFTs) can be used to create the necessary voltages across a layer of liquid crystal material to achieve alignment of the liquid crystal molecules and thus cause the corresponding element to not rotate the polarization direction of transmitted light passing therethrough. In its electrically-inactive state (i.e. no voltage is applied), the electric field intensity of light exiting from the cell is substantially zero and thus a "dark" subpixel level is produced. In its electrically-active state (i.e. the threshold voltage $V_T$ is applied), the electric field intensity of light exiting from the cell is substantially non-zero and thus a "bright" subpixel level is produced.

In the illustrative embodiment of FIGS. 3A1 and 3A2 the pixelated array of spectral filtering elements 10 is realized as an array of pass-band linearly polarizing reflective elements 10' formed within a single plane. Broad-band linearly polarizing reflective panel 11' is laminated to the pixelated array of spectral filtering elements 10. As indicated in FIGS. 3A1 and 3A2, each pass-band linearly polarizing reflective element in the pixelated pass-band linearly polarizing panel 10' has a LP2 characteristic polarization state, whereas the broad-band linear polarizing reflective panel has an LP1 characteristic polarization state.

Figure 3D:
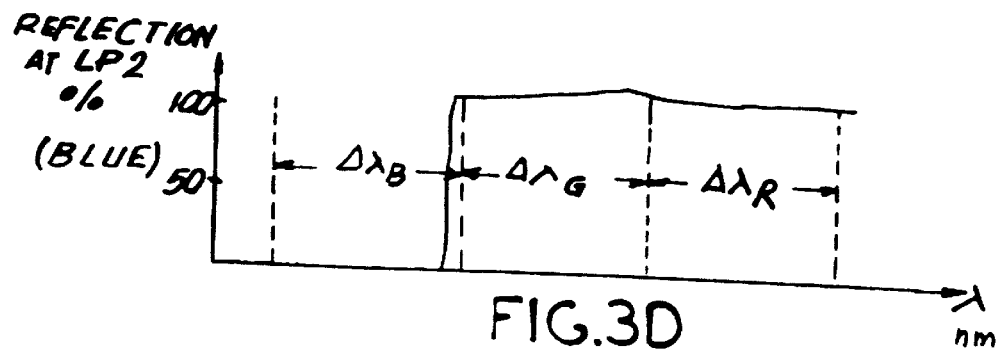
FIG. 3D is a schematic representation graphically illustrating the reflection characteristics of the pass-band linearly polarizing (LP2) reflective filter element associated with each "blue" subpixel of the LCD panel of FIGS. 3A1 and 3A2, indicating how such a non-absorbing spectral filter element responds to incident broad-band illumination having linear polarization state LP2.

As shown in FIG. 3D, each pass-band linearly polarizing reflective element associated with a "blue" subpixel in the pixelated pass-band linear polarizing panel 10' is particularly designed to reflect nearly 100% all spectral components having the LP2 characteristic polarization state and a wavelength within the green reflective band $\Delta\lambda_G$ or the red reflective band $\Delta\lambda_R$, whereas all spectral components having the LP2 characteristic polarization state or a wavelength within the blue reflective band $\Delta\lambda_B$ are transmitted nearly 100% through the pass-band polarizing reflective element. The manner in which the pass-band polarizing reflective element 10C' associated with each "blue" subpixel is "tuned" will be described hereinafter with reference to the method of LCD panel fabrication illustrated in FIGS. 5, 6, 7A through 7C.

Figure 3E:
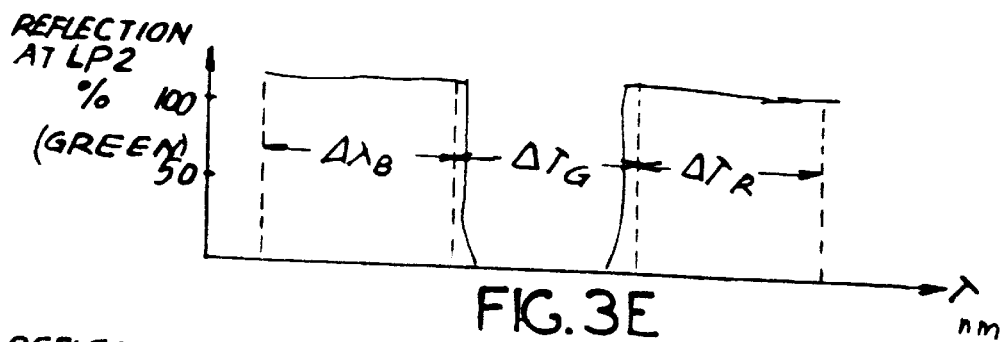
FIG. 3E is a schematic representation graphically illustrating the reflection characteristics of the pass-band linearly polarizing (LP2) reflective filter element associated with each "green" subpixel of the LCD panel of FIGS. 3A1 and 3A2, indicating how such a non-absorbing spectral filter element responds to incident broad-band illumination having linear polarization state LP2.

As shown in FIG. 3E, each pass-band polarizing reflective element associated with a "green" subpixel in the pixelated pass-band linear polarizing panel 10' is particularly designed to reflect nearly 100% all spectral components having the LP2 characteristic polarization state and a wavelength within the red reflective band $\Delta\lambda_R$ or the blue reflective band $\Delta\lambda_B$, whereas all spectral components having the LP2 characteristic, polarization state or wavelength within the green reflective band $\Delta\lambda_G$ are transmitted nearly 100% through the pass-band polarizing reflective element. The manner in which the pass-band polarizing reflective element 10B' associated with each "green" subpixel is "tuned" will be described hereinafter with reference to the method of LCD panel fabrication illustrated in FIGS. 5, 6, 7A through 7C.

Figure 3F:
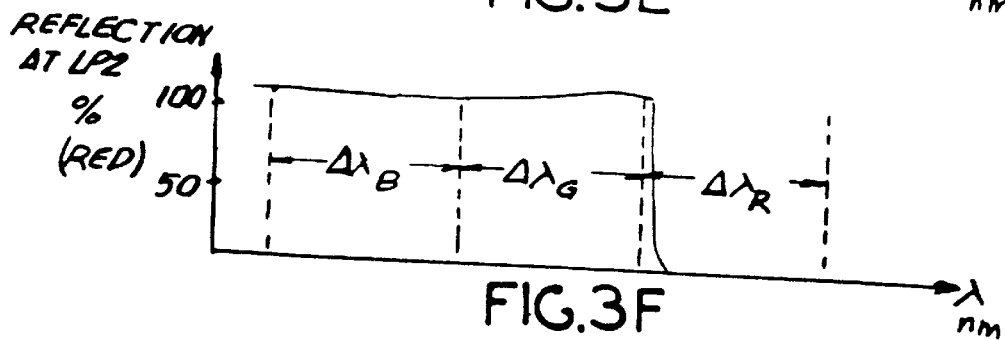
FIG. 3F is a schematic representation graphically illustrating the reflection characteristics of the pass-band linearly polarizing (LP2) reflective filter element associated with each "red" subpixel of the LCD panel of FIGS. 3A1 and 3A2, indicating how such a non-absorbing spectral filter element responds to incident broad-band illumination having linear polarization state LP2.

As shown in FIG. 3F, each pass-band polarizing reflective element associated with a "red" subpixel in the pixelated pass-band linearly polarizing reflective panel 10' is particularly designed to reflect nearly 100% all spectral components having the LP2 characteristic polarization state and a wavelength within the green reflective band $\Delta\lambda_G$ or the blue reflective band $\Delta\lambda_B$, whereas all spectral components having the LP2 characteristic polarization state or a wavelength within the red reflective band $\Delta\lambda_R$ are transmitted nearly 100% through the pass-band polarizing reflective element. The manner in which the pass-band polarizing reflective element 10A' associated with each "red" subpixel is "tuned" will be described hereinafter with reference to the method of LCD panel fabrication illustrated in FIGS. 5, 6, 7A through 7C.

Figure 2B:
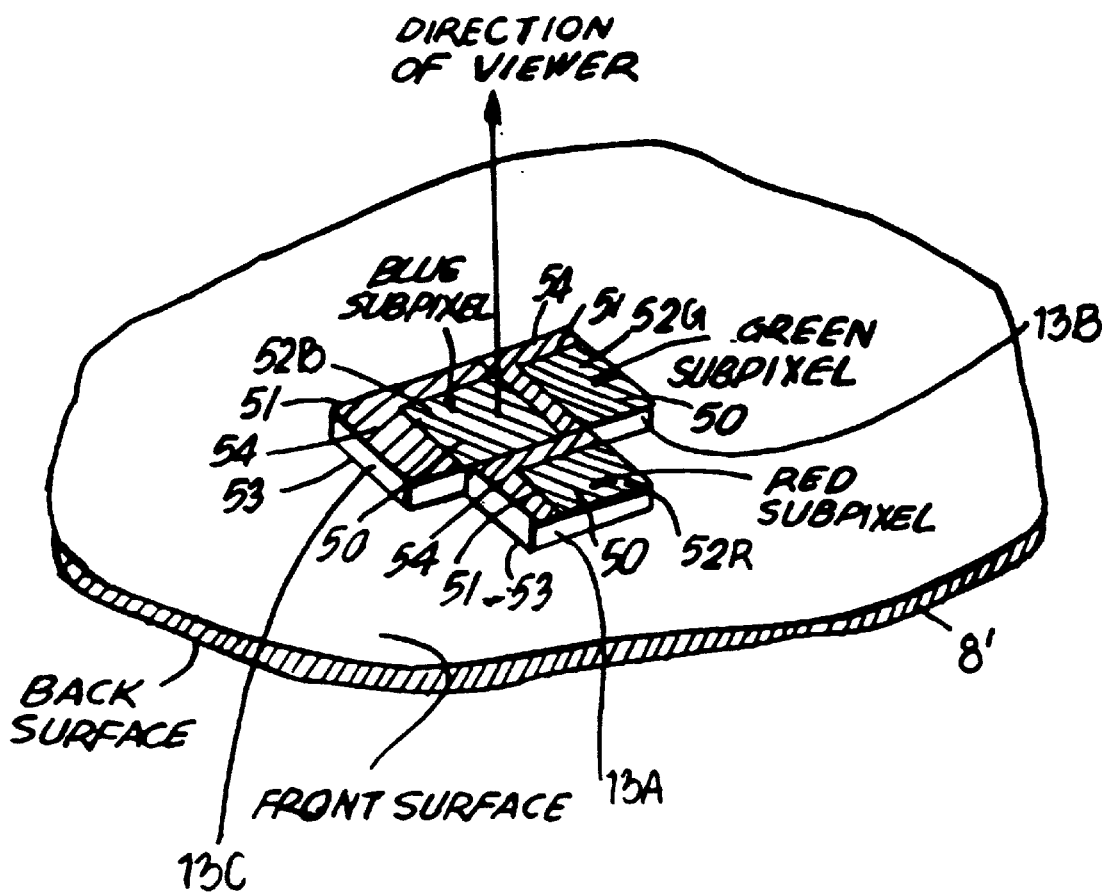
FIG. 2B is a perspective, partially broken away view of a portion of the LCD panel of FIG. 2, showing the novel construction of the spectral filtering elements associated with an exemplary pixel structure thereof, and the application of broad-band spectrally-tuned CLC film material over the light transmission portion of each subpixel region to achieve the required spectral filtering function thereof, and the application of broad-band reflective film material over the light blocking regions of each subpixel region on the backside thereof in order to maximize the light transmission efficiency of the LCD panel, and the application of broad-band absorptive film material over the light blocking region of each subpixel region on the front surface thereof in order to reduce glare at the surface of the LCD panel due to ambient light incident thereon.

In the above description of the first illustrative embodiment of the LCD panel construction of FIG. 2 has assumed that the complete surface area associated with each subpixel region is available for light intensity modulation and spectral filtering functions. In practice, however, this is not the case. As shown in FIG. 2B, each subpixel region of the LCD panel includes (i) a light transmission region (i.e. aperture region) 50 in which pass-band linearly polarizing reflective element is located, and a light blocking region (i.e. stop portion) 51 in which TFTs, wires, etc. are located. Typically, the light blocking region occupies a significant percentage of the subpixel surface area (e.g. 30–50 percent of the total subpixel area). As discussed in detail above, the application of the broad-band spectrally-tuned CLC film material 52R, 52G and 52B over the light transmission portion of each RGB subpixel region 13A, 13B and 13C, respectively, is to achieve the required spectral filtering function thereof.

In order to maximize the light transmission efficiency of the LCD panel of FIG. 3A1 and 3A2, broad-band reflective film material (e.g. broad-band reflector film) 53 is applied over the light blocking region 51 of each subpixel region on the backside thereof. In the first illustrative embodiment described above, a pattern of broad-band reflector film, corresponding to the light blocking portions of the subpixel regions, can be applied to the back surface of the broad-band polarizing reflective panel 8' (facing the backlighting structure) in spatial registration with the light blocking portions of the subpixel regions 13A, 13B and 13C. This provides a light reflective mask between the backlighting panel and the pixelated spatially intensity modulation panel 9'. This prevents the absorption and scattering of produced light at structures associated with the light blocking portion of the subpixels of the LCD panel.

In order to reduce glare at the surface of the LCD panel due to ambient light incident thereon, a broad-band absorptive film material (e.g. carbonized polymer film) 54 is applied over the light blocking region 51 of each subpixel region on the front surface thereof. In the first illustrative embodiment described above, a pattern of broad-band absorption film, corresponding to the light blocking portions of the subpixel regions, can be applied to the rear surface of the pixelated spectral filtering panels 10' in spatial registration with the light blocking portions of the subpixel regions. This provides a light reflective mask between the viewer panel and the pixelated spatially intensity modulation panel 9'. This prevents reflection and scattering of ambient light off structures associated with the light blocking portion of the subpixels of the LCD panel, and thus reduces glare at the surface of the LCD panel due to ambient light incident thereon.

Second Illustrative Embodiment of the LCD Panel Construction of FIG. 2

Figure 4B:
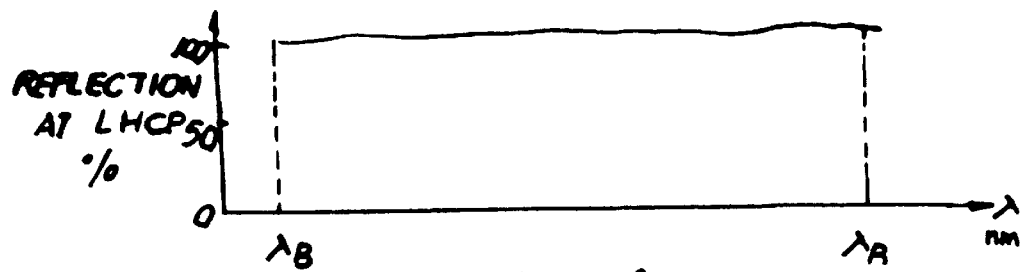
FIG. 4B is a schematic representation graphically illustrating the reflection characteristics of the broad-band left-handed circularly polarizing (LHCP) reflective panel of the LCD panel of FIGS. 4A1 and 4A2, indicating how such a broad-band circularly polarizing reflective panel responds to incident illuminating having the circular polarization state LHCP.
Figure 4C:
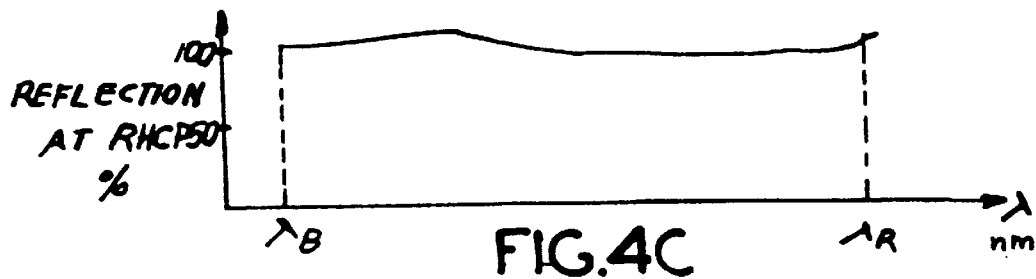
FIG. 4C is a schematic representation graphically illustrating the reflection characteristics of the broad-band right handed circularly polarizing (RHCP) reflective panel of the LCD panel of FIGS. 2, 4A1 and 4A2, indicating how such a broad-band circularly polarizing panel responds to incident illuminating having circular polarization state RHCP.

In the illustrative embodiment of the LCD panel shown in FIGS. 4A1 and 4A2, the backlighting structure 7 is realized in a manner described above. The broad-band linear polarizing reflective panel 8'' has a characteristic circular polarization LHCP (i.e. Left Hand Circular Polarization) which serves as a polarization reference. Broad-band circular polarizing reflective panel 11'' has a characteristic circular polarization state RHCP (i.e. Right Hand Circular Polarization) which is orthogonal to LHCP. A preferred method of making the broad-band circularly polarizing reflective panels 8''' and 11''' is disclosed in great detail in International Application Number PCT/US96/17464 entitled "Super Broad-band Polarizing Reflective Material", supra. An alternative method of making broad-band circularly polarizing reflective panels 8'' and 11'' is disclosed in EPO Application No. 94200026.6 entitled "Cholesteric Polarizer and Manufacture Thereof", incorporated herein by reference. The reflection characteristics of the broad-band circularly polarizing reflective panel 8'' are graphically illustrated in FIG. 4B for incident light having circular polarization state LHCP whereas the reflection characteristics of the broad-band circularly polarizing reflective panel 11'' are graphically illustrated in FIG. 4C for incident light having circular polarization state RHCP.

In the illustrative embodiment of FIGS. 4A1 and 4A2, the pixelated polarization rotating array 9 is realized as an array of electronically-controlled circular polarization rotating elements 9" for rotating the circularly polarized electric field along the LHCP direction to the RHCP direction (or vice versa) as the light rays are transmitted through the spatially corresponding pixels in the LCD panel. In the illustrative embodiment of FIGS. 4A1 and 4A2, each electronically-controlled circular polarization rotating element 9A", 9B", 9C" can be realized as a π-cell, whose operation is by controlled by a control voltage well known in the art. In its electrically-inactive sate (i.e. no-voltage is applied), the electric field intensity of light exiting from the cell is substantially zero, thus a "dark" subpixel level is produced. In its electrically-active state (i.e. the threshold voltage $V_T$ is applied), the electric field intensity of light exiting from the cell is substantially non-zero and thus a "bright" subpixel level is produced.

In the illustrative embodiment of FIGS. 4A1 and 4A2, the array of spectral filtering elements 10 is realized as a pixelated array of pass-band circular polarizing reflective elements 10" formed within a single plane. Broad-band circularly polarizing reflective panel 11" is laminated to the pixelated array of pass-band circular polarizing reflective elements 10". As indicated in FIGS. 4A1 and A2, each pass-band circular polarizing reflective element in the pixelated pass-band circular polarizing panel 10" has a LHCP characteristic polarization state, whereas the broad-band circularly polarizing reflective panel 8" adjacent the backlighting structure has an LHCP characteristic polarization state, and broad-band circularly polarizing reflective panel 10" has a RHCP characteristic polarization state, indicated in FIGS. 4B and 4C.

Figure 4D:
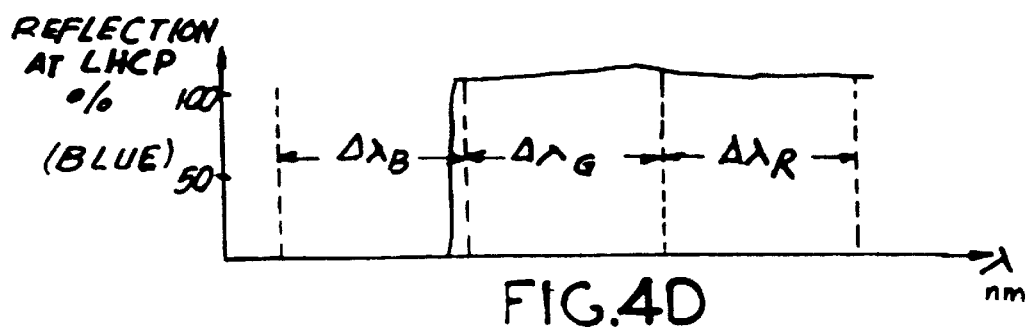
FIG. 4D is a schematic representation graphically illustrating the reflection characteristics of the pass-band left-handed circularly polarizing (LHCP) reflective filter element associated with each "blue" subpixel of the LCD panel of FIGS. 4A1 and 4A2, indicating how such a non-absorbing spectral filter element responds to incident broad-band illumination having the left-handed circular polarization state LHCP.

As shown in FIG. 4D, each pass-band polarizing reflective element 10C" associated with a "blue" subpixel in the pixelated pass-band linear polarizing panel 10C" is particularly designed to reflect nearly 100% all spectral components having the LHCP characteristic-polarization state and a wavelength within the green reflective band $\Delta\lambda_G$ or the red reflective band $\Delta\lambda_R$, whereas all spectral components having the LHCP characteristic polarization state or a wavelength within the blue reflective band $\Delta\lambda_B$ are transmitted nearly 100% through the pass-band polarizing reflective element. The manner in which the pass-band polarizing reflective element associated with each "blue" subpixel is "tuned" will be described hereinafter with reference to the method of LCD panel fabrication illustrated in FIGS. 5, 6, 7A through 7C.

Figure 4E:
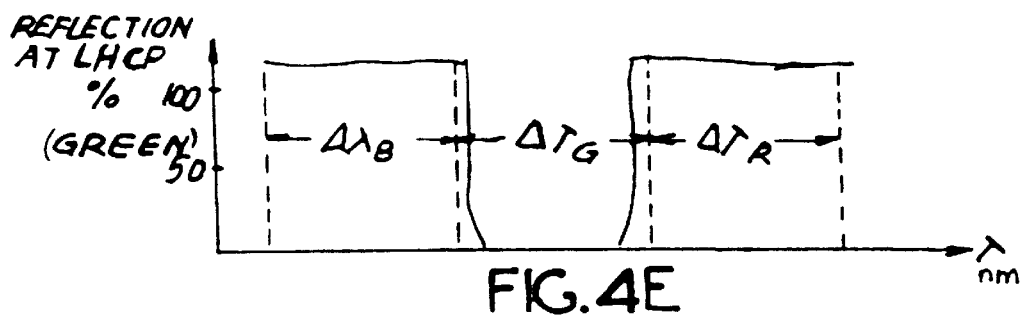
FIG. 4E is a schematic representation graphically illustrating the reflection characteristics of the pass-band left-handed circularly polarizing (LHCP) reflective filter element associated with each "green" subpixel of the LCD panel of FIGS. 4A1 and 4A2, indicating how such a non-absorbing spectral filter element responds to incident broad-band illumination having the left-handed circular polarization state LHCP.

As shown in FIG. 4E, each pass-band polarizing reflective element 10B" associated with a "green" subpixel in the pixelated pass-band linearly polarizing panel 10" is particularly designed to reflect nearly 100% all spectral components having the LHCP characteristic polarization state and a wavelength within the red reflective band $\Delta\lambda_R$, or the blue reflective band $\Delta\lambda_B$, whereas all spectral components having the LHCP characteristic polarization state or a wavelength within the green reflective band $\Delta\lambda_G$ are transmitted nearly 100% through the pass-band polarizing reflective element. The manner in which the pass-band polarizing reflective element associated with each "green" subpixel is "tuned" will be described hereinafter with reference to the method of LCD panel fabrication illustrated in FIGS. 5, 6, 7A through 7C.

Figure 4F:
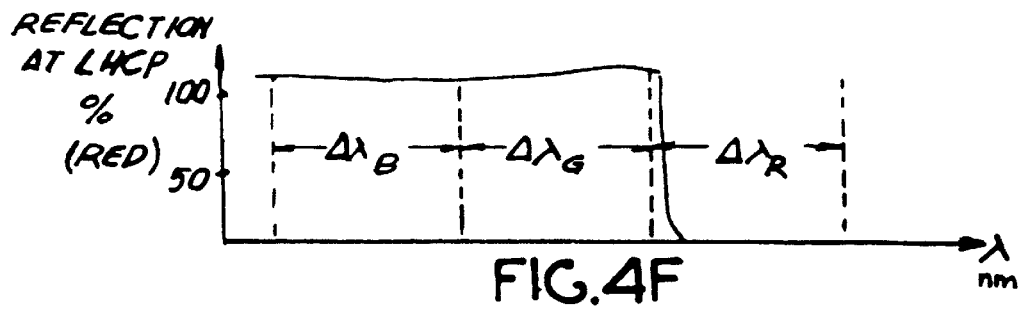
FIG. 4F is a schematic representation graphically illustrating the reflection characteristics of the pass-band left-handed circularly polarizing (LHCP) reflective filter element associated with each "red" subpixel of the LCD panel of FIGS. 4A1 and 4A2, indicating how such a non-absorbing spectral filter element responds to incident broad-band illumination having the left-handed circular polarization state LHCP.

As shown in FIG. 4F, each pass-band polarizing reflective element 10A" associated with a "red" subpixel in the pixelated pass-band linear polarizing panel 10" is particularly designed to reflect nearly 100% all spectral components having the LHCP characteristic polarization state and a wavelength within the green reflective band $\Delta\lambda_G$ or the blue reflective band $\Delta\lambda_B$, whereas all spectral components having the LHCP characteristic polarization state or a wavelength within the red reflective band $\Delta\lambda_R$ are transmitted nearly 100% through the pass-band polarizing reflective element. The manner in which the pass-band polarizing reflective element associated with each "red" subpixel is "tuned" will be described hereinafter with reference to the method of LCD panel fabrication illustrated in FIGS. 5, 6, 7A through 7C.

Notably, the above description of the second illustrative embodiment of LCD panel construction of FIG. 2 has assumed that the complete surface area associated with each subpixel region is available for light intensity modulation and spectral filtering functions. In practice, however, each subpixel region 13A, 13B and 13C of the LCD panel includes (i) a light transmission region (i.e. aperture region) 50 as shown in FIG. 2B in which pass-band linearly polarizing reflective element is located, and a light blocking region (i.e. stop portion) 51 as shown in FIG. 2B in which TFTs, wires, etc. are located.

In order to maximize the light transmission efficiency of the LCD panel of FIGS. 4A1 and 4A2, broad-band reflective film material (e.g. broad-band reflector film) 53, as shown in FIG. 2B, is applied over the light blocking region 51 of each subpixel region 13A, 13B and 13C on the backside thereof. In the first illustrative embodiment described above, a pattern of broad-band reflector film, corresponding to the light blocking portions of the subpixel regions, can be applied to the back surface of the broad-band polarizing reflective panel 8" (facing the backlighting structure) in spatial registration with the light blocking portions of the subpixel regions. This provides a light reflective mask between the backlighting panel and the pixelated spatially intensity modulation panel 9". This prevents the absorption and scattering of produced light from structures associated with the light blocking portion of the subpixels of the LCD panel.

In order to reduce glare at the surface of the LCD panel of FIGS. 4A1 and 4A2, due to ambient light incident thereon, a broad-band absorptive film material (e.g. carbonized polymer film) 54 is applied over the light blocking region 51 of each subpixel region on the front surface thereof. In the first illustrative embodiment described above, a pattern of broad-band absorption film, corresponding to the light blocking portions of the subpixel regions, can be applied to the rear surface of the pixelated spectral filtering panel 10" in spatial registration with the light blocking portions of the subpixel regions. This provides a light reflective mask between the viewer panel and the pixelated spatially intensity modulation panel 9". This prevents reflection and scattering of ambient light off structures associated with the light blocking portion of the subpixels of the LCD panel, and thus reduces glare at the surface of the LCD panel due to ambient light incident thereon.

Systemic Light Recycling Within the LCD Panel of the Present Invention

The light transmission efficiency of prior art LCD panels has been severely degraded as a result of the following factors: absorption of light energy due to absorption-type polarizers used in the LCD panels; absorption of light reflected off thin-film transistors (TFTs) and wiring of the pixelated spatial intensity modulation arrays used in the LCD panels; absorption of light by pigments used in the spectral filters of the LCD panels absorption of light energy by the black-matrix used to spatially separate the subpixel filters in the LCD panel in order to enhance image contrast;

and Fresnel losses due to the mismatching of refractive indices between layers within the LCD panels. As a result of such light energy losses, it has been virtually impossible to improve the light transmission efficiency of prior art LCD panels beyond about 5%.

The LCD panel of the present invention overcomes each of the above drawbacks by employing a novel scheme of "systemic light recycling" which operates at all levels of the LCD system in order to avoid the light energy losses associated with prior art LCD panel designs, and thereby fully utilize nearly 100% of the light energy produced by the backlighting structure thereof. While the details of this novel systemic light recycling scheme will be hereinafter described for each of the illustrative embodiments, it will be appropriate at this juncture to briefly set forth the principles of this systemic light recycling scheme.

In each of the embodiments of the present invention, a single polarization state of light is transmitted from the backlighting structure to those structures (or subpanels) of the LCD panel where spatial intensity modulation and spectral filtering function of the transmitted polarized light simultaneously occurs on a subpixel basis and in a functionally integrated manner. At each subpixel location, spectral bands of light which are not transmitted to the display surface during spectral filtering are reflected without absorption back along the projection axis into the backlighting structure where the polarized light is recycled with light energy being generated therewith and then retransmitted from the backlighting structure into section of the LCD panel where spatial intensity modulation and spectral filtering of the retransmitted polarized light simultaneously occurs on a subpixel basis in a functionally integrated manner. At each subcomponent level within the LCD panel, spectral components of transmitted polarized light which are not used at any particular subpixel structure location are effectively reflected either directly or indirectly back into the backlighting structure for recycling with other spectral components for retransmission through the backlighting structure at the operative polarization state, for reuse by both the same and neighboring subpixel structures. The mechanics of this novel systemic light recycling scheme are schematically illustrated in FIGS. 3A1, 3A2, 4A1, 4A2, 9A1, 9A2, 11, 12, 13 and 14, and will be described in greater detail hereinafter. By virtue of this novel systemic light recycling scheme of the present invention, it is now possible to design and construct LCD panels that can utilize produced backlight with nearly 100% light transmission efficiency, in marked contrast with prior art LCD panels having efficiencies of about 5%.

Apparatus for Fabricating the LCD Panels Hereof

Figure 5:
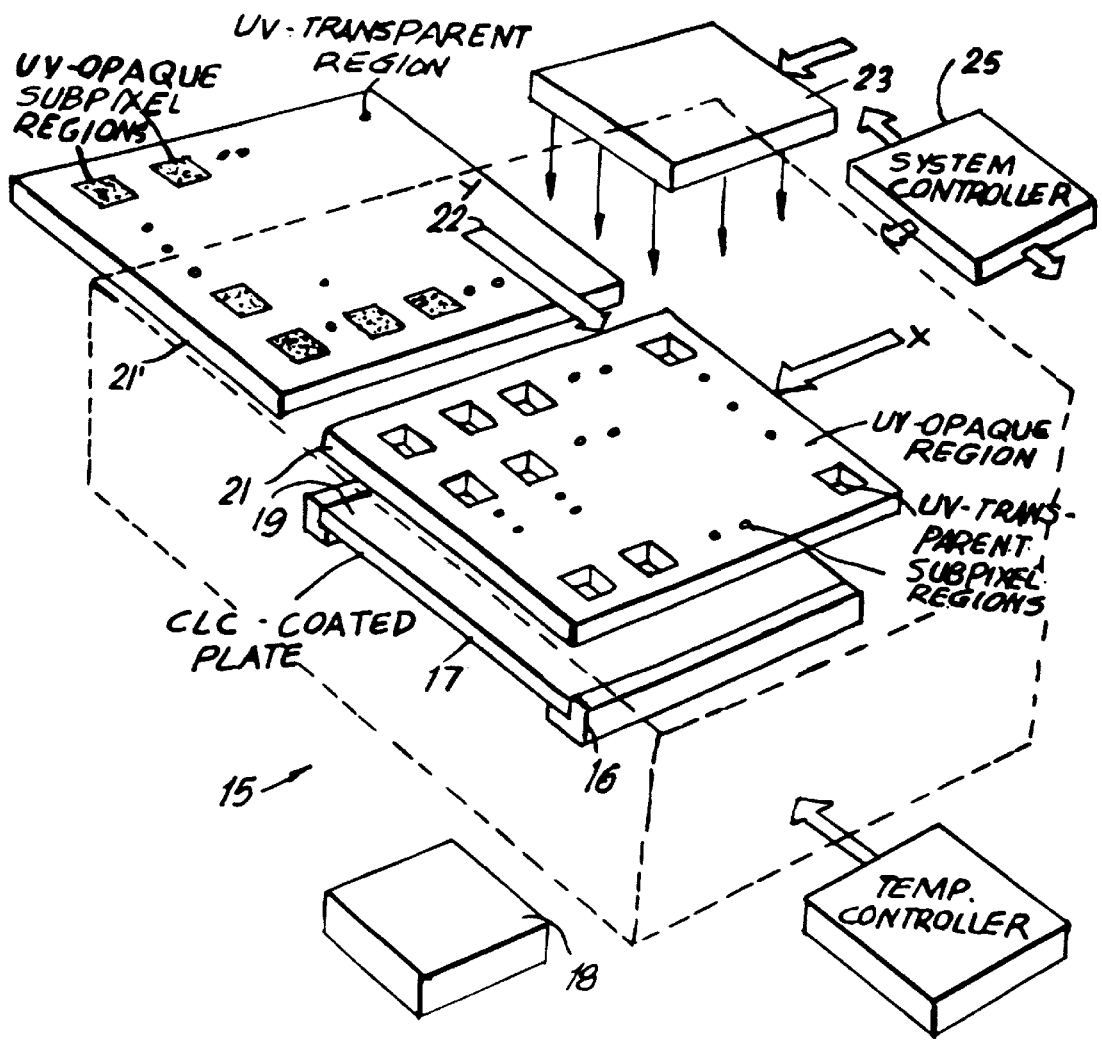
FIG. 5 is schematic diagram of apparatus for use in manufacturing the LCD panel of the present invention.

FIG. 5 provides a schematic representation of a computer-controlled system 15 which can be used during the fabrication of the pixelated pass-band (linearly or circularly) polarizing reflective panels 10' and 10" hereof. As shown, the computer-controlled system 15 comprises a number of subcomponents namely: a fixture 16 for supporting a plate 17 the size of the LCD panel to be fabricated, within the x-y plane of a coordinate reference frame embedded within the system; coating means 18 (e.g. application technology) for coating one surface of the plate with a CLC mixture 19 containing in its liquid phase, liquid crystals, monomers and other additives; a temperature-controlled oven 20 (with a UV transparent window) within which the CLC coated plate 17 can be transported and maintained for optical and thermal processing; a subpixel-exposure mask 21 having a pattern of apertures 21A, 21B and 21C which spatially correspond with the red, green or blue subpixel structures, respectively, of the LCD panel to be fabricated; a subpixel-array mask 21' having a pattern of opaque subpixel regions which spatially correspond with the red, green or blue subpixel structures formed on the CLC-coated plate of the LCD panel to be fabricated; a mask translator 22 for precisely translating the masks 21 and 21' relative to the fixture along the x and y axes of the system; a source of ultraviolet (UV) radiation 23 for producing a focused beam of UV radiation having a specified bandwidth, for exposing the layer of CLC material 19 upon the plate supported within the fixture, while the CLC layer is precisely maintained at a preselected temperature; a temperature controller 24 for controlling the temperature of the interior of the oven 20 and thus the layer of CLC material coated on the plate; and a system controller 25 for controlling the operation of the mask translator 22 and temperature controller 24 during the fabrication process.

The primary function of this system 15 is to control the temperature of the CLC coated plate 17 and its UV exposure at each of the three subpixel filter fabrication stages involved in the fabrication of panel 10. In particular, during the "red" subpixel processing stage, the mask 21 is translated relative to the CLC coated plate 17 so allow produced UV radiation to expose only the red subpixel regions on the CLC coated plate, while the CLC coating is maintained at temperature $T_R$, determined from the characteristic shown in FIG. 6. During the "green" subpixel processing stage, the mask 21 is translated relative to the CLC coated plate 17 so allow produced UV radiation to expose only the green subpixel regions on the CLC coated plate 17, while the CLC coating is maintained at temperature $T_G$, determined from the characteristic shown in FIG. 6. During the "blue" subpixel processing stage, the mask is translated relative to the CLC coated plate so allow produced UV radiation to expose only the red subpixel regions on the CLC coated plate, while the CLC coating is maintained at temperature $T_R$, determined from the characteristic shown in FIG. 6. During the "pixel matrix" processing stage, mask 21 is removed and mask 21' positioned relative to the CLC-coated plate so allow produced UV radiation to expose at the required UV-light intensity $I_{BB}$, only the subpixel interstitial regions on the CLC coated plate, while the CLC coating is maintained at temperature $T_{BB}$, determined from the characteristics and properties of the CLC mixture used.

Figure 6:
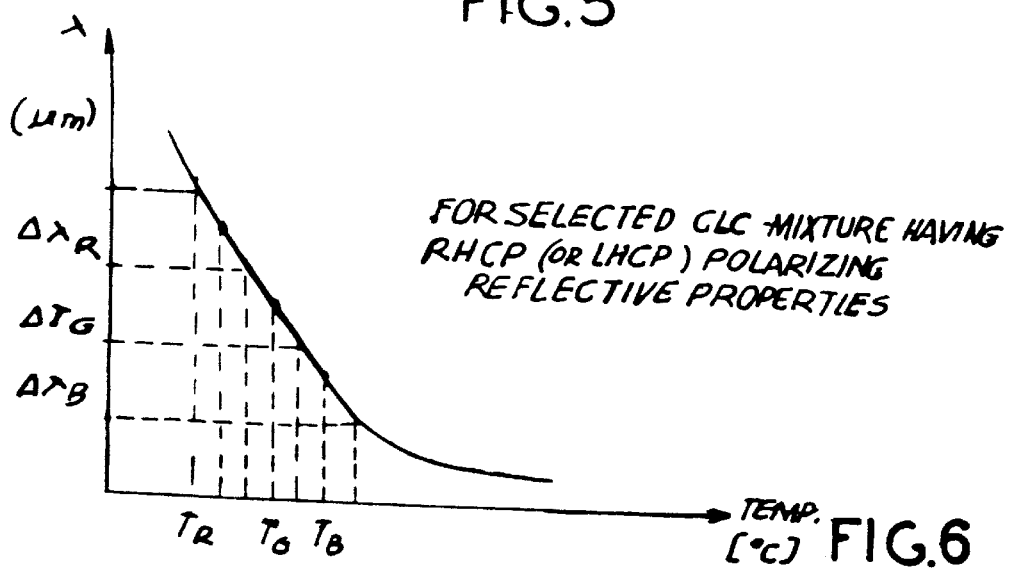
FIG. 6 is schematic representation of an empirically determined function graphically illustrating the characteristic wavelength of CLC material used to make the pass-band circularly polarizing reflective filter array of the illustrative embodiments, plotted as a function of the temperature at which the CLC material is exposed to ultra-violet radiation during manufacture.

For each RHLP or LHCP CLC mixture to be used to make the pixelated pass-band circularly polarizing reflective panel 10, the graphical plot of FIG. 6 is empirically acquired by analytical procedures well known in the CLC art. Having acquired this wavelength versus UV-exposure temperature plot for any given CLC mixture, the LCD panel designer can easily determine: (1) the UV-exposure temperature required in order to tune the subpixel filters to transmit only the narrow "red" spectral pass-band $\Delta\lambda_R$, while reflecting all other wavelengths without energy loss or absorption; (2) the UV-exposure temperature required in order to tune the subpixel filters to transmit only over the narrow "green" spectral pass-band $\Delta\lambda_G$, while reflecting all other wavelengths without energy loss or absorption; and (3) the UV-exposure temperature required in order to tune the subpixel filters to transmit only over the narrow "blue" spectral pass-band $\Delta\lambda_B$, while reflecting all other wavelengths without energy loss or absorption.

Method of Fabricating the LCD Panels Hereof

Figure 7A:
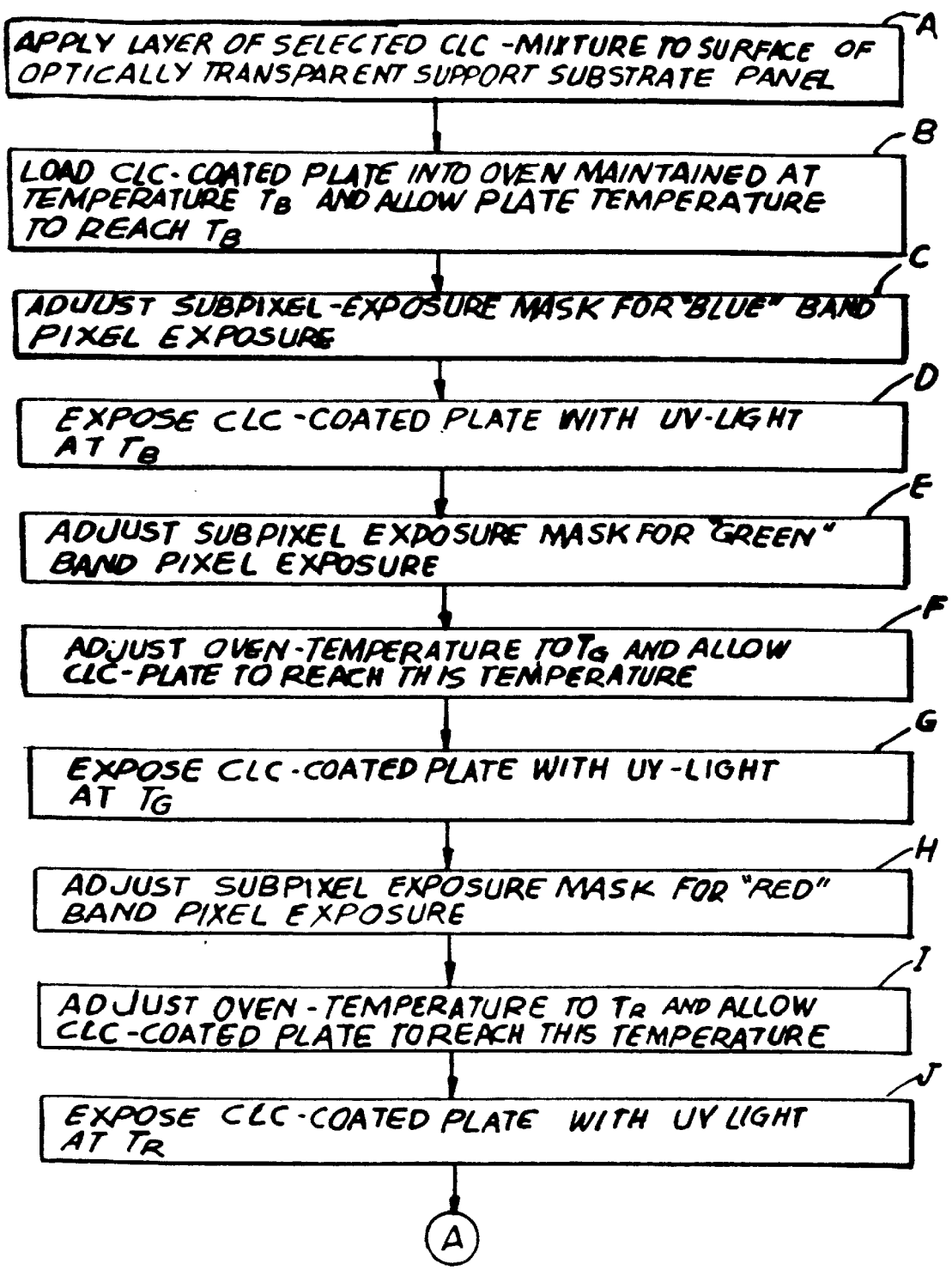
FIGS. 7A through 7C, taken together, provide a flow chart illustrating the steps undertaken during the preferred method of manufacturing the LCD panel.
Figure 7B:
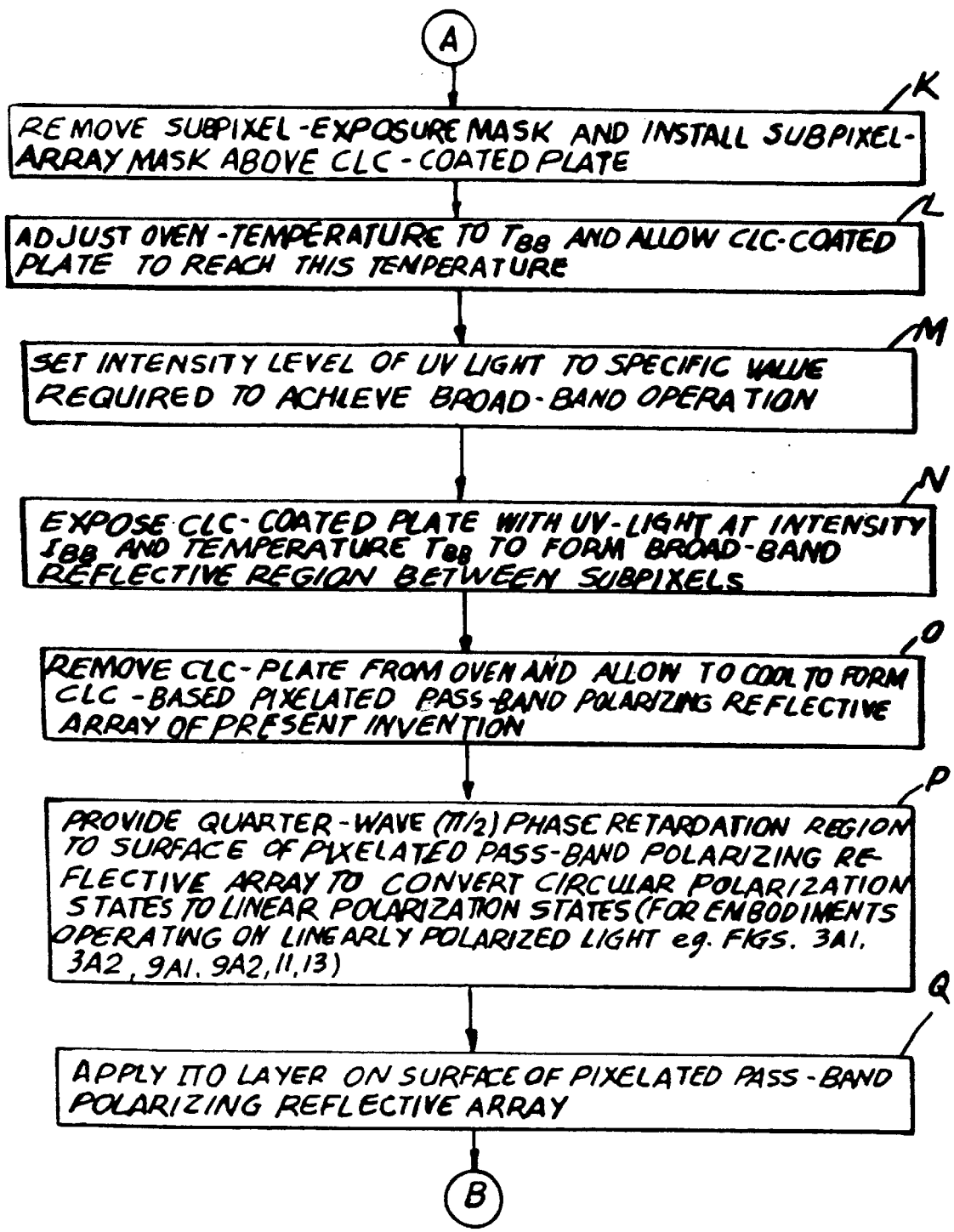
Figure 7C:
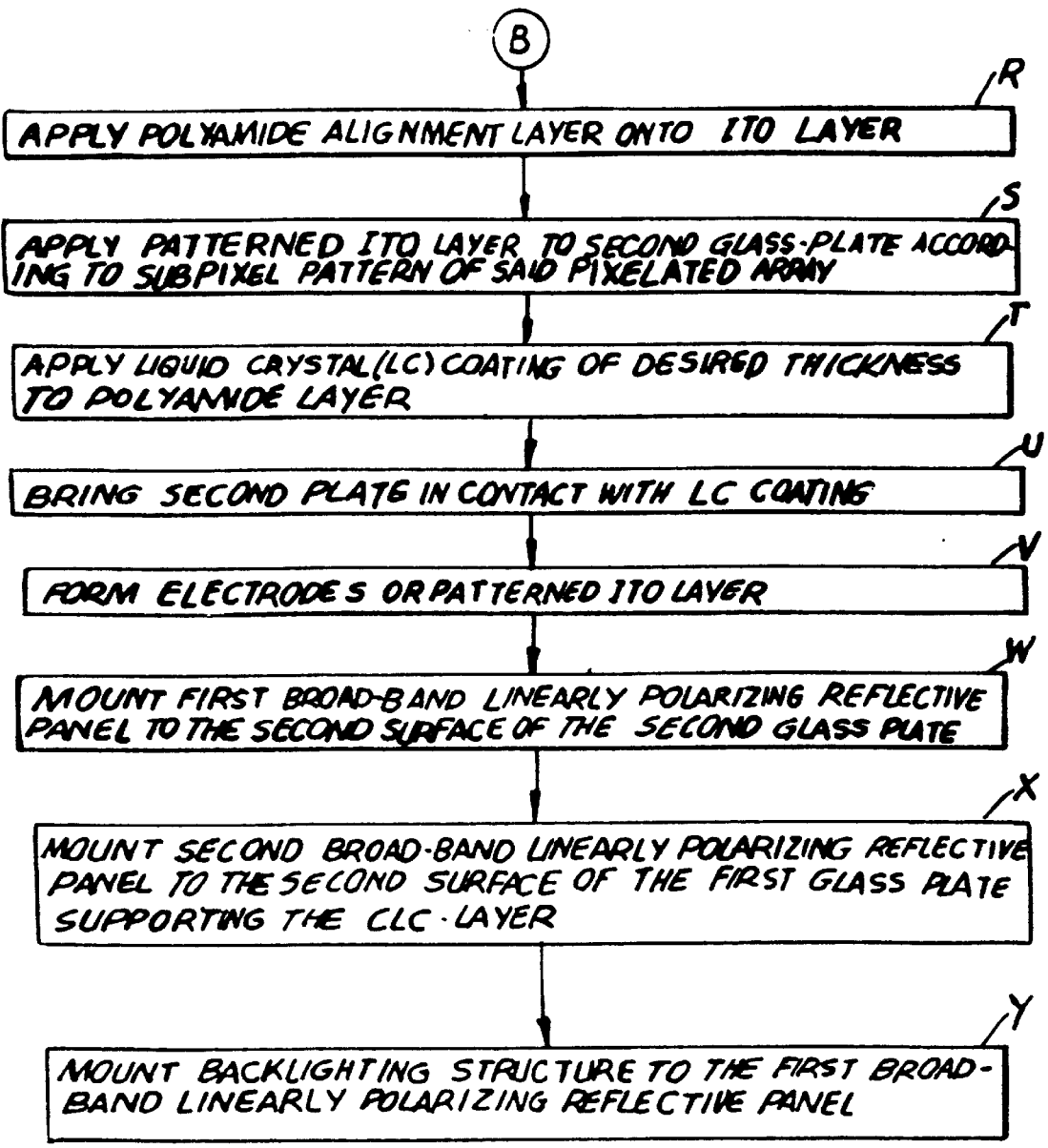

Referring now to FIGS. 7A through 7C, a preferred fabrication method will now be described for the LCD panel illustrated in FIGS. 2, 3A1 and 3A2.

As indicated at Block A in FIG. 7A, the first step of the fabrication method involves applying a layer of the selected CLC-mixture onto the surface of an optically-transparent support substrate (e.g. glass plate) having length and width dimensions equal to the size of the LCD panel to be fabricated. Methods for selecting and mixing the CLC components of the CLC mixture are described in: International Application Number PCT/US96/17464 entitled "Super Broad-band Polarizing Reflective Material", supra; the SID publication entitled "Cholesteric Reflectors with a Color Pattern" by R. Maurer, F-H Kreuzer and J. Stohrer published at pages 399–402 of SID 94 DIGEST (1994); and the SID publication entitled "Polarizing Color Filters Made From Cholesteric LC Silicones" by Robert Maurer, Dirk Andrejewski, Franz-Heinrich Kreuzer, and Alfred Miller, at pages 110–113 of SID 90 DIGEST (1990); each said document both incorporated herein by reference in its entirety.

At Block B in FIG. 7A, the CLC-coated plate 17 is loaded into the oven shown in FIG. 5 which is operated to maintain its temperature at $T_B$ indicated in FIG. 6. As indicated in Block C, the mask 21 is translated into position over the CLC-coated plate 17 for exposure to UV radiation to form an array of pass-band polarizing reflective elements tuned to the blue spectral-band $\Delta\lambda_B$. Then at Block D, the CLC-coated plate 17 is exposed to UV light through the mask positioned for forming pass-band polarizing reflective elements tuned to the blue spectral-band $\Delta\lambda_B$.

At Block E, the mask 21 is translated into position over the CLC-coated plate 17 for exposure to UV radiation to form an array of pass-band polarizing reflective elements tuned to the green spectral-band $\Delta\lambda_G$. Then at Block F, the oven temperature $T_G$ is selected and the CLC coated plate is allowed to reach this temperature. At Block G, the CLC-coated plate 17 is exposed to UV light through the mask positioned for forming pass-band polarizing reflective elements tuned to the green spectral-band $\Delta\lambda_G$.

At Block H, the mask 21 is translated into position over the CLC-coated plate 17 for exposure to UV radiation to form an array of pass-band polarizing reflective elements tuned to the red spectral-band $\Delta\lambda_R$. Then at Block I, the oven temperature is $T_R$ is selected and the CLC coated plate is allowed to reach this temperature. At Block in FIG. 7A, the CLC-coated plate is exposed to UV light through the mask positioned for forming pass-band polarizing reflective elements tuned to the red spectral-band $\Delta\lambda_R$.

At Block K in FIG. 7B, the subpixel-exposure mask 21 is removed and the pixel-array mask 21' installed above the CLC-coated plate. Then at Block L, the oven temperature is adjusted to $T_{BB}$ and the CLC-coated plate allowed to attain this temperature. Temperature $T_{BB}$ can be determined in accordance with the teaching disclosed in Applicant's International Application Number PCT/US96/17464 entitled "Super Broad-band Polarizing Reflective Material", supra, so that broad-band polarizing reflection characteristics will be imparted to the CLC-coating over those unprotected regions determined by mask 21'. At Block M, the intensity of the UV light is set to the value $I_{BB}$ required to achieve broad-band operation using the particular CLC-mixture at exposure temperature $T_{BB}$. Similarly, light intensity $I_{BB}$ can be determined in accordance with the teaching disclosed in Applicant's International Application Number PCT/US96/17464 entitled "Super Broad-band Polarizing Reflective Material", supra. Then at Block N the CLC-coated plate is exposed to the UV light at intensity $I_{BB}$ and temperature $T_{BB}$ to form a broad-band polarizing reflective region between the interstices of the subpixel filter elements formed on the CLC-coated plate. Notably, this patterned reflective region will be designed to reflect from the subpixel interstices, polarized light transmitted from the backlighting structure so that it can be recycled (i.e. reused) in accordance with the principles of the present invention. At Block O, the exposed CLC-coated plate is removed from the oven and allowed to cool to room temperature. In the particular embodiments of FIGS. 3A1, 3A2, 4A1, 4A2, 11, and 12, the broad-band absorptive-type polarization pattern described above in connection with FIG. 2B can be formed on the front surface of the exposed/cured CLC-coated plate, for absorbing broad-band light falling incident upon the light blocking portions of each subpixel region of the LCD panel, thereby reducing glare and improving image contrast. In the particular embodiments of FIGS. 9A1, 9A2, 10A1, 10A2, 13, and 14, the broad-band light reflecting pattern described above in connection with FIG. 2B can be formed on the back surface of the exposed/cured CLC-coated plate, for reflecting produced light (from the backlighting structure) falling incident upon the light blocking portions of each subpixel region of the LCD panel, thereby optimizing light recycling at the spectral filtering panel in the system.

At this stage, a CLC panel is provided having formed therein, three spatially arranged arrays of pass-band circularly-polarizing reflective elements (i.e., subpixel spectral filter elements) along a single plane with a polarizing reflective matrix-mask region formed therebetween for improving image contrast while systemically recycling polarized light which does not contribute to the formation of image structure. Each array of pass-band circularly-polarizing reflective elements is adapted for use in the LCD panel embodiments of FIGS. 4A1 and 4A2. The first array is tuned to reflect only RH (or LH) circularly polarized spectral components having a wavelength in the red spectral-band $\Delta\lambda_R$; the second array is tuned to reflect only RH (or LH) circularly polarized spectral components having a wavelength in the green spectral-band $\Delta\lambda_G$; and the third array is tuned to reflect only RH (or LH) circularly polarized spectral components having a wavelength in the blue spectral-band $\Delta\lambda_B$. As indicated at Block P in FIG. 7B, in order than each one of these subpixel filter elements reflects linearly polarizing light as required in the LCD panel embodiments of FIGS. 3A1 and 3A2, 9A1 and 9A2, 11 and 13, rather than circularly polarized light, it is necessary to impart a $\pi/2$ (i.e. quarter-wave) phase retardation region (or structure) to each one of these elements in order to impart a linear polarization state thereto. Such circular-to-linear polarization conversion can be achieved by laminating onto the spatially-arranged arrays of pass-band circularly-polarizing reflective elements (i.e. subpixel filter elements), a first quarter-wave phase retardation panel patterned according to the composite subpixel pattern of the spectral filtering array. This fabrication step will effectively convert the circular polarization state of each spectral filter element in the polarizing reflective spectral filtering array to the appropriate linear polarization state called for by the LCD panel design under construction. Similarly, a second quarter-wave phase retardation panel, patterned according to the subpixel interstice pattern, can be appropriately laminated onto the first quarter-wave pattern, in order to convert the circular polarization state of the circularly polarizing reflective subpixel interstice pattern to the appropriate linear polarization state called for by the LCD panel design under construction. An excellent tutorial and overview on the polarization-reflective properties of CLC materials and principles of polarization state conversion (i.e. linear-to-circular, circular-to-linear, linear-to-linear, circular-to-circular, unpolarized-to-linear, and unpolarized-to-circular) can be found in Applicant's U.S. Pat. No. 5,221,982, incorporated herein by reference. At the end of this state of the fabrication method, the result is an array of linearly-polarized reflective elements tuned to the particular spectral band.

In the event that LCD panels of the type shown in FIGS. 3A1 and 3A2, 9A1 and 9A2, 11 and 13 are being constructed (rather than the LCD panels of FIGS. 4A1 and 4A2, 10A1 and 10A2, 12 and 14), it will be necessary to use linear, rather than circular, polarization principles therein. In such cases, it will be necessary to realize a pixelated array of "linear polarization" rotating elements, rather than a pixelated array of circular polarization rotating elements (i.e. an array of π-cells) as a subcomponent of the LCD panel system. For purposes of illustration, however, the balance of the description of the fabrication method hereof will be directed to the fabrication of the LCD panel of FIGS. 3A1 and 3A2. It will be understood, however, that to fabricate an LCD panel using circular polarization rotating elements (i.e. an array of π-cells), the illustrative fabrication method will be modified in ways which involve the fabrication of an array of circular polarization rotating elements in a manner well known in the art.

At Block Q in FIG. 7B, an ITO layer is applied to the surface of the CLC-coated panel 17 produced above. Then at Block R of FIG. 7C, a polyamide alignment layer is applied to the ITO layer. At Block S in FIG. 7C, a patterned layer of ITO is applied to the surface of a second glass plate the same size as the glass plate supporting the CLC-layer. The pattern of ITO material corresponds to the composite subpixel pattern of the pixelated spectral filter array fabricated above. Then at Block T, a layer of liquid crystal (LC) material of a prespecified thickness is applied to the previously applied polyamide layer.

At Block U of FIG. 7C, the ITO layer on the second glass plate is brought into physical contact with the LC layer in order to construct a twisted nematic (TN) or super-twisted nematic (STN) array with a spectral filtering array formed thereon. Then at Block V, electrically conductive electrodes are attached to the patterned ITO layer in a conventional manner.

At Block W in FIG. 7C, the first broad-band linearly polarizing reflective panel 8" (prefabricated) is attached to the second surface of the second optically transparent plate. At Block X in FIG. 7C, the second broad-band linear polarizing reflector panel 11' (prefabricated) is attached to the second surface of the first optically transparent plate on which the spectral filtering array has been previously formed during the fabrication method. Then at Block Y, the first broad-band linearly polarizing reflective panel (prefabricated) 8' is mounted to the backlighting structure being used. In the illustrative embodiments, this step involves mounting the first broad-band linearly polarizing reflective panel to the light guiding panel 7B of the backlighting structure 7, providing a slight air gap between the interfaced optical surfaces. The quasi-diffusive reflector 7A associated with the backlighting structure can be directly mounted on the rear surface of the light guiding panel, as illustrated in FIGS. 2 and 3A1 and 3A2.

Upon completing the steps of the above-described fabrication process, the LCD panel shown in FIGS. 3A1 and 3A2 is provided. Manufacture of the LCD panel shown in FIGS. 4A1 and 4A2 can be carried out much in the same way as described above with one minor exception. As circularly polarizing reflective panels are used in this particular embodiment, there is no need to impart a quarter-wave phase retardation to the pass-band circularly polarizing reflective elements 9A, 9B, 9C. Also, the broad-band circularly polarizing reflective panels 8" and 11", rather than panels 8' and 11', are used to construct the LCD panel of the present invention.

While the above described method has described forming the pixelated array of pass-band polarizing reflecting elements within a single layer of CLC material, it may be desirable in particular applications to make this pixelated reflective filtering array by using alternative fabrication techniques including photolithography, screen-printing, gravure printing and other methods known in the art. When using such alternative techniques, a pixelated polarizing reflective array of subpixel filter elements can be separately fabricated for each spectral band (e.g. red, green and blue) to provide three panels each embodying a subpixel filtering array tuned to a particular band along the optical spectrum. These subpixel spectral filter arrays can then be aligned in proper registration and bonded together through lamination techniques to form a composite structure having pass-band polarizing-reflective properties similar to those exhibited by the pixelated pass-band reflecting filter array of unitary construction described above.

Operation of the First and Second Illustrative
Embodiments of the LCD Panel of the First
Generalized Embodiment of the Present Invention Having described in detail how to make the LCD panels illustrated in FIGS. 2, 3A1, 3A2, and 4A1 and 4A2, it is appropriate at this juncture to now describe their operation with reference to the exemplary pixel structure detailed in such figure drawings.

As shown in FIGS. 3A1 and 3A2, unpolarized light is produced within the backlighting structure and is composed of spectral components having both LP1 and LP2 polarization states. Only spectral components having the LP2 polarization state are transmitted through the broad-band linearly polarizing reflective panel 8' adjacent the backlighting panel 7, whereas spectral components having polarization state LP1 incident thereon are reflected therefrom without energy loss or absorption. Spectral components reflecting off broadband linearly polarizing reflective panel 8' on the backlighting structure side strike quasi-diffusive reflector 7A, and undergo a polarization inversion (LP1 to LP2). This reflection process occurs independent of wavelength. The spectral components which were inverted from LP1 to LP2 having the LP2 polarization state are transmitted through the broadband linearly polarizing reflective panel 8' adjacent the backlighting structure.

When a linear polarization rotating element 10A, 10B and 10C associated with a red, green or blue subpixel is driven into its inactive-state as shown in FIG. 3A1, the polarization rotating element associated therewith transmits the spectral components therethrough independent of wavelength while effecting an orthogonal conversion in polarization state (i.e. LP1 to LP2 and LP2 to LP1) and producing a "dark" subpixel level in response to the inactive-state into which it has been driven.

When a "red" subpixel is driven into its "dark" state shown in FIG. 3A1, spectral components within the backlighting panel having wavelengths within the "red", "green" or "blue" band $\Delta\lambda_R$ and polarization state LP2 (i.e. $\lambda_R^{LP2}$) are transmitted through the broad-band linearly polarizing reflective panel 8', the "red" pass-band linearly polarizing reflective element 10A' and reflect off broad-band linearly polarizing reflective panel 11' without absorption. The reflected "red", "green" and "blue" spectral components with the LP2 polarization state (i.e. $\lambda_R^{LP2}, \lambda_G^{LP2}, \lambda_B^{LP2}$) are retransmitted through pass-band linearly polarizing reflective element 10A', linear polarization rotating element 9A', and broad-band linearly polarizing reflective panel 8' back into the backlighting structure for systemic recycling.

When a "green" subpixel is driven into its "dark" state shown in FIG. 3A1, spectral components within the backlighting panel having wavelengths within the "red", "green" or "blue" $\Delta\lambda_R$ and polarization state LP2 (i.e. $\lambda_R^{LP2}$) are transmitted through the broad-band linearly polarizing reflective panel 8' and the "green" pass-band linearly polarizing reflective element 10B' and then reflect off broad-band linearly polarizing reflective panel 11' without absorption. These reflected "red", "green" and "blue" spectral components with the LP2 polarization state (i.e. $\lambda_R^{LP2}, \lambda_G^{LP2}, \lambda_B^{LP2}$) are retransmitted through pass-band linearly polarizing reflective element 10B', linear polarization rotating element 9B', and broad-band linearly polarizing reflective panel 8' back into the backlighting structure for systemic recycling.

When a "blue" subpixel is driven into a "dark" state shown in FIG. 3A1, spectral components within the backlighting panel having wavelengths within the "red", "green" or "blue" band $\Delta\lambda_R$ and polarization state LP2 (i.e. $\lambda_R^{LP2}$) are transmitted through the broad-band linearly polarizing reflective panel 8' and the "blue" pass-band linearly polarizing reflective element 10C' and then reflect off broad-band linearly polarizing reflective panel 11' without absorption. These reflected "red", "green" and "blue" spectral components with the LP2 polarization state (i.e. $\lambda_R^{LP2}, \lambda_G^{LP2}, \lambda_B^{LP2}$) are retransmitted through pass-band linearly polarizing reflective element 10C', linear polarization rotating element 9C', and broad-band linearly polarizing reflective panel 8' back into the backlighting structure for systemic recycling.

When a linear polarization rotating element is controlled in its active-state as shown in FIG. 3A2, the element transmits the spectral components therethrough independent of wavelength without effecting a conversion in polarization state, producing a "bright" subpixel level in response to the active-state into which it has been driven.

When a "red" subpixel is driven into its "bright" state as shown in FIG. 3A2, spectral components within the backlighting panel having wavelengths within the "red" band $\Delta\lambda_R$ and a polarization state LP2 (i.e. $\lambda_R^{LP2}$) are transmitted through the broad-band linearly polarizing reflective panel 8', the linear polarization rotating element 9A', the "red" pass-band linearly polarizing reflective element 10A' and the broad-band linearly polarizing reflective panel 11' without absorption. In this state, spectral components within the backlighting structure having wavelengths within the "green" band $\Delta\lambda_G$ or "blue" band $\Delta\lambda_B$ and a polarization state LP2 (i.e. $\lambda_G^{LP2}, \lambda_B^{LP2}$) are transmitted through the broad-band linearly polarizing reflective panel 8', the linear polarization rotating element 9A' and reflected off the "red" pass-band linearly polarizing reflective element 10A' and retransmitted through the linear polarization rotating element 9A' and broad-band linearly polarizing reflective panel 8' back into the backlighting structure for systemic recycling.

When a "green" subpixel is driven into its "bright" state as shown in FIG. 3A2, spectral components within the backlighting structure having wavelengths within the "green" band $\Delta\lambda_G$ and a polarization state LP2 (i.e. $\lambda_G^{LP2}$) are transmitted through the broad-band linearly polarizing reflective panel 8', the linear polarization rotating element 9B', the "green" pass-band linearly polarizing reflective element 10B' and the broad-band linearly polarizing reflective panel 11' without absorption. In this state, spectral components within the backlighting structure having wavelengths within the "red" band $\Delta\lambda_R$ or "blue" band $\Delta\lambda_B$ and a polarization state LP2 (i.e. $\lambda_R^{LP2} \lambda_B^{LP2}$) are transmitted through the broad-band linearly polarizing reflective panel 8' and the linear polarization rotating element 9B' and reflected off the "green" pass-band linearly polarizing reflective element 10B' and retransmitted through the linear polarization rotating element 9B' and broad-band linearly polarizing reflective panel 8' back into the backlighting structure for systemic recycling.

When a "blue" subpixel is driven into its "bright" state as shown in FIG. 3A2, spectral components within the backlighting structure having wavelengths within the "blue" band $\Delta\lambda_B$ and a polarization state LP2 (i.e. $\lambda_B^{LP2}$) are transmitted through the broad-band linearly polarizing reflective panel 8', the linear polarization rotating element 9C', the "blue" pass-band linearly polarizing reflective element 10C' and the broad-band linearly polarizing reflective panel 11' without absorption. In this state, spectral components within the backlighting structure having wavelengths within the "red" band $\Delta\lambda_R$ or "green" band $\Delta\lambda_G$ and a polarization state LP2 (i.e. $\lambda_R^{LP2} \lambda_G^{LP2}$) are transmitted through the broad-band linearly polarizing reflective panel 8' and the linear polarization rotating element 10C' and reflected off the "blue" pass-band linearly polarizing reflective element 9C' and retransmitted through the linear polarization rotating element 9C' and broad-band linearly polarizing reflective panel 8' back into the backlighting structure for systemic recycling.

As shown in FIGS. 4A1 and 4A2, unpolarized light is produced within the backlighting structure and is composed of spectral components having both LHCP and RHCP polarization states. Only spectral components having the RHCP polarization state are transmitted through the broad-band circularly polarizing reflective panel 8" adjacent the backlighting panel 7, whereas spectral components having polarization state RHCP incident thereon are reflected therefrom without energy loss or absorption. Spectral components reflecting off broad-band circularly polarizing reflective panel 8" on the backlighting structure side strike quasi-diffusive reflector 7A, and undergo a polarization inversion (i.e. LHCP to RHCP or RHCP to LHCP). This reflection process occurs independent of wavelength. The spectral components having the RHCP polarization state are transmitted through the broad-band circularly polarizing reflective panel 8".

When a circular polarization rotating element associated with a red, green or blue subpixel is driven into its inactive-state as shown in FIG. 4A1, the polarization rotating element associated therewith transmits the spectral components therethrough independent of wavelength while effecting an orthogonal conversion in polarization state (i.e. LHCP to RHCP and RHCP to LHCP), thereby producing a "dark" subpixel level in response to the inactive-state into which it has been driven.

When a "red" subpixel is driven into its "dark" state shown in FIG. 4A1, spectral components within the backlighting structure having wavelengths within the "red", "green" or "blue" band $\Delta\lambda_R$ and polarization state RHCP (i.e. $\lambda_R^{RHCP}$) are transmitted through the broad-band circularly polarizing reflective panel 8", the circular polarization rotating element 9A" and the "red" pass-band circularly polarizing reflective element 10A" and reflect off broad-band circularly polarizing reflective panel 11" without absorption. These reflected "red", "green" and "blue" spectral components with the RHCP polarization state (i.e. $\lambda_R^{RHCP}, \lambda_G^{RHCP}, \lambda_B^{RHCP}$) are retransmitted through pass-band circularly polarizing reflective element 10A", circular polarization rotating element 9A", and broad-band circularly polarizing reflective panel 8" back into the backlighting structure for systemic recycling.

When a "green" subpixel is driven into its "dark" state shown in FIG. 4A1, spectral components within the backlighting structure having wavelengths within the "red", "green" or "blue" band and polarization state RHCP (i.e. $\lambda_R^{RHCP}, \lambda_G^{RHCP}, \lambda_B^{RHCP}$) are transmitted through the broad-band circular polarizing reflective panel 8", circular polarization rotating element 9B" and the "green" pass-band circularly polarizing reflective element 10B" and reflect off broad-band circularly polarizing reflective panel 11' without absorption. These reflected "red", "green" and "blue" spectral components with the LHCP polarization state (i.e. $\lambda_R^{RHCP}, \lambda_G^{RHCP}, \lambda_B^{RHCP}$) are retransmitted through pass-band circularly polarizing reflective element 10B", circular polarization rotating element 9B", and broad-band circularly polarizing reflective panel 8" back into the backlighting structure for systemic recycling.

When a "blue" subpixel is driven into a "dark" state shown in FIG. 4A1, spectral components within the backlighting structure having wavelengths within the "red", "green" or "blue" band $\Delta\lambda_R$ and polarization state RHCP (i.e. $\lambda_R^{RHCP}, \lambda_G^{RHCP}, \lambda_B^{RHCP}$) are transmitted through the broad-band circularly polarizing reflective panel 8", circular polarization rotating element 9C", the "blue" pass-band circularly polarizing reflective element 10C" and reflect off broad-band circularly polarizing reflective panel 11" without absorption. These reflected "red", "green" and "blue" spectral components with the RHCP polarization state (i.e. $\lambda_R^{RHCP}, \lambda_G^{RHCP}, \lambda_B^{RHCP}$) are retransmitted through pass-band circularly polarizing reflective element 10C", circular polarization rotating element 9C", and broad-band circularly polarizing reflective panel 8" back into the backlighting structure for systemic recycling.

When a circular polarization rotating element is controlled in its active-state as shown in FIG. 4A2, the element transmits the spectral components therethrough independent of wavelength without effecting a conversion in polarization state, thereby producing a "bright" subpixel level in response to the active-state into which it has been driven.

When a "red" subpixel is driven into its "bright" state as shown in FIG. 4A2, spectral components within the backlighting structure having wavelengths within the "red" band $\lambda\Delta_R$ and a polarization state RHCP (i.e. $\lambda_R^{RHCP}$) are transmitted through the broad-band circularly polarizing reflective panel 8", circular polarization rotating element 9A", the "red" pass-band circularly polarizing reflective element 10A" and the broad-band circularly polarizing reflective panel 11' without absorption. In this state, spectral components within the backlighting structure having wavelengths within the "green" band $\Delta\lambda_G$ or "blue" band $\Delta\lambda_B$ and a polarization state RHCP (i.e. $\lambda_G^{RHCP} \lambda_B^{RHCP}$) are transmitted through the broad-band circularly polarizing reflecting panel 8" and the circular polarization rotating element 9A" and reflected off the "red" pass-band circularly polarizing reflective element 10A" and retransmitted through the circular polarization rotating element 9A" and broad-band circularly polarizing reflective panel 8" back into the backlighting structure for systemic recycling.

When a "green" subpixel is driven into its "bright" state as shown in FIG. 4A2, spectral components within the backlighting structure having wavelengths within the "green" band $\Delta\lambda_G$ and a polarization state RHCP (i.e. $\lambda_G^{RHCP}$) are transmitted through the broad-band circularly polarizing reflective panel 8", the circular polarization rotating element 9B", the "green" pass-band circularly polarizing reflective element 10B" and the broad-band circularly polarizing reflective panel 11" without absorption. In this state, spectral components within the backlighting structure having wavelengths within the "red" band $\Delta\lambda_R$ or "blue" band $\Delta\lambda_B$ and a polarization state RHCP (i.e. $\lambda_R^{RHCP} \lambda_B^{RHCP}$) are transmitted through the broad-band circular polarizing reflective panel 8" and the circular polarization rotating element 9B" and reflected off the "green" pass-band circularly polarizing reflective element 10B" and retransmitted through the circular polarization rotating element 9B" and broad-band circularly polarizing reflective panel 8" back into the backlighting structure for systemic recycling.

When a "blue" subpixel is driven into its "bright" state as shown in FIG. 4A2, spectral components within the backlighting structure having wavelengths within the "blue" band $\Delta\lambda_B$ and a polarization state RHCP (i.e. $\lambda_B^{RHCP}$) are transmitted through the broad-band circularly polarizing reflective panel 8", the circular polarizing rotating element 10C", the "blue" pass-band circularly polarizing reflective element 9C" and the broad-band circularly polarizing reflective panel 11" without absorption. In this state, spectral components within the backlighting structure having wavelengths within the "red" band $\Delta\lambda_R$ or "green" band $\Delta\lambda_G$ and a polarization state RHCP (i.e. $\lambda_R^{RHCP} \lambda_G^{RHCP}$) are transmitted through the broad-band circularly polarizing reflective panel 8" and the circular polarization rotating element 9C" and reflected off the "blue" pass-band circularly polarizing reflective element 10C" and retransmitted through the circular polarization rotating element 9C" and broad-band circularly polarizing reflective panel 8" back into the backlighting structure for systemic recycling.

Figure 8:
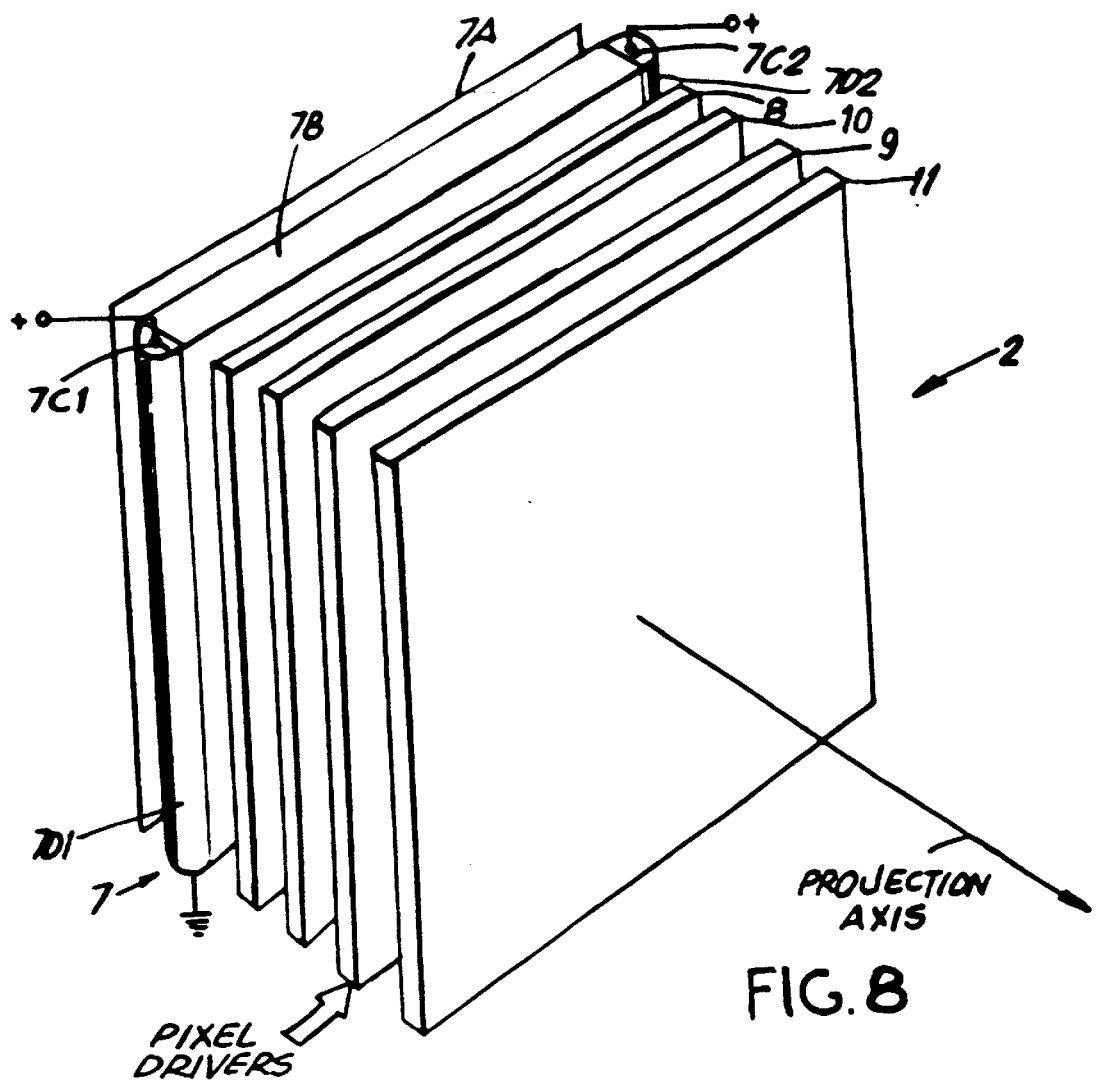
FIG. 8 is an exploded schematic diagram of the second generalized LCD panel construction of the present invention comprising (i) its backlighting structure realized by a quasi-specular reflector, a light guiding panel, a pair of edge-illuminating light sources, and broad-band polarizing reflective panel, (ii) its array of spectral filtering elements realized as an array of pass-band polarizing reflective elements; and (iii) its spatial-intensity modulating array realized as an array of electronically-controlled polarization rotating elements and a broad-band polarizing reflective panel.
Figure 8A:
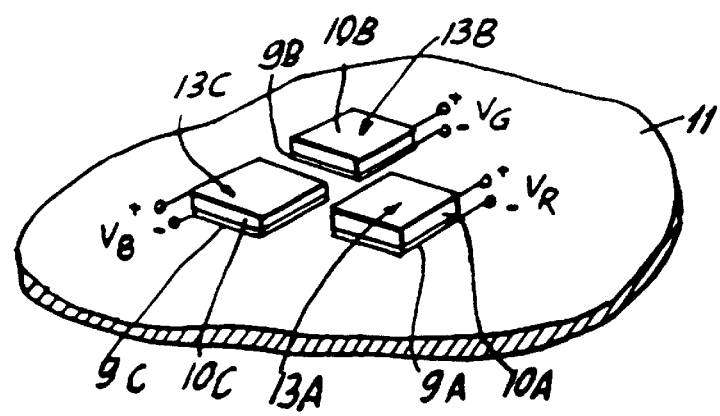
FIG. 8A is a perspective, partially broken away view of a portion of the LCD panel shown in FIG. 8, showing the electronically-controlled polarization rotating elements associated with a pixel structure thereof.

Overview on the LCD Panel Construction of FIG. 8

In the second generalized LCD panel construction shown in FIG. 8, spectral filtering occurs before spatial intensity modulation. In the second illustrative embodiment of this LCD panel construction shown in FIGS. 9A1 and 9A2, linear polarization techniques are used to carry out the spatial intensity modulation and spectral filtering functions employed therein. In the second illustrative embodiment of this LCD panel construction shown in FIGS. 10A1 and 10A2, circular polarization techniques are used to carry out the spatial intensity modulation and spectral filtering functions employed therein. In each such illustrative embodiment, modifications are made among the various components of the LCD panel shown in FIG. 8. Details regarding such modifications will be described hereinafter.

In FIG. 8, the subcomponent structure of the second generalized embodiment of the LCD panel thereof is shown in great clarity. As shown, the second generalized embodiment of the LCD panel 2 comprises: a backlighting structure 7 including a quasi-diffusive reflector 7A, for producing a plane of broad-band light having a substantially uniform light intensity over the x and y coordinate axes thereof; a broad-band polarizing reflective panel 8; a pixelated array 10 of pass-band polarizing reflective (filter) elements 10A, 10B, 10C, for spectral filtering of light produced from the backlighting structure; a pixelated array 9 of polarization direction rotating elements 9A, 9B, 9C for spatial intensity modulation of light produced from the pixelated array of pass-band polarizing reflective (filter) elements; and a broad-band polarizing reflective panel 11 for cooperative operation with the pixelated array of polarization direction rotating elements 9 and the pixelated array of pass-band polarizing reflective (filter) elements 10. In an alternative embodiment, a broad-band absorptive-type panel can be substituted for broad-band polarizing reflective panel 11 in order to reduce glare due to ambient light incident upon the LCD panel during operation.

In order to produce high-resolution color images, the spatial period of the pixelated arrays 9 and 10 is selected to be relatively small in relation to the overall length and height dimensions of the LCD panel. In a conventional manner, each pixel structure in the LCD panel is comprised of a red subpixel 13A, a green subpixel 13B and blue subpixel 13C, as illustrated in FIG. 2A. As shown therein, each red subpixel structure 13A comprises a red-band spectral filtering element 10A which is spatially registered with a first polarization direction rotating element 9A. Each green subpixel structure 13B comprises a green-band spectral filtering element 10B spatially registered with a second polarization direction rotating element 9B. Each blue subpixel element 13C comprises a blue-band spectral filtering element 10C spatially registered with a third polarization direction rotating element 9C. The output intensity (i.e. brightness or darkness level) of each red subpixel structure is controlled by applying pulse width modulated voltage signal $V_R$ to the electrodes of its electrically-controlled spatially intensity modulating element. The output intensity of each green subpixel structure is controlled by applying pulse-width modulated voltage signal $V_G$ to the electrodes of its electrically-controlled spatially intensity modulating element. The output intensity of each blue subpixel structure is controlled by providing pulse-width modulated voltage signal $V_B$ applied to the electrodes of its electrically-controlled spatially intensity modulating element. By simply controlling the width of the above-described voltages $V_R$, $V_G$, $V_B$, the grey-scale intensity (i.e. brightness) level of each subpixel structure can be controlled in a manner well known in the LCD panel art.

First Illustrative Embodiment of the LCD Panel Construction of FIG. 8

In the illustrative embodiments shown in FIGS. 9A1 and 9A2, the backlighting structure 7 is realized in a manner described above. Understandably, there are other techniques for producing a plane of unpolarized light for use in connection with the LCD panel of the present invention.

In the illustrative embodiment of FIG. 9A1 and 9A2, the pixelated array of polarization rotating elements 9 is realized as an array of linear polarization rotating elements 9' formed within a single plane. As indicated in FIGS. 9A1 and 9A2, each pass-band linear polarizing reflective element 10A', 10B', 10C' in the pixelated pass-band linearly polarizing panel 10' has a LP2 characteristic polarization state, whereas the broad-band linear polarizing reflective panel 8' adjacent the backlighting structure has an LP1 characteristic polarization state and the broad-band linearly polarizing reflective panel 11' has an LP2 characteristic polarization state.

Figure 9B:
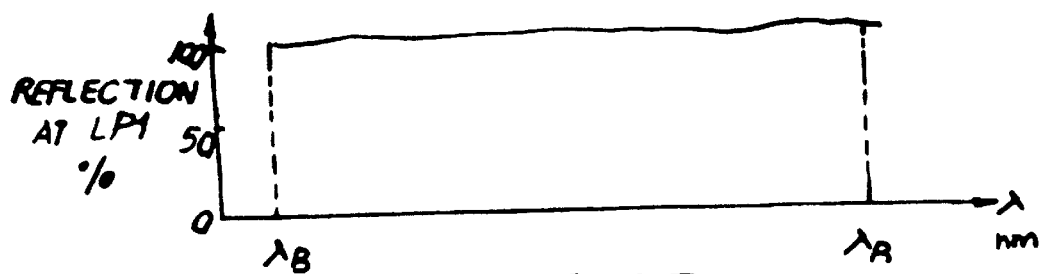
FIG. 9B is a schematic representation graphically illustrating the reflection characteristics of the broad-band linearly polarizing (LP1) reflective panel of the LCD panel of FIGS. 9A1 and 9A2, indicating how such a broad-band linearly polarizing reflective panel responds to incident illuminating having linear polarization state LP1.
Figure 9C:
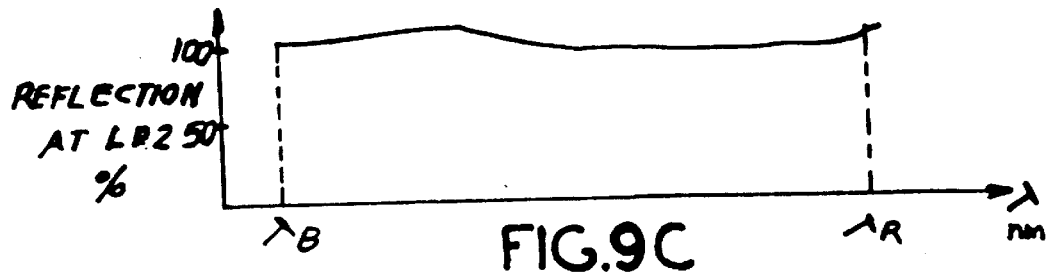
FIG. 9C is a schematic representation graphically illustrating the reflection characteristics of the absorptive broad-band linearly polarizing reflective (LP2) panel of the LCD panel of FIGS. 9A1 and 9A2, indicating how such a broad-band linearly polarizing reflective panel responds to incident illuminating having linear polarization state LP2.

A preferred method of making the broad-band linearly polarizing reflective panels 8' and 11' is disclosed in great detail in International Application No. PCT/US96/17464 entitled "Super Broad-band Polarizing Reflective Material" published on May 9, 1997 under International Publication No. WO 97/16762, which is incorporated herein by reference in its entirety. An alternative method of making broadband linearly polarizing reflective panels 8' and 11' is disclosed in EPO Application No. 94200026.6 entitled "Cholesteric Polarizer and Manufacture Thereof", incorporated herein by reference. The reflection characteristics of the broad-band linearly polarizing reflective panel 8' are graphically illustrated in FIG. 9B for incident light having linear polarization state LP1, whereas the reflection characteristics of the broad-band linearly polarizing reflective panel 11' are graphically illustrated in FIG. 9C for incident light having linear polarization state LP2.

In the illustrative embodiment of FIGS. 9A1 and 9A2, the polarization rotating array 9' is realized as an array of electronically-controlled linear polarization rotating elements 9A', 9B', 9C' for rotating the linearly polarized electric field along LP1 to the LP2 polarization direction as the light rays are transmitted through the spatially corresponding pixels in the LCD panel. In the illustrative embodiment of FIGS. 9A1 and 9A2, each electronically-controlled linear polarization rotating element can be realized as a twisted nematic (TN) liquid crystal cell, super twisted nematic (STN) liquid crystal cell, or ferro-electric cell, whose operation is by controlled by a control voltage well known in the art. To construct the linear polarization rotating elements, thin film transistors (TFTs) can be used to create the necessary voltages across a layer of liquid crystal material to achieve alignment of the liquid crystal molecules and thus cause the corresponding element to not rotate the polarization direction of transmitted light passing therethrough. In its electrically-inactive state (i.e. no voltage is applied), the electric field intensity of light exiting from the cell is substantially zero and thus a "dark" subpixel level is produced. In its electrically-active state (i.e. the threshold voltage $V_T$ is applied), the electric field intensity of light exiting from the cell is substantially non-zero and thus a "bright" subpixel level is produced.

In the illustrative embodiment of FIG. 9A1 and 9A2, the pixelated array of spectral filtering elements 10 is realized as an array of pass-band linear polarizing reflective elements 10A', 10B', 10C' formed within a single plane. Broad-band linearly polarizing reflective panel 11' is laminated to the pixelated array of spectral filtering elements 10.

Figure 9D:
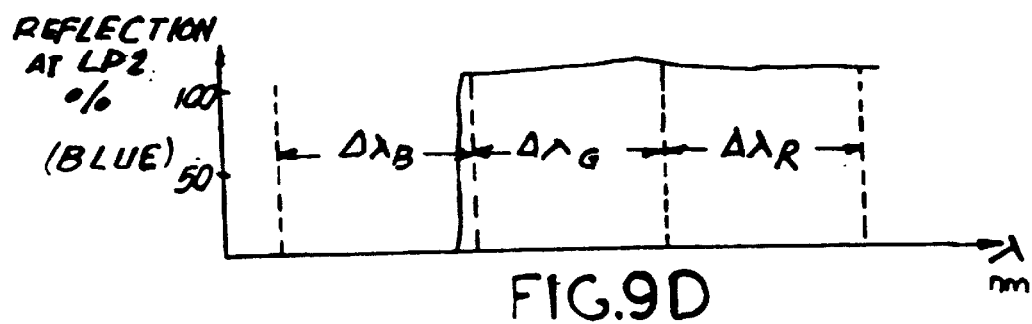
FIG. 9D is a schematic representation graphically illustrating the reflection characteristics of the pass-band linearly polarizing (LP2) reflective filter element associated with each "blue" subpixel of the LCD panel of FIGS. 9A1 and 9A2, indicating how such a non-absorbing spectral filter element responds to incident broad-band illumination having linear polarization state LP2.

As shown in FIG. 9D, each pass-band polarizing reflective element 10C' associated with a "blue" subpixel in the pixelated pass-band linear polarizing panel 10' is particularly designed to reflect nearly 100% all spectral components having the LP2 characteristic polarization state and a wavelength within the green reflective band $\Delta\lambda_G$ or the red reflective band $\Delta\lambda_R$, whereas all spectral components having the LP2 characteristic polarization state and a wavelength within the blue reflective band $\Delta\lambda_B$ are transmitted nearly 100% through the pass-band polarizing reflective element. The pass-band polarizing reflective element associated with each "blue" subpixel is "tuned" during fabrication in the manner described hereinabove.

Figure 9E:
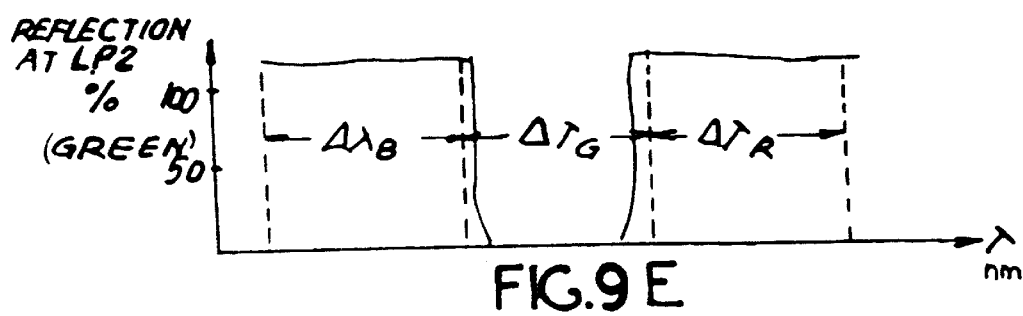
FIG. 9E is a schematic representation graphically illustrating the reflection characteristics of the pass-band linearly polarizing (LP2) reflective filter element associated with each "green" subpixel of the LCD panel of FIGS. 9A1 and 9A2, indicating how such a non-absorbing spectral filter element responds to incident broad-band illumination having linear polarization state LP2.

As shown in FIG. 9E, each pass-band polarizing reflective element 10B' associated with a "green" subpixel in the pixelated pass-band linearly polarizing panel 10' is particularly designed to reflect nearly 100% all spectral components having the LP2 characteristic polarization state and a wavelength within the red reflective band $\Delta\lambda_R$ or the blue reflective band $\Delta\lambda_B$, whereas all spectral components having the LP2 characteristic polarization state and a wavelength within the green reflective band $\Delta\lambda_G$ are transmitted nearly 100% through the pass-band polarizing reflective element. The pass-band polarizing reflective element associated with each "green" subpixel is "tuned" during fabrication in the manner described hereinabove.

Figure 9F:
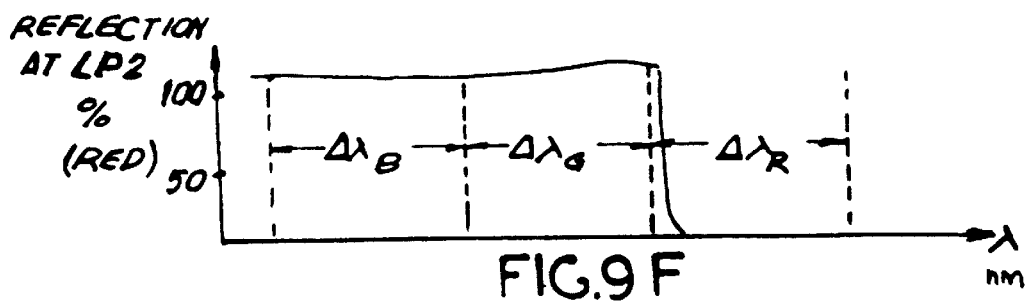

As shown in FIG. 9F, each pass-band polarizing reflective element 10C' associated with a "red" subpixel in the pixelated pass-band linear polarizing panel 10' is particularly designed to reflect nearly 100% all spectral components having the LP2 characteristic polarization state and a wavelength within the green reflective band $\Delta\lambda_G$ or the blue reflective band, whereas all spectral components having the LP2 characteristic polarization state and a wavelength within the red reflective band $\Delta\lambda_R$ are transmitted nearly 100% through the pass-band polarizing reflective element. The pass-band polarizing reflective element associated with each "red" subpixel is "tuned" during fabrication in the manner described hereinabove.

The pixelated pass-band linearly polarizing reflective panel 9' can be fabricated in a manner similar to the way described in the LCD panel fabrication method described hereinabove.

Notably, the above description of the first illustrative embodiment of LCD panel construction of FIG. 8 has assumed that the complete surface area associated with each subpixel region is available for light intensity modulation and spectral filtering functions. In practice, each subpixel region of the LCD panel shown in FIGS. 9A1 and 9A2 includes (i) a light transmission region (i.e. aperature region) 50, as shown in FIG. 2B, in which pass-band linearly polarizing reflective element is located, and a light blocking region (i.e. stop portion) 51, as shown in FIG. 2B, in which TFTs, wires, etc. are located.

In order to maximize the light transmission efficiency of the LCD panel of FIGS. 9A1 and 9A2, broad-band reflective film material (e.g. broad-band reflector film) 53 is applied over the light blocking region 51 of each subpixel region on the backside thereof. In the first illustrative embodiment described above, a pattern of broad-band reflector film, corresponding to the light blocking portions of the subpixel regions, can be applied to the back surface of the broad-band polarizing reflective panel 8' (facing the backlighting structure) or pixelated spectral filtering panel 10', in spatial registration with the light blocking portions of the subpixel regions. This provides a light reflective mask which prevents the absorption and scattering of produced light from structures associated with the light blocking portion of the subpixels of the LCD panel.

In order to reduce glare at the surface of the LCD panel of FIG. 8 due to ambient light incident thereon, a broad-band absorptive film material (e.g. carbonized polymer film) 54 is applied over the light blocking region 51 of each subpixel region on the front surface thereof. In the first illustrative embodiment described above, a pattern of broad-band absorption film, corresponding to the light blocking portions of the subpixel regions, can be applied to the front surface of the broad-band polarizing panel 11 in spatial registration with the light blocking portions of the subpixel regions. This provides a light reflective mask which prevents reflection and scattering of ambient light off structures associated with the light blocking portion of the subpixels of the LCD panel, and thus reduces glare at the surface of the LCD panel due to ambient light incident thereon.

Second Illustrative Embodiment of the LCD Panel Construction of FIG. 8

Figure 10B:
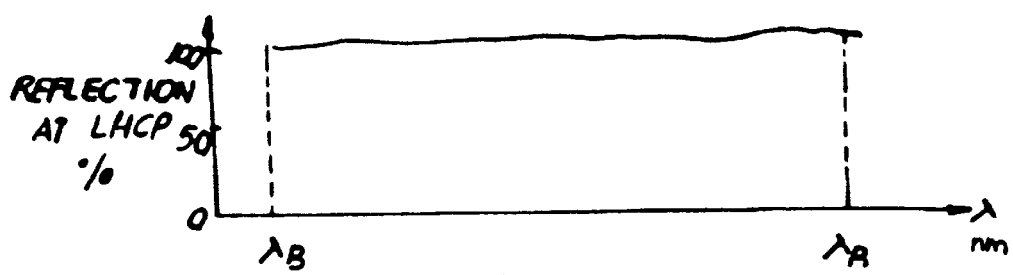
FIG. 10B is a schematic representation graphically illustrating the reflection characteristics of the broad-band circularly polarizing (LHCP) reflective panel of the LCD panel of FIGS. 10A1 and 10A2, indicating how such a broad-band circularly polarizing panel responds to incident illuminating having circular polarization state LHCP.
Figure 10C:
FIG. 10C is a schematic representation graphically illustrating the reflection characteristics of the broad-band circularly polarizing (RHCP) reflective panel of the LCD panel of FIGS. 10A1 and 10A2, indicating how such a broad-band circularly polarizing panel responds to incident illuminating having circular polarization state RHCP.

In the illustrative embodiments shown in FIGS. 10A1 and 10A2, the backlighting structure 7 is realized in a manner described above. Understandably, there are other techniques for producing a plane of unpolarized light for use in connection with the LCD panel of the present invention.

In the illustrative embodiment of FIGS. 10A and 10A2, the pixelated polarization rotating array 9 shown in FIG. 8 is realized as an array of electronically-controlled circular polarization rotating elements 9" which rotate the circularly polarized electric field from the LHCP direction to the RHCP direction as the light rays are transmitted through the spatially corresponding pixels in the LCD panel. In the illustrative embodiment of FIGS. 10A1 and 10A2, each electronically-controlled circular polarization rotating element 9A", 9B", 9C" can be realized as a $\pi$-cell, whose operation is by controlled by a control voltage well known in the art. In its electrically-inactive state (i.e. no-voltage is applied), the electric field intensity of light exiting from each $\pi$ cell is substantially zero and thus a "dark" level is produced. In its electrically-active state (i.e. threshold voltage $V_T$ is applied), the electric field intensity of light exiting from the cell is substantially non-zero and thus a "bright" subpixel level is produced.

In the illustrative embodiment of FIGS. 10A1 and 10A2, the array of spectral filtering elements 10A", 10B", 10C" is realized as an array of pass-band circularly polarizing reflective elements 10" formed within a single plane. As indicated in FIGS. 10A1 and 10A2, each pass-band circularly polarizing reflective element in the pixelated pass-band circularly polarizing panel 10" has a RHCP characteristic polarization state, whereas the broad-band circularly polarizing reflective panel 8" adjacent backlighting panel 7 has an LHCP characteristic polarization state and the broad-band circularly polarizing reflective panel 11" has a characteristic polarization state RHCP.

Figure 10D:
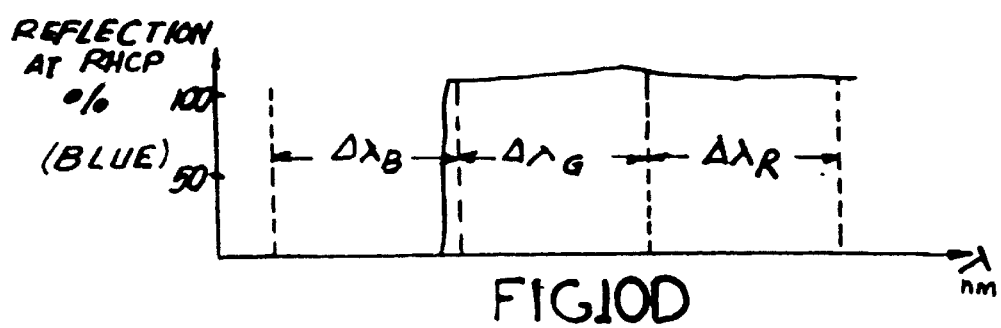
FIG. 10D is a schematic representation graphically illustrating the reflection characteristics of the pass-band circularly polarizing (RHCP) reflective filter element associated with each "blue" subpixel of the LCD panel of FIGS. 10A1 and 10A2, indicating how such a non-absorbing spectral filter element responds to incident broad-band illumination having circular polarization state RHCP.

As shown in FIG. 10D, each pass-band polarizing reflective element 10C" associated with a "blue" subpixel in the pixelated pass-band circularly polarizing panel 10" is particularly designed to reflect nearly 100% all spectral components having the RHCP characteristic polarization state and wavelengths within the green reflective band $\Delta\lambda_G$ and the red reflective band $\Delta\lambda_R$, whereas all spectral components having the RHCP characteristic polarization state and a wavelength within the blue reflective band $\Delta\lambda_B$ are transmitted nearly 100% through the pass-band polarizing reflective element. The pass-band polarizing reflective element associated with each "blue" subpixel is "tuned" during fabrication in the manner described hereinabove.

Figure 10E:
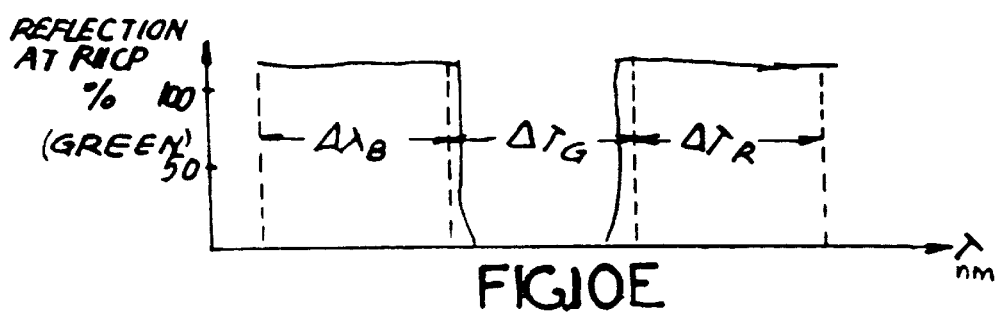
FIG. 10E is a schematic representation graphically illustrating the reflection characteristics of the pass-band circularly polarizing (RHCP) reflective filter element associated with each "green" subpixel of the LCD panel of FIGS. 10A1 and 10A2, indicating how such a non-absorbing spectral filter element responds to incident broad-band illumination having circular polarization state RHCP.

As shown in FIG. 10E, each pass-band polarizing reflective element 10B" associated with a "green" subpixel in the pixelated pass-band circular polarizing panel 10" is particularly designed to reflect nearly 100% all spectral components having the RHCP characteristic polarization state and wavelengths within the red reflective band $\Delta\lambda_R$ and the blue reflective band $\Delta\lambda_B$, whereas all spectral components having the RHCP characteristic polarization state and a wavelength within the green reflective band $\Delta\lambda_G$ are transmitted nearly 100% through the pass-band polarizing reflective element. The pass-band polarizing reflective element associated with each "green" subpixel is "tuned" during fabrication in the manner described hereinabove.

Figure 10F:
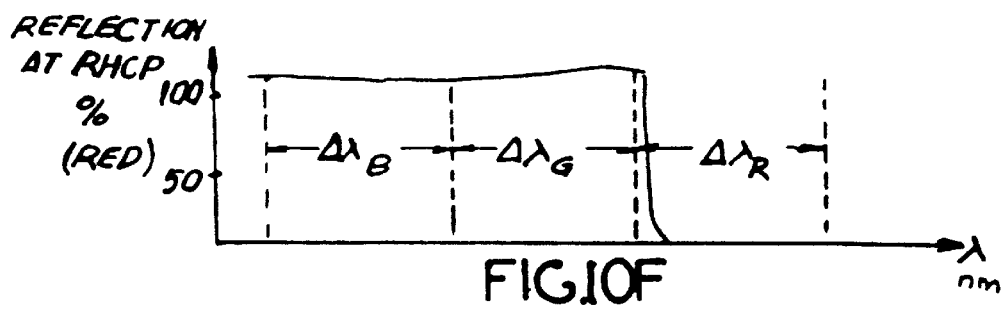
FIG. 10F is a schematic representation graphically illustrating the reflection characteristics of the pass-band circularly polarizing (RHCP) reflective filter element associated with each "red" subpixel of the LCD panel of FIGS. 10A1 and 10A2, indicating how such a non-absorbing spectral filter element responds to incident broad-band illumination having circular polarization state RHCP.

As shown in FIG. 10F, each pass-band polarizing reflective element 10A" associated with a "red" subpixel in the pixelated pass-band circular polarizing panel 10" is particularly designed to reflect nearly 100% all spectral components having the RHCP characteristic polarization state and wavelengths within the green reflective band $\Delta\lambda_G$ and the blue reflective band $\Delta\lambda_B$, whereas all spectral components having the RHCP characteristic polarization state and a wavelength within the red reflective band $\Delta\lambda_R$ are transmitted nearly 100% through the pass-band polarizing reflective element. The pass-band polarizing reflective element associated with each "red" subpixel is "tuned" during fabrication in the manner described hereinabove.

The preferred method of making broad-band circular polarizing reflective panels 8" and 11" shown in FIGS. 10A1 and 10A2 is disclosed in International Application No. PCT/US96/17464 entitled "Super Broad-band Polarizing Reflective Material", supra. The pixelated pass-band circularly polarizing reflective panel 10" can be fabricated in a manner similar to the way described in LCD panel fabrication method described in detail hereinabove.

Notably, the above description of the second illustrative embodiment of LCD panel construction of FIG. 8 has assumed that the complete surface area associated with each subpixel region is available for light intensity modulation and spectral filtering functions. In practice, each subpixel region of the LCD panel of FIGS. 10A1 and 10A2 includes (i) a light transmission region (i.e. aperature region) 50, as shown in FIG. 2B, in which pass-band linear polarizing reflective element is located, and a light blocking region (i.e. stop portion) 51, as shown in FIG. 2B, in which TFTs, wires, etc. are located.

In order to maximize the light transmission efficiency of the LCD panel of FIGS. 10A1 and 10A2, broad-band reflective film material (e.g. broad-band reflector film) 53 is applied over the light blocking region 51 of each subpixel region on the backside thereof. In the first illustrative embodiment described above, a pattern of broad-band reflector film, corresponding to the light blocking portions of the subpixel regions, can be applied to the back surface of the broad-band polarizing reflective panel 8" (facing the backlighting structure) or pixelated spectral filtering panel 10", in spatial registration with the light blocking portions of the subpixel regions. This provides a light reflective mask which prevents the absorption and scattering of produced light from structures associated with the light blocking portion of the subpixels of the LCD panel.

In order to reduce glare at eh surface of the LCD panel due to ambient light incident thereon, a broad-band absorptive film material (e.g. carbonized polymer film) 54 is applied over the light blocking region 51 of each subpixel regions on the front surface thereof. In the first illustrative embodiment described above, a pattern of broad-band absorption film, corresponding to the light blocking portions of the subpixel regions, can be applied to the front surface of the broad-band polarizing panel 11", in spatial registration with the light blocking portions of the subpixel regions. This provides a light reflective mask which prevents reflection and scattering of ambient light off structures associated with the light blocking portion of the subpixels of the LCD panel, and thus reduces glare at the surface of the LCD panel due to ambient light incident thereon.

Operation of the First and Second Illustrative Embodiments of the LCD Panel of the Second Generalized Embodiment of the Present Invention Having described in detail how to make the LCD panels illustrated in FIGS. 8, 9A1, 9A2, and 10A1 and 10A2, it is appropriate at this juncture to now describe their operation with reference to the exemplary pixel structure detailed in such figure drawings.

As shown in FIGS. 9A1 and 9A2, unpolarized light is produced within the backlighting structure and is composed of spectral components having both LP1 and LP2 polarization states. Only spectral components having the LP2 polarization state are transmitted through the broad-band linearly polarizing reflective panel 8' adjacent the backlighting panel 7, whereas spectral components having polarization state LP1 incident thereon are reflected therefrom without energy loss or absorption. Spectral components reflecting off broad-band linearly polarizing reflective panel 8' on the backlighting structure side strike quasi-diffusive reflector 7A, and undergo a polarization inversion (i.e. LP1 and LP2 and LP2 to LP1). This reflection process occurs independent of wavelength. The spectral components having the LP2 polarization state are retransmitted through the broad-band linearly polarizing reflective panel 8' adjacent the backlighting structure.

When a linear polarization rotating element 9A', 9B', 9C' is controlled in its inactive-state as shown in FIG. 9A1, the linear polarization rotating element will transmit the spectral components therethrough independent of wavelength while effecting a conversion in polarization state (i.e. LP1 to LP2 and LP2 to LP1), thereby producing a "bright" subpixel level in response to the inactive-state into which it has been driven.

When a "red" subpixel is driven into its "bright" state as shown in FIG. 9A1, spectral components within the backlighting structure having wavelengths within the "red" band $\Delta\lambda_R$ and a polarization state LP2 (i.e. $\lambda_R^{LP2}$) are transmitted through the broad-band linearly polarizing reflective panel 8', the "red" pass-band linearly polarizing reflective element 10A', the linearly polarization direction rotating element 9A' and the broad-band linearly polarizing reflective panel 11' without absorption. In this state, spectral components within the backlighting structure having wavelengths within the "green" band $\Delta\lambda_G$ and "blue" band $\Delta\lambda_B$ and a polarization state LP2 (i.e. $\lambda_G^{LP2}$ $\lambda_B^{LP2}$) are transmitted through the broad-band linearly polarizing reflective panel 8' and are reflected off the "red" pass-band linearly polarizing reflective element 10A' and retransmitted through broad-band linearly polarizing reflective panel 8' back into the backlighting structure for systemic recycling.

When a "green" subpixel is driven into its "bright" state as shown in FIG. 9A1, spectral components within the backlighting structure having wavelengths within the "green" band $\Delta\lambda_G$ and a polarization state LP2 (i.e. $\lambda_G^{LP2}$) are transmitted through the broad-band linearly polarizing reflective panel 8', the "green" pass-band linearly polarizing reflective element 10B', the linear polarization direction rotating element 9B' and the broad-band linearly polarizing reflective panel 11' without absorption. In this state spectral components within the backlighting structure having wavelengths within the "red" band $\Delta\lambda_R$ and "blue" band $\Delta\lambda_B$ and a polarization state LP2 (i.e. $\lambda_R^{LP2}$ $\lambda_B^{LP2}$) are transmitted through the broad-band linear polarizing reflective panel 8' and reflected off the "green" pass-band linearly polarizing reflective element 10B' and retransmitted through broad-band linearly polarizing reflective panel 8' back into the backlighting structure for systemic recycling.

When a "blue" subpixel is driven into its "bright" state as shown in FIG. 10A1, spectral components within the backlighting structure having wavelengths within the "blue" band $\Delta\lambda_B$ and a polarization state LP2 (i.e. $\lambda_B^{LP2}$) are transmitted through the broad-band linearly polarizing reflective panel 8', the "blue" pass-band linearly polarizing reflective element 10C', the linear polarization direction rotating element 9C' and the broad-band linearly polarizing reflective panel 11' without absorption. In this state, spectral components within the backlighting structure having wavelengths within the "red" band $\Delta\lambda_R$ and "green" band $\Delta\lambda_G$ and a polarization state LP2 (i.e. $\lambda_R^{LP2}$ $\lambda_G^{LP2}$) are transmitted through the broad-band linearly polarizing reflective panel 8' and reflected off the "blue" pass-band linearly polarizing reflective element 10C' and retransmitted through the broad-band linearly polarizing reflective panel 8' back into the backlighting structure for systemic recycling.

When a linear polarization rotating element associated with a red, green or blue subpixel is driven into its active state as shown in FIG. 9A2, the linear polarization rotating element associated therewith will transmit the spectral components therethrough independent of wavelength without effecting an orthogonal conversion in polarization state (i.e. LP1 to LP1 or LP2 to LP2), thereby producing a "dark" subpixel level in response to the active-state into which it has been driven.

When a "red" subpixel is driven into its "dark" state shown in FIG. 9A2, spectral components within the backlighting structure having wavelengths within the "red" band $\Delta\lambda_R$ and polarization state LP2 (i.e. $\lambda_R^{LP2}$) are transmitted through the broad-band linearly polarizing reflective panel 8', the "red" pass-band linearly polarizing reflective element 10A' and linear polarization direction rotating element 9A' and reflect off broad-band linearly polarizing reflective panel 11' without absorption. The reflected "red" spectral components with the LP2 polarization state (i.e. $\lambda_R^{LP2}$) are then retransmitted through the linear polarization direction rotating element 9A', the pass-band linearly polarizing reflective element 10A', and the broad-band linearly polarizing reflective panel 8' back into the backlighting structure for recycling among neighboring subpixels. At the same time, spectral components having wavelengths within the "green" band $\Delta\lambda_G$ or "blue" band $\Delta\lambda_B$ and polarization state LP2 (i.e. $\lambda_G^{LP2}$, $\lambda_B^{LP2}$) are transmitted through broad-band linearly polarizing reflective panel 8' and reflected off the "red" pass-band polarizing reflective element 10A' and then retransmitted through the broad-band linearly polarizing reflective panel 8' back into the backlighting structure for recycling among neighboring subpixels.

When a "green" subpixel is driven into its "dark" state shown in FIG. 9A2, spectral components within the backlighting structure having wavelengths within the "green" band $\Delta\lambda_G$ and polarization state LP2 (i.e. $\lambda_G^{LP2}$) are transmitted through the broad-band linearly polarizing reflective panel 8', the "green" pass-band linearly polarizing reflective element 10B' and linear polarization direction rotating element 9B' and reflect off broad-band linearly polarizing reflective panel 11' without absorption. The reflected "green" spectral components with the LP2 polarization state (i.e. $\lambda_G^{LP2}$) are then retransmitted through the linear polarization direction rotating element 9B' (without polarization rotation), the pass-band linearly polarizing reflective element 10B', and the broad-band linearly polarizing reflective panel 8' back into the backlighting structure for recycling among neighboring subpixels. At the same time, spectral components having wavelengths within the "red" band $\Delta\lambda_R$ or "blue" band $\Delta\lambda_B$ and polarization state LP2 (i.e. $\lambda_R^{LP2}$, $\lambda_B^{LP2}$) are transmitted through broad-band polarizing reflective panel 8' and reflected off the "green" pass-band polarizing reflective element 10B', and then retransmitted through the broad-band linearly polarizing reflective panel 8' back into the backlighting structure for recycling among neighboring subpixels.

When a "blue" subpixel is driven into its "dark" state shown in FIG. 9A2, spectral components within the backlighting structure having wavelengths within the "blue" band $\Delta\lambda_B$ and polarization state LP2 (i.e. $\lambda_B^{LP2}$) are transmitted through the broad-band linearly polarizing reflective panel 8', the "blue" pass-band linearly polarizing reflective element 10C' and linear polarization direction rotating element 9C' and reflect off the broad-band linearly polarizing reflective panel 11' without absorption. The reflected "blue" spectral components with the LP2 polarization state (i.e. $\lambda_B^{LP2}$) are then retransmitted through the linear polarization direction rotating element 9C' (without polarization rotation), the pass-band linearly polarizing reflective element 10C', and the broad-band linearly polarizing reflective panel 8' back into the backlighting structure for recycling among neighboring subpixels. At the same time, spectral components within the backlighting structure having wavelengths within the "red" band $\Delta\lambda_R$ or "green" band $\Delta\lambda_G$ and polarization state LP2 (i.e. $\lambda_R^{LP2}$, $\lambda_G^{LP2}$) are transmitted through broad-band linearly polarizing reflective panel 8' and reflected off the "blue" pass-band polarizing reflective element 10B' and then retransmitted through the broad-band linearly polarizing reflective panel 8' back into the backlighting structure for recycling among neighboring subpixels.

As shown in FIGS. 10A1 and 10A2, unpolarized light is produced within the backlighting structure and is composed of spectral components having both LHCP and RHCP polarization states. Only spectral components within the backlighting structure having the RHCP polarization state are transmitted through the broad-band circularly polarizing reflective panel 8" adjacent the backlighting structure 7, whereas spectral components therewithin having polarization state LHCP incident thereon are reflected therefrom without energy loss or absorption. Spectral components reflecting off broad-band circularly polarizing reflective panel 8" on the backlighting structure side strike quasi-diffusive reflector 7A and undergo a polarization inversion (i.e. LHCP to RHCP and RHCP to LHCP). This reflection process occurs independent of wavelength. Only spectral components having the RHCP polarization state are retransmitted through the broad-band circularly polarizing reflective panel along the projection axis of the LCD panel.

When a circular polarization rotating element associated with a red, green or blue subpixel is driven into its active-state as shown in FIG. 10A1, the circular polarization rotating element associated therewith transmits the spectral components therethrough independent of wavelength while effecting an orthogonal conversion in polarization state (i.e. LHCP to RHCP and RHCP to LHCP), thereby producing a "bright" subpixel level in response to the active-state into which it has been driven.

When a "red" subpixel is driven into its "bright" state shown in FIG. 10A1, spectral components within the backlighting structure having wavelengths within the "red" band $\Delta\lambda_R$ and polarization state RHCP (i.e. $\lambda_R^{RHCP}$) are transmitted through the broad-band circularly polarizing reflective panel 8", the "red" pass-band circularly polarizing reflective element 10A", the circular polarization direction rotating element 9A", and the broad-band circularly polarizing reflective panel 11" without absorption. The "green" and "blue" spectral components with the RHCP polarization state (i.e. $\lambda_G^{RHCP}$, $\lambda_B^{RHCP}$) are transmitted through the broad-band linearly polarizing reflective panel 8" and reflected off the "red" pass-band circularly polarizing reflective element 10A", and are retransmitted through the broad-band circularly polarizing reflective panel 8" back into the backlighting structure for recycling among neighboring subpixels.

When a "green" subpixel is driven into its "bright" state shown in FIG. 10A1, spectral components having wavelengths within the "green" band and polarization state RHCP (i.e. $\lambda_G^{RHCP}$) are transmitted through the broad-band circularly polarizing reflective panel 8", the "green" pass-band circularly polarizing reflective element 10B", the circular polarization direction rotating element 9B", and the broad-band circularly polarizing reflective panel 11" without absorption. The "red" and "blue" spectral components with the RHCP polarization state (i.e. $\lambda_R^{RHCP}$, $\lambda_B^{RHCP}$) are transmitted through the broad-band circularly polarizing reflective panel 8" and reflected off the "green" pass-band circularly polarizing reflective element 10B", and are retransmitted through the broad-band circularly polarizing reflective panel 8" back into the backlighting structure for recycling among neighboring subpixels.

When a "blue" subpixel is driven into its "bright" state shown in FIG. 10A1, spectral components within the backlighting structure having wavelengths within the "blue" band $\Delta\lambda_B$ and polarization state RHCP (i.e. $\lambda_B^{RHCP}$) are transmitted through the broad-band linear polarizing reflective panel 8', the "blue" pass-band circularly polarizing reflective element 10C", the circular polarization direction rotating element 9C", and the broad-band circularly polarizing reflective panel 11" without absorption. The "red" and "green" spectral components with the RHCP polarization state (i.e. $\lambda_R^{RHCP}$, $\lambda_G^{RHCP}$) are transmitted through the broad-band circularly polarizing reflective panel 8" and reflected off the "blue" pass-band circularly polarizing reflective element 10C", and are retransmitted through the broad-band circularly polarizing reflective panel 8" back into the backlighting structure for recycling among neighboring subpixels.

When a circular polarization rotating element is controlled in its inactive-state as shown in FIG. 10A2, the polarization rotating element transmits the spectral components therethrough independent of wavelength without effecting a conversion in polarization state, thereby producing a "dark" subpixel level.

When a "red" subpixel is driven into its "dark" state as shown in FIG. 10A2, spectral components within the backlighting structure having wavelengths within the "red" band, $\Delta\lambda_R$ and a polarization state RHCP (i.e. $\lambda_R^{RHCP}$) are transmitted through the broad-band circularly polarizing reflective panel 8", the "red" pass-band circularly polarizing reflective element 10A" and the circular polarization rotating element 9A" and reflected off the broad-band circularly polarizing reflective panel 11" without absorption. In this state, these reflected spectral components are then retransmitted through the circular polarization rotating element 9A", the "red" pass-band circular polarizing reflective element 10A" and the broad-band circularly polarizing reflective panel 8" back into the backlighting structure for recycling among the neighboring subpixels.

Spectral components within the backlighting structure having wavelengths within the "green" band $\Delta\lambda_G$ "blue" band $\Delta\lambda_B$ and a polarization state RHCP (i.e. $\lambda_G^{RHCP}$ $\lambda_B^{RHCP}$) are transmitted through the broad-band circularly polarizing reflective panel 8" and are reflected off the "red" pass-band circularly polarizing reflective element 10A" and retransmitted through the broad-band circularly polarizing reflective panel 8" back into the backlighting structure for recycling among neighboring subpixels.

When a "green" subpixel is driven into its "dark" state as shown in FIG. 10A2, spectral components within the backlighting structure having wavelengths within the "green" band $\Delta\lambda_G$ and a polarization state RHCP (i.e. $\lambda_G^{RHCP}$) are transmitted through the broad-band circularly polarizing reflective panel 8", the "green" pass-band circularly polarizing reflective element 10B" and the circular polarization rotating element 9B" and reflected off the broad-band circularly polarizing reflective panel 11" without absorption. In this state, these reflected spectral components are then retransmitted through the circular polarization rotating element 9B", the "green" pass-band circular polarizing reflective element 10B" and the broad-band circularly polarizing reflective panel 8" back into the backlighting structure for recycling among the neighboring subpixels. Spectral components within the backlighting structure having wavelengths within the "red" band $\Delta\lambda_R$ or "blue" band $\Delta\lambda_B$ and a polarization state RHCP (i.e. $\lambda_R^{RHCP}$, $\lambda_B^{RHCP}$) are transmitted through the broad-band circularly polarizing reflective panel 8" and are reflected off the "green" pass-band circularly polarizing reflective element 10B" and retransmitted through the broad-band circularly polarizing reflective panel 8" back into the backlighting structure for recycling among neighboring subpixels.

When a "blue" subpixel is driven into its "dark" state as shown in FIG. 10A2, spectral components within the backlighting structure having wavelengths within the "blue" band $\Delta\lambda_B$ and a polarization state RHCP (i.e. $\lambda_B^{RHCP}$) are transmitted through the broad-band circularly-polarizing reflective panel 8", the "blue" pass-band circularly polarizing reflective element 10C", and the circular polarization rotating element 9C" and reflected off the broad-band circularly polarizing reflective panel 11" without absorption. In this state, these reflected spectral components are then retransmitted through the circular polarization rotating element 9C", the "blue" pass-band circularly polarizing reflective element 10C" and the broad-band circularly polarizing reflective panel 8" back into the backlighting structure for recycling among the neighboring subpixels. Spectral components within the backlighting structure having wavelengths within the "red" band $\Delta\lambda_R$ or "green" band $\Delta\lambda_G$ and a polarization state RHCP (i.e. $\lambda_R^{RHCP}$ $\lambda_G^{RHCP}$) are transmitted through the broad-band circularly polarizing reflective panel 8" and are reflected off the "blue" pass-band circularly polarizing reflective element 10C" and retransmitted through the broad-band circularly polarizing reflective panel 8" back into the backlighting structure for recycling among neighboring subpixels.

Alternative Embodiments of the LCD Panel Hereof

Expectedly, the extinction ratio for the broad-band linearly polarizing reflective panels employed in the LCD panels of FIGS. 2 and 8 may be less than optimum. Consequently, a small percentage of incident light energy passing through the LCD panel will be imparted with the orthogonal polarization state and will be perceived by the viewer as spatial noise, degrading the image contrast attainable by the display system.

Surprisingly, it has been discovered that it is possible to markedly improve the contrast of image displayed from the LCD panels hereof by employing energy absorbing polarizers within the LCD panel construction in a way which absorbs orthogonal "noise" components produced by the broad-band polarizing "reflective" panels employed therein, without effecting the light recycling mechanisms carried out at the various stages of the LCD panel. As will be described in greater detail below, this technique involves mounting to each broad-band polarizing reflective panel, and absorptive-type broad-band polarizing filter having a polarization state that is "matched" to the polarization state of its corresponding broad-band polarizing reflective panel. Modified versions of the four illustrative LCD panel embodiments hereof are shown in FIGS. 11 through 14.

Figure 11:
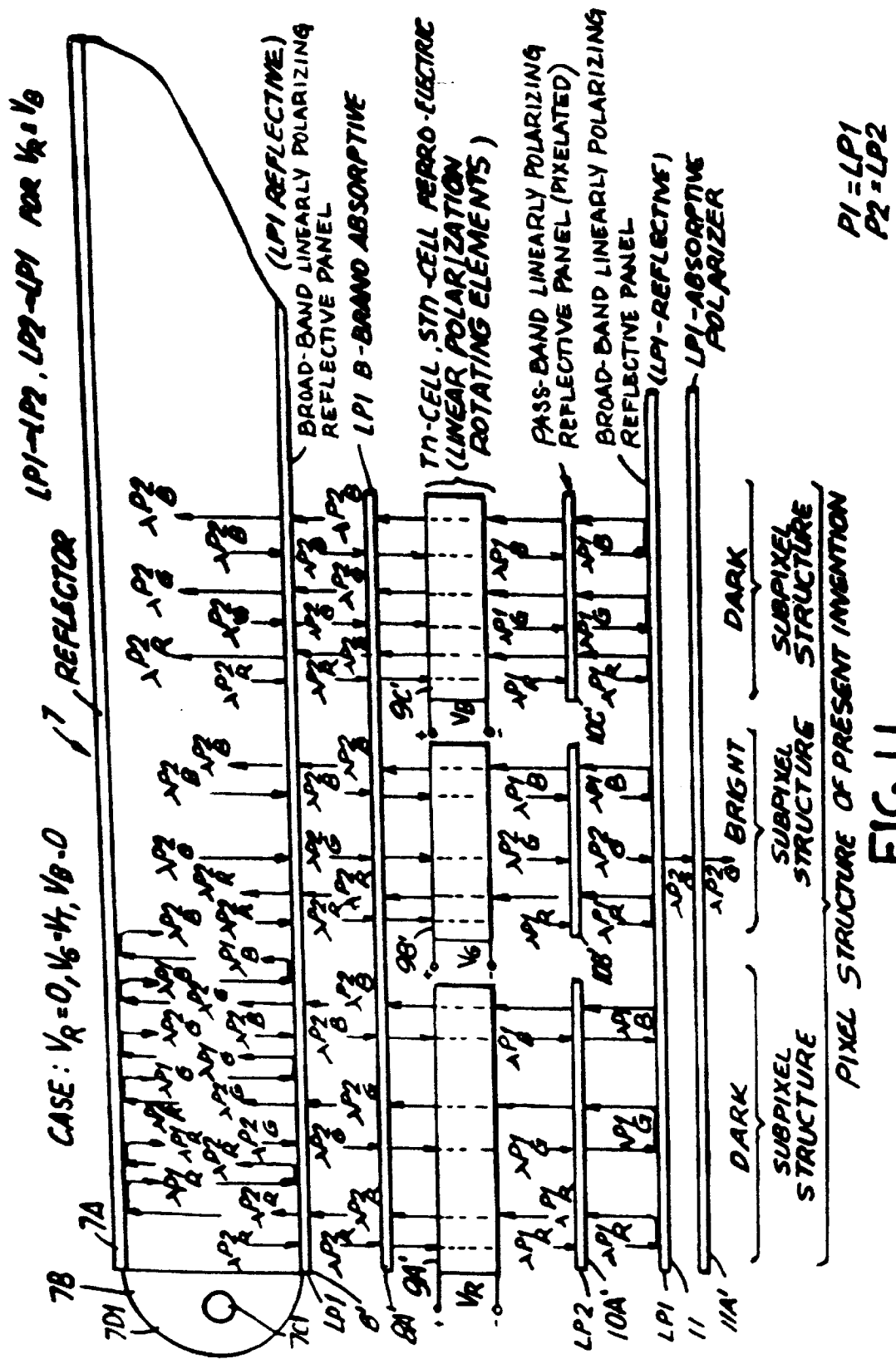
FIG. 11 is a schematic representation of an exploded, cross-sectional view of an exemplary pixel structure within a third embodiment of the LCD panel shown in FIG. 2, wherein the spatial-intensity modulating elements of the LCD panel are realized using linear-type polarization rotating elements, the pixel driver signals provided thereto are selected to produce "dark" output levels the red and blue subpixels of the exemplary pixel structure and a "bright" output level at the green subpixel level, and broad-band absorptive linear polarizer is used in conjunction with each broad-band polarizing reflective panel in the LCD panel in order to provide improved image contrast in images displayed therefrom.

In FIG. 11, the LCD panel of FIGS. 3A1 and 3A2 is shown modified by mounting a first broad-band absorptive linear polarizer 8A' to the front surface of broad-band polarizing reflective panel 8', and mounting a second broad-band absorptive linear polarizer, 11A' to the front surface of broad-band polarizing reflective panel 11'. The polarization state of broad-band absorptive liner polarizer panel 8' is LP1 in order to match the LP1 polarization state of broad-band linearly polarizing reflective panel 8'. Such polarization matching ensures that spectral energy which is not reflected from the broad-band polarizing reflective panel 8', but is transmitted (i.e. leaked) therethrough due to a suboptimal extinction ratio, is absorbed by the broad-band absorptive linear polarizer 8A' through energy dissipation. Similarly, the polarization state of broad-band absorptive liner polarizer 11A' is LP1 in order to match the LP1 polarization state of broad-band polarizing reflective panel 11'. Such polarization matching ensures that spectral energy which is not reflected from the broad-band linearly polarizing reflective panel 11', but is transmitted (i.e. leaked) therethrough due to a suboptimal extinction ratio, is absorbed by the broad-band absorptive linear polarizer 11A' through energy dissipation. The use of broad-band absorptive linear polarizers 8A' and 11A' substantially improves the contrast of images formed by the LCD panel, without reducing the light transmission efficiency along the light projection axis of the LCD panel which, as shown in FIG. 2, extends from the backlighting structure towards the eyes of the viewer. Such broad-band absorptive polarizers can be realized using dichroic polarizing material well known in the art. Preferably, these absorptive polarizing filter panels 8A' and 11A' are laminated directly onto broad-band linearly polarizing reflective panels 8' and 11', respectively, during the fabrication process of the LCD panel.

Figure 12:
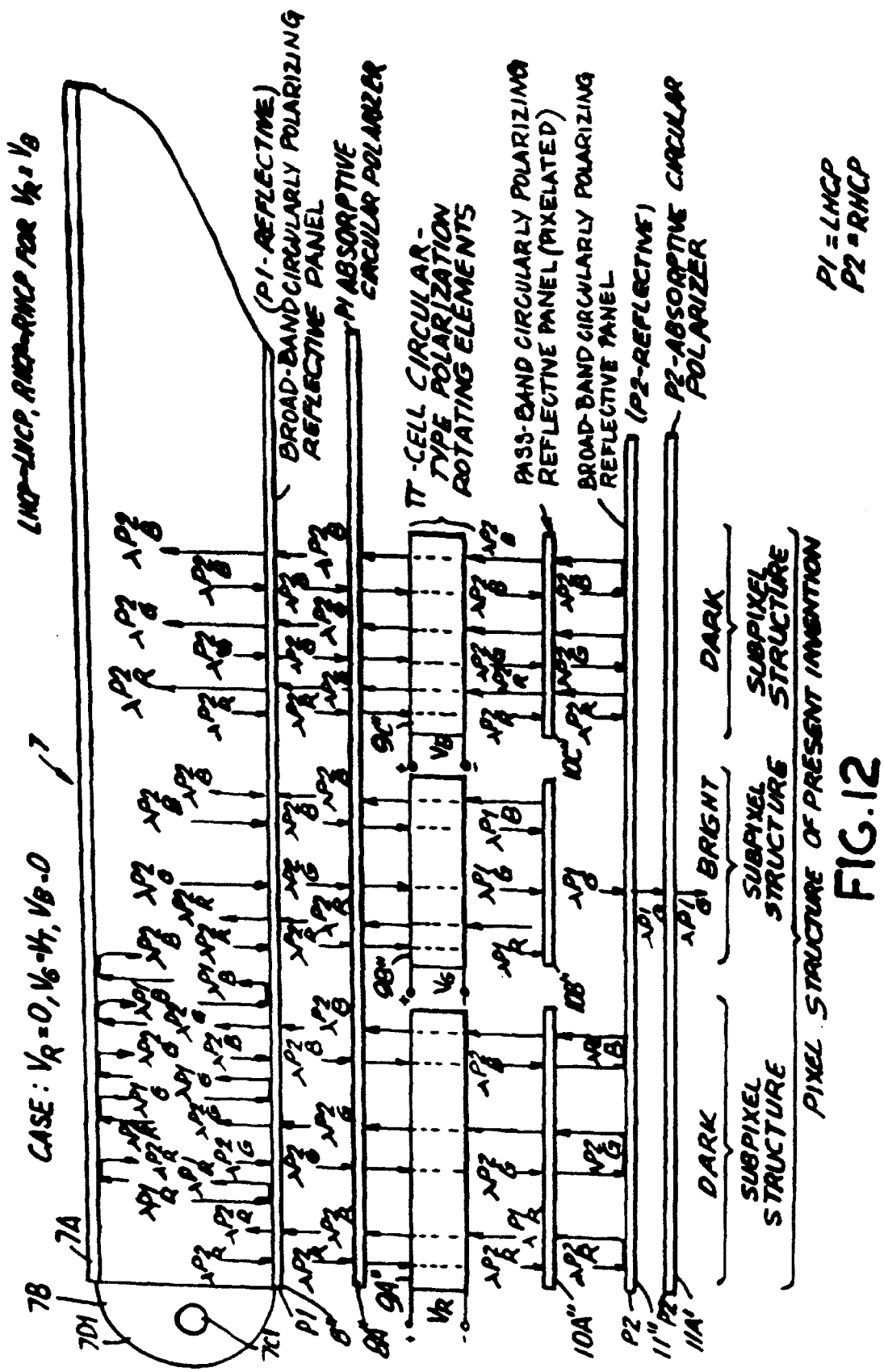
FIG. 12 is a schematic representation of an exploded, cross-sectional view of an exemplary pixel structure within a fourth embodiment of the LCD panel shown in FIG. 2, wherein the spatial-intensity modulating elements of the LCD panel are realized using circular-type polarization rotating elements, the pixel driver signals provided thereto are selected to produce "dark" output levels at the red and blue subpixels of the exemplary pixel structure and a "bright" output level at the green subpixel level, and a broad-band absorptive linear polarizer is used in conjunction with each broad-band polarizing reflective panel in the LCD panel in order to provide improved image contrast in the images displayed therefrom.

In FIG. 12, the LCD panel of FIGS. 4A1 and 4A2 is shown modified by mounting a first broad-band absorptive circular polarizer 8A" to the front surface of broad-band circularly polarizing reflective panel 8", and mounting a second broad-band absorptive circular polarizer panel 11A" to the front surface of broad-band circularly polarizing reflective panel 11". The polarization state of broad-band absorptive circular polarizer panel 8A" is LHCP in order to match the LHCP polarization state of broad-band circularly polarizing reflective panel 8". Such polarization matching ensures that spectral energy which is not reflected from the broad-band circularly polarizing reflective panel 8", but is transmitted (i.e. leaked) therethrough due to a suboptimal extinction ratio, is absorbed by the broad-band absorptive circular polarizer 8A" through energy dissipation. Similarly, the polarization state of broad-band absorptive circular polarizer panel 11A" is RHCP in order to match the RHCP polarization state of broad-band circularly polarizing reflective panel 11". Such polarization matching ensures that spectral energy which is not reflected from the broad-band polarizing reflective panel 11", but is transmitted (i.e. leaked) therethrough due to a suboptimal extinction ratio, is absorbed by the broad-band absorptive circular polarizer panel 11A" through energy dissipation. The use of broad-band absorptive circular polarizers 8A" and 11A" substantially improves the contrast of images formed by the LCD panel, without reducing the light transmission efficiency along the light projection axis of the LCD panel. Such broad-band absorptive polarizers can be realized using dichroic polarizing material well known in the art. Preferably, these absorptive circularly polarizing filter panels 8A" and 11A" are laminated directly onto broad-band circularly polarizing reflective panels 8" and 11", respectively, during the fabrication process of the LCD panel.

Figure 13:
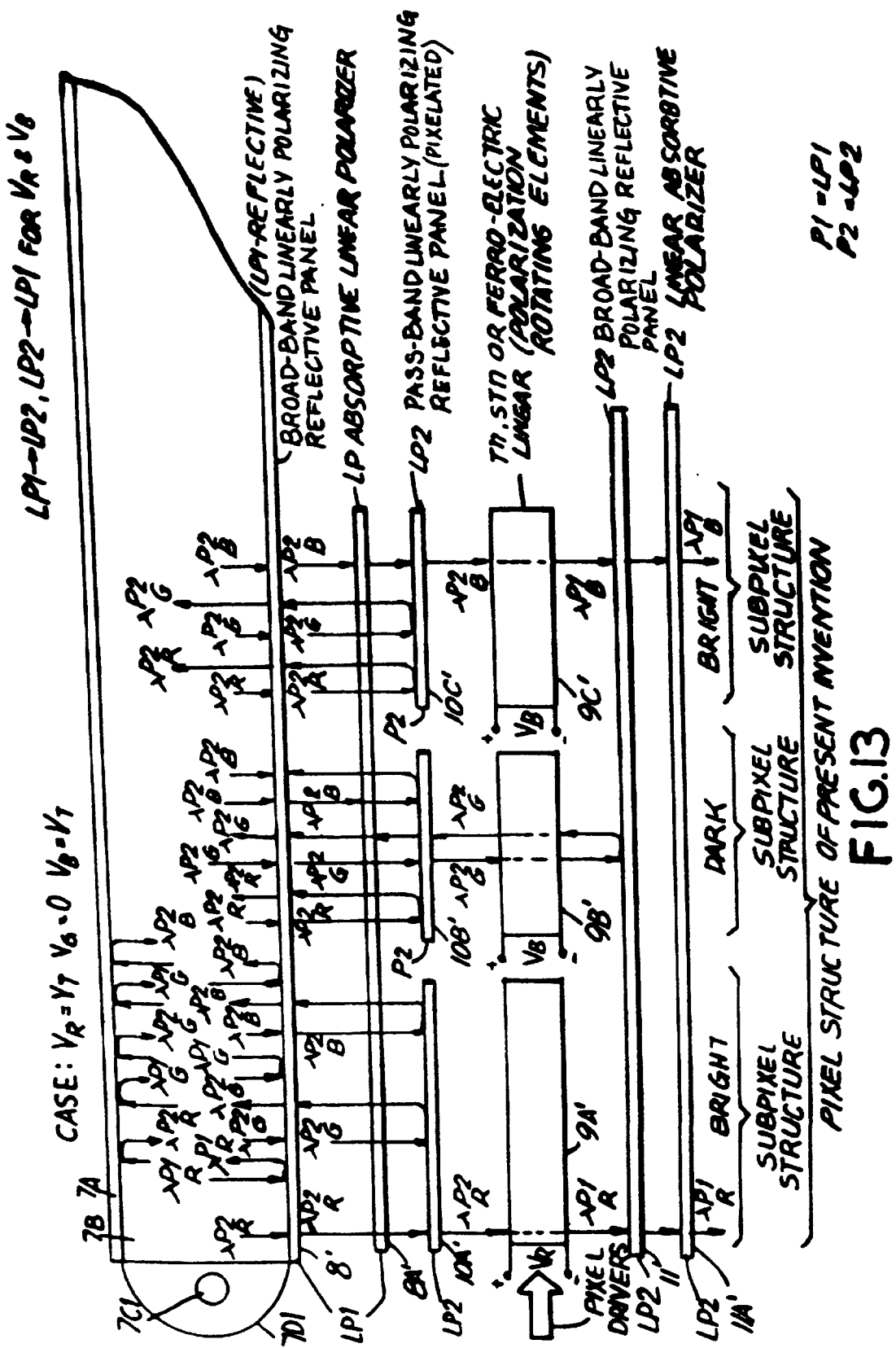
FIG. 13 is a schematic representation of an exploded, cross-sectional view of an exemplary pixel structure within a third embodiment of the LCD panel shown in FIG. 8, wherein the spatial-intensity modulating elements of the LCD panel are realized using linear-type polarization rotating elements, the pixel driver signals provided thereto are selected to produce "bright" output levels the red and blue subpixels of the exemplary pixel structure and a "dark" output level at the green subpixel level, and a broad-band absorptive linear polarizer is used in conjunction with each broad-band polarizing reflective panel in the LCD panel in order to provide improved image contrast in the images displayed therefrom.

In FIG. 13, the LCD panel of FIGS. 9A1 and 9A2 is shown modified by mounting a first broad-band absorptive linear polarizer 8A' to the front surface of broad-band linearly polarizing reflective panel 8', and mounting a second broad-band absorptive linear polarizer panel 11A' to the front surface of broad-band linearly polarizing reflective panel 11'. The polarization state of broad-band absorptive linear polarizer panel 8A' is LP1 in order to match the LP1 polarization state of broad-band linearly polarizing reflective panel 8'. Such polarization matching ensures that spectral energy which is not reflected from the broad-band linearly polarizing reflective panel 8', but is transmitted (i.e. leaked) therethrough due to a suboptimal extinction ratio, is absorbed by the broad-band absorptive linear polarizer panel 8A' through energy dissipation. Similarly, the polarization state of broad-band absorptive linear polarizer panel 11A' is LP2 in order to match the LP2 polarization state of the broad-band linearly polarizing reflective panel 11'. Such polarization matching ensures that spectral energy which is not reflected from the broad-band polarizing reflective panel 11', but is transmitted (i.e. leaked) therethrough due to a suboptimal extinction ratio, is absorbed by the broad-band absorptive linear polarizer 11A' through energy dissipation. Preferably, these absorptive polarizing filter panels 8A' and 11A' are laminated directly onto broad-band linearly polarizing reflective panels 8 and 11, respectively. The use of broad-band absorptive liner polarizers 8A' and 8A" substantially improves the contrast of images formed by the LCD panel, without reducing the light transmission efficiency along the light projection axis of the LCD panel. Such broad-band absorptive polarizers can be realized using dichroic polarizing material well known in the art.

Figure 14:
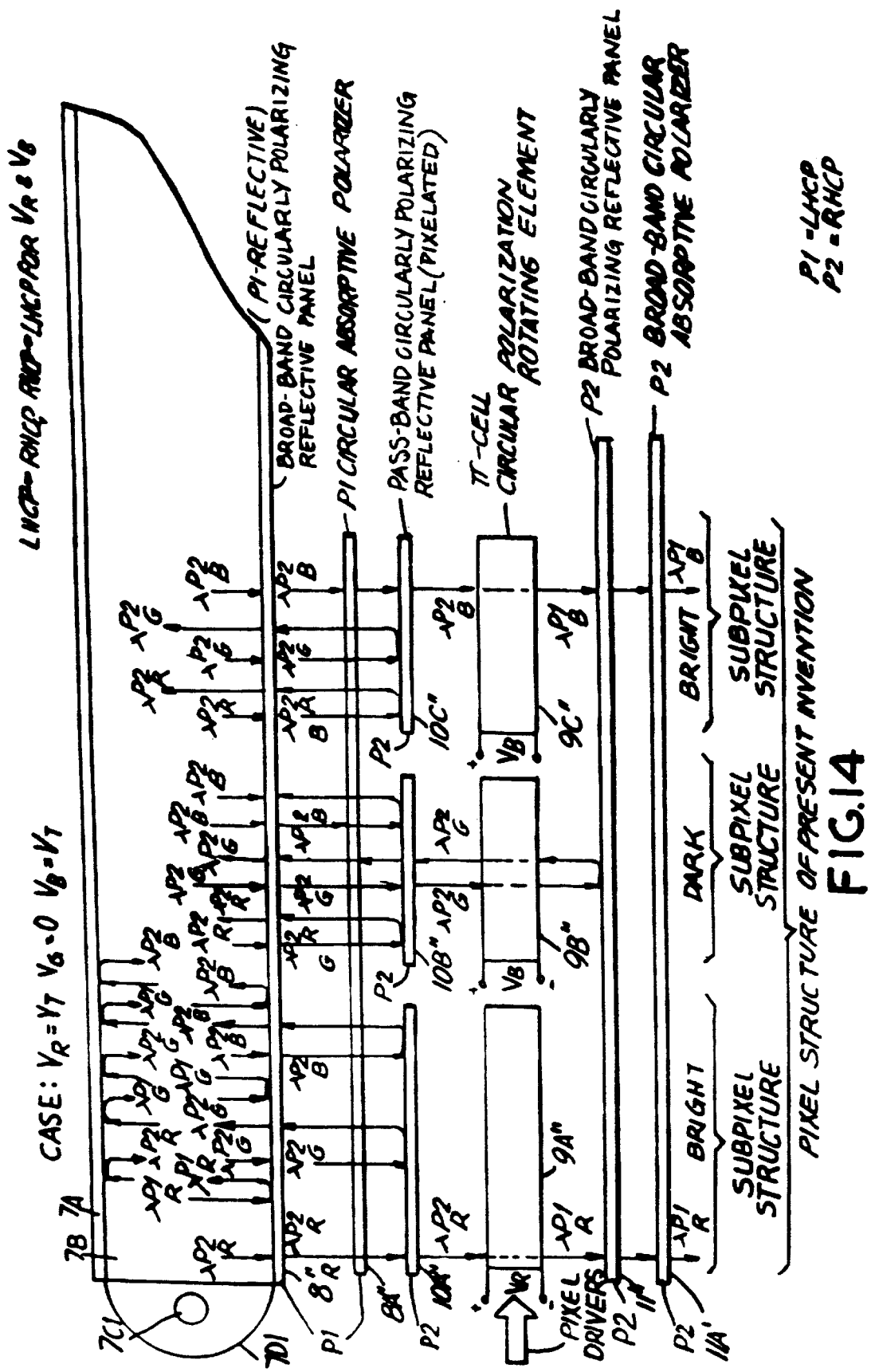
FIG. 14 is a schematic representation of an exploded, cross-sectional view of an exemplary pixel structure within a fourth embodiment of the LCD panel shown in FIG. 8, wherein the spatial-intensity modulating elements of the LCD panel are realized using circular-type polarization rotating elements, the pixel driver signals provided thereto are selected to produce "bright" output levels the red and blue subpixels of the exemplary pixel structure and a "dark" output level at the green subpixel level, and a broad-band absorptive linear polarizer is used in conjunction with each broad-band polarizing reflective panel in the LCD panel in order to provide improved image contrast in the images displayed therefrom.

In FIG. 14, the LCD panel of FIGS. 10A1 and 10A2 is shown modified by mounting a first broad-band absorptive circular polarizer panel 8A" to the front surface of broad-band circularly polarizing reflective panel 8", and mounting a second broad-band absorptive circular polarizer panel 11A" to the front surface of broad-band circularly polarizing reflective panel 11". The polarization state of broad-band absorptive circular polarizer panel 8A" is LHCP in order to match the LHCP polarization state of broad-band circularly polarizing reflective panel 8". Such polarization matching ensures that spectral energy which is not reflected from the broad-band polarizing reflective panel 8", but is transmitted (i.e. leaked) therethrough due to a suboptimal extinction ratio, is absorbed by the broad-band absorptive circular polarizer panel 8A" through energy dissipation. Similarly, the polarization state of broad-band absorptive circular polarizer panel 11A" is RHCP in order to match the RHCP polarization state of broad-band polarizing reflective panel 11". Such polarization matching ensures that spectral energy which is not reflected from the broad-band polarizing reflective panel 11", but is transmitted (i.e. leaked) therethrough due to a suboptimal extinction ratio, is absorbed by the broad-band absorptive circular polarizer panel 11A" through energy dissipation. Preferably, these absorptive circularly polarizing filter panels 8A" and 11A" are laminated directly onto broad-band circularly polarizing reflective panels 8" and 11", respectively. The use of broad-band absorptive circular polarizers 8A" and 11A" substantially improves the contrast of images formed by the LCD panel, without reducing the light transmission efficiency along the light projection axis of the LCD panel. Such broad-band absorptive polarizers can be realized using dichroic polarizing material well known in the art.

Figure 15:
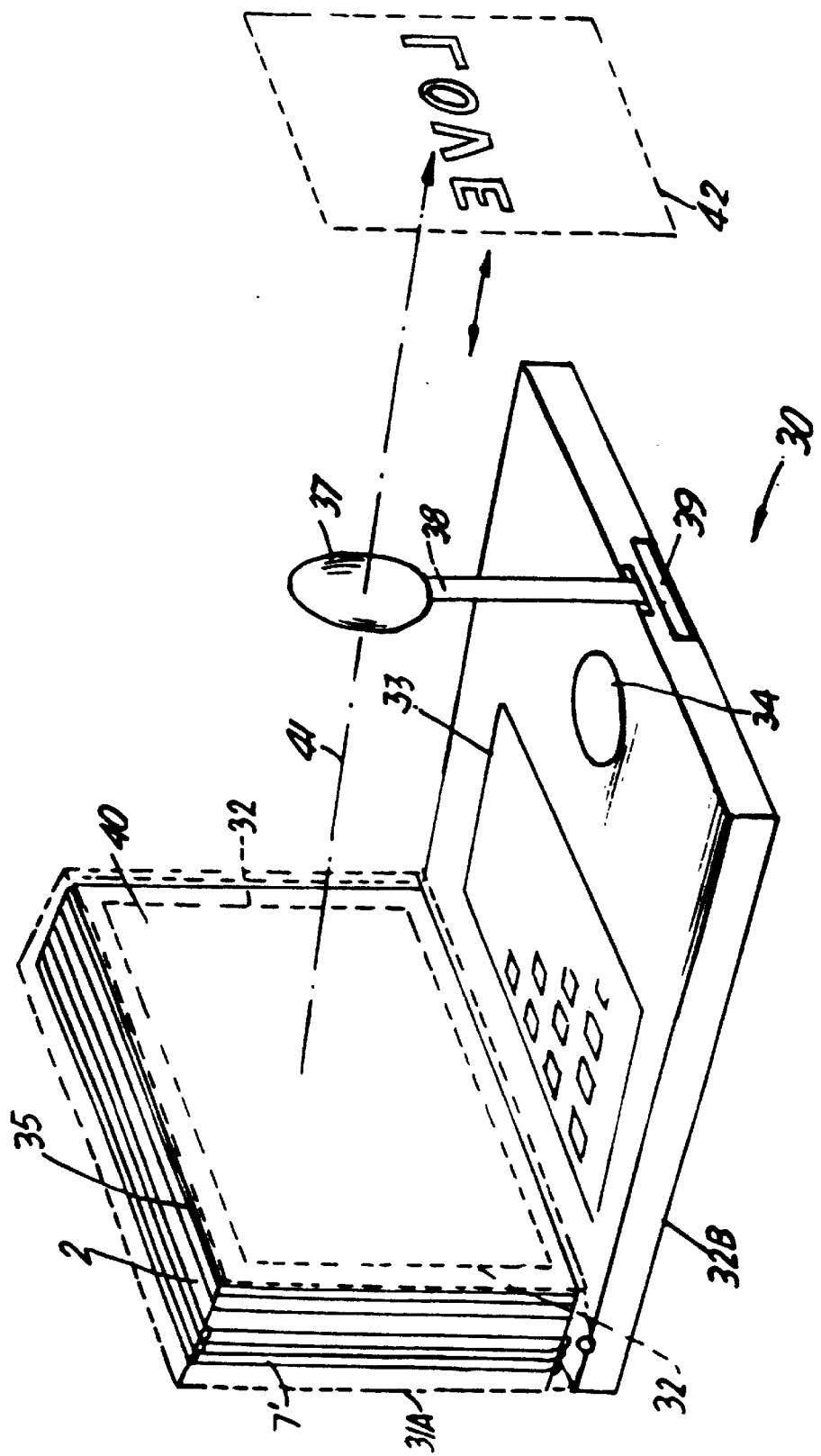
FIG. 15 is a schematic representation of a portable color image projection system in the form of a laptop computer, wherein a plurality of conventional backlighting structures are cascaded together and mounted to the rear portion of an LCD panel according to the present invention in order to provide an LCD panel assembly that can be mounted within the display portion of the system housing and project bright images onto a remote surface without the use of an external light source or a rear opening in the display portion of the housing, for projecting light therethrough during its projection-viewing mode of operation.

In general, there are many applications to which the LCD panels of the present invention can be put. One such application is illustrated in FIG. 15. As shown, the LCD panel thereof can be integrated into a ultra-high brightness color image projection system of transportable design. In this particular embodiment, the image projection system is embodied within a laptop computer system having both direct and projection viewing modes, similar to the systems described in Applicant's: International Application No. PCT/US96/19718; International Application No. PCT/US95/12846; and International Application No. PCT/US95/05133, each incorporated herein by reference in its entirety.

An Illustrative Application of LCD Panel of the Present Invention

As shown in FIG. 15, portable image projection system 30 comprises a number of subsystem components, namely: a compact housing of transportable construction having a display portion 31A with a frontwardly located display window 32, and a base portion 32B hingedly connected to the display portion 31A and having a keypad 33 and a pointing device 34; and LCD panel 2, 2' according to the present invention described above, mounted within the housing display portion 31A; an ultra-thin projection lens panel 35 (e.g. Fresnel lens, holographic lens, etc.) laminated to the front surface of the LCD panel 2; a backlighting structure 7' of cascaded construction, mounted to the rear of the LCD panel 2 in a conventional manner; associated apparatus 36, (e.g. pixel driver circuitry, image display buffers, an image display controller, a rechargeable battery power supply input/output circuitry for receiving video input signals from various types of external sources, microprocessor and associated memory, etc.), contained within the base portion 31B; a projection lens 37 supported by a bracket 38 which can be removed during the direct viewing mode and stored within a compartment 39 formed within the base portion of the housing; and an electro-optically controllable light diffusing panel 40 which does not scatter backprojected light in the projection viewing mode, and scatters back project light in the direct viewing mode.

In the direct-viewing mode of the system of FIG. 15, the projection lens 38 is stored within compartment 39, electro-optically controllable light diffusing panel 40 is switched to its light scattering state, and the backlighting structure produces light which is spatial-intensity modulated and spectrally filtered to produce color images on the surface of the LCD panel 2. In the projection-viewing mode, the projection lens 38 is mounted along the projection axis (optical axis) 41 of the Fresnel lens panel 35, electro-optically controllable light diffusing panel 40 is switched to its light non-scattering state, and the backlighting structure produces light which is spatial-intensity modulated and spectrally filtered to produce color images on the surface of the LCD panel 2. Projection lens 37 projects the formed color image onto a remote viewing surface 42 for projection viewing. By virtue of the ultra-high light transmission efficiency of the LCD panel 2 hereof, the system of FIG. 15 can projected bright color images onto remote surfaces without the use of external high-intensity lighting sources required by prior art LCD projection systems. In portable applications, such images can be projected using the battery power source aboard the transportable system. With this design, there is not need for a rearwardly opening window in the back of display housing portion 31A, required of prior art projection system. When not in use, the system easily folds into a ultra-slim book-like configuration for easy of storage and transportability.

Modifications

Having described in the illustrative embodiments of the present invention, several modifications readily come to mind.

In each illustrative embodiment of the LCD panel hereof, the light "reflecting" properties of the subpixel spectral filter elements 10A, 10B, 10C have been realized using the polarization-reflective properties of CLC materials. It is understood, however, that these subcomponents of the LCD panel of the present invention may be realized using other enabling technologies, such as: (i) holographic reflective filter technology of the type disclosed in "Holographic Color Filters for LCDs" by John Biles, published in SID 94 DIGEST, pages 403–406; and/or (ii) thin film optical interference filter technology of the type disclosed in "Design Issues in Using Thin-Film Optical Interference Filters as Color Filters for LCD System Applications" by S-F. Chen and H-P D. Shieh, published in SID 94 DIGEST (1994), pages 411–416; each being incorporated herein by reference.

In such alternative embodiments, it would be preferred to employ broad-band polarizing reflective panels 8 and 11 having the polarization reflective properties as described hereinabove so that the systemic light recycling process of the present invention is preserved.

The modifications described above are merely exemplary. It is understood that other modifications to the illustrative embodiments will readily occur to persons with ordinary skill in the art. All such modifications and variations are deemed to be within the scope and spirit of the present invention as defined by the accompanying Claims to Invention.

What is claimed is:

1. An image display panel employing the recycling of light from a plurality of light reflective elements therewithin so as to produce color images with enhanced brightness for viewing by a viewer, said image display panel comprising:

a backlighting structure including
a light source for producing light consisting of spectral components having wavelengths over a substantial portion of a visible band of the electromagnetic spectrum, and
a broad-band reflector for reflecting, within said backlighting structure, polarized light consisting of spectral components having wavelengths over a substantial portion of said visible band and, upon one or more reflections within said backlighting structure, converting the polarization state of said spectral components from a first polarization state (P1) to a second polarization state (P2) orthogonal to said first polarization state (P1), and from said second polarization state (P2) to said first polarization state (P1);

a plurality of pixel regions spatially encompassed within a predefined image display area definable relative to said backlighting structure, wherein each said pixel region spatially encompasses a plurality of subpixel regions and each said subpixel region within each said pixel region has a predefined spectral band over the visible band of the electromagnetic spectrum, each said subpixel region within each said pixel region having a light transmission portion and a light blocking portion, and each said light transmission portion and said light blocking portion having a frontside disposed in the direction of said viewer and a backside in the direction of said backlighting structure;

a broad-band reflective polarizer for reflecting light consisting substantially of spectral components having wavelengths over a substantial portion of said visible band and said first polarization state (P1), and transmitting a distribution of polarized light along a pre-specified direction, substantially confined within said predefined image display area, and consisting substantially of spectral components having wavelengths over a substantial portion of said visible band and said second polarization state (P2);

a spatial intensity modulation structure including
an array of polarization modifying elements, each said polarization modifying element being spatially registered with one said subpixel region and selectively modifying the polarization state of polarized light transmitted therethrough in response to a subpixel drive signal provided to said polarization modifying element, and
a broad-band polarizer, cooperating with said array of polarization modifying elements, so as to modulate the spatial intensity of said produced distribution of polarized light and thereby produce a dark-type or bright-type intensity level at each said subpixel region along said broad-band polarizer; and a spectral filtering structure having a pixelated array of pass-band reflective-type spectral filtering elements for spectrally filtering said polarized light, each said pass-band reflective-type spectral filtering element being spatially registered with one said subpixel region and tuned to one said predefined spectral band for transmitting only the spectral components of said polarized light having wavelengths within said predefined spectral band of said subpixel region, and reflecting the spectral components of said produced polarized light having wavelengths outside said predefined spectral band of said subpixel region so as to produce a predefined color value at said subpixel region spatially-registered with said pass-band reflective-type spectral filtering element;

a pattern of broad-band reflector material, in spatial registration with the backside of said light blocking portions of said subpixel regions, for reflecting produced light at the light blocking portions of said subpixel regions;

a pattern of broad-band absorption material, in spatial registration with the frontside of said light blocking portions of said subpixel regions, for absorbing ambient light incident upon said light blocking portions of said subpixel regions;

wherein, the spectral components of polarized light that are transmitted through said broad-band reflective polarizer along said prespecified direction contribute to said distribution of polarized light;

wherein, the spectral components of polarized light that are not transmitted through said broad-band reflective polarizer along said prespecified direction are reflected off said broad-band reflective polarizer and transmitted back towards said broad-band reflector for reflection and/or polarization conversion within said backlighting structure and retransmission through said broad-band reflective polarizer so as to contribute to said distribution of polarized light;

wherein, the spectral components of said polarized light that are transmitted through the pass-band reflective-type spectral filtering element at each said subpixel region within each said spatially-encompassing pixel region produce said predefined color value at said subpixel region; and wherein, the spectral components of said polarized light that are not transmitted through the pass-band reflective-type spectral filtering element at each said subpixel region within each said pixel region are reflected off said pass-band reflective-type spectral filtering element and transmitted back towards said backlighting structure for reflection and/or polarization conversion and retransmission towards the other said subpixel regions within said spatially-encompassing pixel region in said spectral filtering structure;

wherein, the spectral components of said distribution of polarized light which fall incident on the light blocking portions of said subpixel regions are reflected off said pattern of broad-band reflector material disposed thereon, and transmitted back towards said backlighting structure for reflection and/or polarization conversion and retransmission towards the other said subpixel regions within said spatially-encompassing pixel region in said spectral filtering structure;

wherein, the spectral components of ambient light falling incident upon the light blocking portions of said subpixel regions are absorbed by said pattern of broad-band absorption material disposed thereon, thereby reducing glare from said image display panel due to ambient light incident thereon;

whereby said color images are produced from said predefined image display area having enhanced brightness.

2. The image display panel of claim 1, wherein said spectral filtering structure is disposed between said backlighting structure and said spatial intensity modulation structure.

3. The image display panel of claim 2, wherein said plurality of subpixel regions within each said spatially-encompassing pixel region comprise a "red" subpixel region having a "red" pass-band, a "green" subpixel region having a "green" pass-band, and a "blue" subpixel region having a "blue" pass-band.

4. The image display panel of claim 2, wherein each said pass-band reflective-type spectral filtering element is an optical element made from a material selected from the group consisting of liquid crystal material, holographic-type material, and interference-type material.

5. The image display panel of claim 2, wherein each said polarization modifying element is an optical element made from liquid crystal material.

6. The image display panel of claim 2, wherein said backlighting structure further comprises a light guiding panel disposed between said broad-band reflector and said broad-band reflective polarizer for guiding said produced light over said predefined image display area.

7. The image display panel of claim 2, wherein said first polarization state is a first linear polarization state and said second polarization state is a second linear polarization state orthogonal to said first linear polarization state.

8. The image display panel of claim 2, wherein said first polarization state is a first circular polarization state and said second polarization state is a second circular polarization state orthogonal to said first circular polarization state.

9. The image display panel of claim 2, said broad-band reflector is a quasi-diffusive reflector.

10. The image display panel of claim 1, wherein said spatial intensity modulation structure is disposed between said backlighting structure and said spectral filtering structure.

11. The image display panel of claim 10, wherein said plurality of subpixel regions within each said spatially-encompassing pixel region comprise a "red" subpixel region having a "red" pass-band, a "green" subpixel region having a "green" pass-band, and a "blue" subpixel region having a "blue" pass-band.

12. The image display panel of claim 11, wherein said "red" pass-band transmits spectral components of light within said "red" pass-band and reflects substantially all spectral components of light within said "green" pass-band and said "blue" pass-band, wherein said "green" pass-band transmits spectral components of light within said "green" pass-band and reflects substantially all spectral components of light within said "red" pass-band and said "blue" pass-band, and wherein said "blue" pass-band transmits spectral components of light within said "blue" pass-band and reflects substantially all spectral components of light within said "red" pass-band and said "green" pass-band.

13. The image display panel of claim 11, wherein said backlighting structure further comprises a light guiding panel disposed between said broad-band reflector and said broad-band reflective polarizing filter for guiding said produced light over said predefined image display area.

14. The image display panel of claim 10, wherein each said spectral filtering element is an optical element made from a material selected from the group consisting of liquid crystal material, holographic-type material, and interference-type material.

15. The image display panel of claim 10, wherein each said polarization modifying element is an optical element made from liquid crystal material.

16. The image display panel of claim 10, wherein said first polarization state is a first linear polarization state and said second polarization state is a second linear polarization state orthogonal to said first linear polarization state.

17. The image display panel of claim 10, wherein said first polarization state is a first circular polarization state and said second polarization state is a second circular polarization state orthogonal to said first circular polarization state.

18. The image display panel of claim 10, said broad-band polarizing reflector is a quasi-diffusive reflector.

19. The image display panel of claim 1 wherein, the spectral components of said polarized light producing said bright-type intensity level at each subpixel region within said spatially-encompassing pixel region in said spatial intensity modulation structure are transmitted through said broad-band polarizer, and wherein, the spectral components of said polarized light not producing said bright-type intensity level are reflected off said broad-band polarizer and transmitted back towards said backlighting structure for reflection and/or polarization conversion and retransmission towards the other said subpixel regions within said spatially-encompassing pixel region.

20. The image display panel of claim 1, which further comprises a pattern of broad-band reflector material, in spatial registration with the backside of said light blocking portions of said subpixel regions, for reflecting produced light at the light blocking portions of said subpixel regions;

wherein, the spectral components of said produced polarized that fall incident on the light blocking portions of said subpixel regions are reflected off said pattern of broad-band reflector material disposed thereon, and transmitted back towards said backlighting structure for reflection and/or polarization conversion and retransmission towards the other said subpixel regions within said spatially-encompassing pixel region in said spectral filtering structure.

\* \* \* \* \*